US012776036B2

(12) United States Patent
Shige et al.

(10) Patent No.: US 12,776,036 B2
(45) Date of Patent: Oct. 27, 2026

(54) MEDICAL IMAGE PROCESSING APPARATUS, METHOD, AND STORAGE MEDIUM

(71) Applicant: Canon Kabushiki Kaisha, Tokyo (JP)

(72) Inventors: Fumimasa Shige, Otawara (JP); Gakuto Aoyama, Otawara (JP); Hironaga Noguchi, Saitama (JP); Naoki Kiyohara, Ota-ku (JP); Yuichiro Oguchi, Toshima-ku (JP); Junichi Ooida, Ota-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 244 days.

(21) Appl. No.: 18/540,009

(22) Filed: Dec. 14, 2023

(65) Prior Publication Data

US 2024/0202919 A1 Jun. 20, 2024

(30) Foreign Application Priority Data

Dec. 14, 2022 (JP) ................................ 2022-199516

(51) Int. Cl.
*G06T 7/00* (2017.01)
*G06T 7/50* (2017.01)

(52) U.S. Cl.
CPC .............. *G06T 7/0012* (2013.01); *G06T 7/50* (2017.01); *G06T 2207/30048* (2013.01)

(58) Field of Classification Search
None
See application file for complete search history.

(56) References Cited

U.S. PATENT DOCUMENTS

| | | | | |
|---|---|---|---|---|
| 2014/0052001 | A1* | 2/2014 | Ionasec | A61B 5/7264 600/440 |
| 2014/0071125 | A1* | 3/2014 | Burlina | G06T 17/00 345/420 |
| 2016/0246938 | A1* | 8/2016 | Sipiorski | G16H 50/50 |
| 2018/0092615 | A1* | 4/2018 | Sakaguchi | A61B 34/10 |

FOREIGN PATENT DOCUMENTS

| | | |
|---|---|---|
| JP | 2022-74841 A | 5/2022 |

* cited by examiner

*Primary Examiner* — Nancy Bitar
(74) *Attorney, Agent, or Firm* — Oblon, McClelland, Maier & Neustadt, L.L.P.

(57) ABSTRACT

A medical image processing apparatus includes processing circuitry. The processing circuitry acquires first feature data related to the structure of interest from first medical image data scanned at a first timing and second feature data related to the structure of interest from second medical image data scanned at a second timing, estimates the third feature data by estimating the structure of interest at the second timing by simulation based on the first feature data, and calculates a first feature value and a second feature value that is a local feature value more than the first feature value from the second feature data and the third feature data. The processing circuitry specifies a plurality of parameter sets based on optimization calculation having a loss function including the first feature value, and determines a parameter set of interest from the plurality of parameter sets based on the second feature value.

10 Claims, 32 Drawing Sheets

MEDICAL IMAGE PROCESSING APPARATUS, METHOD, AND STORAGE MEDIUM

CROSS-REFERENCE TO RELATED APPLICATIONS

This application is based upon and claims the benefit of priority from Japanese Patent Application No. 2022-199516, filed on Dec. 14, 2022; the entire contents of which are incorporated herein by reference.

FIELD

Embodiments disclosed in the present specification and drawings relate to a medical image processing apparatus, a method, and a storage medium.

BACKGROUND

One of methods for treating mitral regurgitation, which is one of valvular heart disease, is mitral valvuloplasty. Mitral valvuloplasty is an operation for reducing regurgitation occurring near the mitral valve by resection and suturing the mitral valve, connecting the mitral valve and the papillary muscle with artificial chordae tendineae, or reducing the valve annulus of the mitral valve with a thread or the like. In recent years, mitral valvuloplasty by catheter surgery, which is less invasive than surgery involving thoracotomy, has attracted attention.

Since valvuloplasty is a complex procedure, careful treatment planning is required. At the time of treatment planning, a treatment team including a doctor, an anesthesiologist, an ultrasound specialist, and the like is formed, and the type of procedure to be performed and the specific method of procedure are discussed in the team on the basis of clinical images and findings of the patient. For example, a plan is prepared in which catheter treatment called MitraClip treatment is selected as a type of procedure to be performed, a type called NTW is selected as a treatment device to be used, and a central portion of a valve is selected as a placement position of the device.

The preparation of such a treatment plan is difficult, and is mainly performed by a skilled specialist on the basis of experience in actual clinical practice. In order to support planning of a treatment plan, a virtual treatment simulator (simulator) that uses data before treatment as an input and estimates a condition of a patient after operation has attracted attention.

Examples of the simulation technique required for such a simulator include a finite element method (FEM), a finite volume method (FVM), a particle method, and the like. For example, in the FEM, a shape of a target structure is divided into a plurality of elements, a motion equation is applied to each element, and deformation of the shape of the target structure is calculated. Here, in order to solve the equation applied to the element, information such as an expression (typically represented by a strain energy function) representing the shape, physical property value, and deformation of the target structure is required.

For example, a simulator for the purpose of estimating the therapeutic effect of treatment (e.g., valvuloplasty) for mitral valve valvular disease typically acquires the shape of a mitral valve complex including a mitral valve and chordae tendineae from a medical image. Further, the information such as an expression representing the physical property value and deformation uses literature values or estimated values by a parameter estimation method to be described later is used.

The mitral valve simulator simulates the dynamics of the mitral valve and changes in the hemodynamics around the mitral valve based on the treatment. A doctor selects an optimal treatment method with reference to the simulation result. Here, the optimal treatment is a treatment in which the condition of a patient after the treatment is optimal. MR grade is known as an index indicating the condition of a patient in mitral valve valvular disease. MR grade is an index defined in guidelines for valvular heart disease and the like, and the state of the mitral valve is classified into three stages from a plurality of measured values such as a regurgitant orifice area and the regurgitant volume. Of the plurality of measured values, the regurgitant orifice area is an indicator related to shape, and thus when the mitral valve simulator simulates the morphology of the mitral valve, the doctor selects an appropriate treatment from among the simulation results on the basis of the degree of change in the regurgitant orifice area due to the treatment. In addition, since the regurgitant volume is an indicator related to hemodynamics, and thus when the mitral valve simulator simulates the hemodynamics around the mitral valve, the doctor selects an appropriate treatment from among the simulation results on the basis of the degree of change in the regurgitant volume due to the treatment.

The simulator is required to have high prediction accuracy. In order to improve the accuracy, there is a parameter estimation method called data assimilation in which a unique physical property value (parameter) of a target structure is identified such that a difference between the dynamics of the target structure estimated by a simulator and actual dynamics becomes small by solving an inverse problem. The specific physical property value in the mitral valve simulator is, for example, the Young's modulus of the mitral valve or the chordae tendineae specific to each patient.

The parameter estimation method in the mitral valve simulator typically acquires the shape of the mitral valve at different two time points from a medical image such as a CT image. Then, from a mitral valve shape at one time point, a mitral valve shape at another time point is estimated by the mitral valve simulator, and simulation parameters with which the mitral valve shape estimated by the simulator approximately matches the mitral valve shape acquired from the medical image such as the CT image are searched by solving the optimization problem. The difference in "a mitral valve shape estimated by a simulator and a mitral valve shape acquired from a medical image such as a CT image" in the example illustrated here is referred to as a loss, and a function for calculating the loss is referred to as a loss function. As a method for solving the optimization problem (hereinafter, optimization method), examples include a Nelder-Mead method, a Kalman filter method, and the like. In an optimization method such as the Nelder-Mead method, a multi-start optimization method is employed in which a plurality of parameter sets are prepared in advance, a loss is calculated with each parameter set, and a parameter set with the minimum loss is adopted as a solution.

As described above, in surgery on a patient with mitral valve regurgitation, since the index that the doctor wants to check is the valve orifice area, it is particularly important for the mitral valve simulator to accurately calculate the valve orifice area. Therefore, the loss function of the optimization method is often configured by the entire shape of the mitral valve and the valve orifice area. As a result, it is possible to estimate patient-specific simulation parameters with which the shape of the mitral valve and the valve orifice area can be accurately estimated.

DETAILED DESCRIPTION

Figure 1:
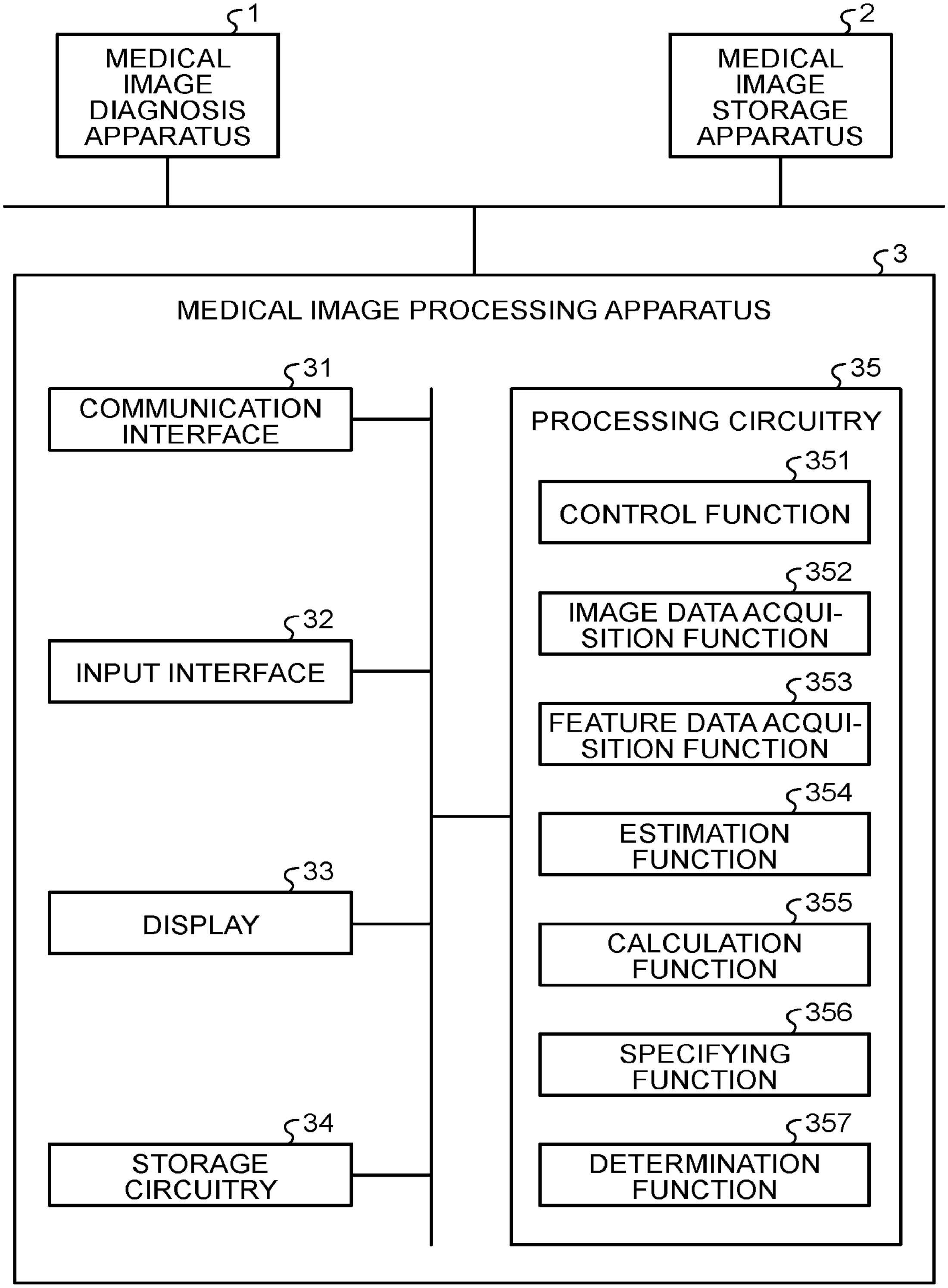
FIG. 1 is a diagram illustrating a configuration example of a medical image processing apparatus according to a first embodiment.

A medical image processing apparatus according to an embodiment includes processing circuitry. The processing circuitry acquires first medical image data and second medical image data scanned at least at the first timing and at the second timing different from the first timing. The processing circuitry acquires first feature data related to the structure of interest on the basis of the first medical image data and second feature data related to the structure of interest on the basis of the second medical image data. The processing circuitry estimates the third feature data by estimating the structure of interest at the second timing by simulation on the basis of the first feature data. The processing circuitry calculates a first feature value and a second feature value that is a local feature value more than the first feature value from the second feature data and the third feature data. The processing circuitry specifies a plurality of parameter sets related to simulation on the basis of optimization calculation having a loss function including the first feature value. The processing circuitry determines a parameter set of interest from the plurality of parameter sets based on the second feature value.

Hereinafter, embodiments of a medical image processing apparatus, a method, and a program will be described in detail with reference to the drawings. Note that the medical image processing apparatus, the method, and the program according to the present application are not limited to the following embodiments. In the following description, the same components are denoted by the same reference numerals, and redundant description is omitted.

First Embodiment

FIG. 1 is a diagram illustrating a configuration example of a medical image processing apparatus according to a first embodiment. For example, as illustrated in FIG. 1, a medical image processing apparatus 3 according to the present embodiment is communicably connected to a medical image diagnosis apparatus 1 and a medical image storage apparatus 2 via a network. Note that various other apparatuses and systems may be connected to the network illustrated in FIG. 1.

The medical image diagnosis apparatus 1 images a subject and generates a medical image. Then, the medical image diagnosis apparatus 1 transmits the generated medical image to various apparatuses on the network. For example, the medical image diagnosis apparatus 1 is an X-ray diagnostic apparatus, an X-ray computed tomography (CT) apparatus, a magnetic resonance imaging (MRI) apparatus, an ultrasonic diagnostic apparatus, a single photon emission computed tomography (SPECT) apparatus, a positron emission computed tomography (PET) apparatus, or the like.

The medical image storage apparatus 2 stores various medical images related to the subject. Specifically, the medical image storage apparatus 2 receives a medical image from the medical image diagnosis apparatus 1 via the network, and stores and keep the medical image in a storage circuit in the apparatus. For example, the medical image storage apparatus 2 is realized by a computer device such as a server or a workstation. Furthermore, for example, the medical image storage apparatus 2 is realized by a picture archiving and communication system (PACS) or the like, and stores medical images in a format conforming to digital imaging and communications in medicine (DICOM).

The medical image processing apparatus 3 performs various types of information processing on the subject. Specifically, the medical image processing apparatus 3 receives a medical image from the medical image diagnosis apparatus 1 or the medical image storage apparatus 2 via the network, and performs various types of information processing using the medical image. For example, the medical image processing apparatus 3 is realized by a computer device such as a server or a workstation.

For example, the medical image processing apparatus 3 includes a communication interface 31, an input interface 32, a display 33, storage circuitry 34, and processing circuitry 35.

The communication interface 31 controls transmission and communication of various data transmitted and received between the medical image processing apparatus 3 and another apparatus connected via a network. Specifically, the communication interface 31 is connected to the processing circuitry 35, and transmits data received from another apparatus to the processing circuitry 35 or transmits data transmitted from the processing circuitry 35 to another apparatus. For example, the communication interface 31 is realized by a network card, a network adapter, a network interface controller (NIC), or the like.

The input interface 32 receives various instructions and input operations of various types of information from a user. Specifically, the input interface 32 is connected to the processing circuitry 35, converts an input operation received from the user into an electric signal, and transmits the electric signal to the processing circuitry 35. For example, the input interface 32 is realized by a trackball, a switch button, a mouse, a keyboard, a touch pad that performs an input operation by touching an operation surface, a touch screen which is an assembly of a display screen and the touch pad, a non-contact input interface using an optical sensor, a voice input interface, and the like. Note that, in the present specification, the input interface 32 is not limited to ones with physical operation components such as a mouse and a keyboard. For example, an electric signal processing circuit that receives an electric signal corresponding to an input operation from an external input device provided separately from the apparatus and transmits the electric signal to the control circuit is also included in the example of the input interface 32.

The display 33 displays various types of information and various types of data. Specifically, the display 33 is connected to the processing circuitry 35 and displays various types of information and various types of data received from the processing circuitry 35. For example, the display 33 is realized by a liquid crystal display, a cathode ray tube (CRT) display, a touch panel, or the like.

The storage circuitry 34 stores various data and various programs. Specifically, the storage circuitry 34 is connected to the processing circuitry 35, stores the data received from the processing circuitry 35, or reads the stored data and transmits the data to the processing circuitry 35. For example, the storage circuitry 34 is realized by a semiconductor memory element such as a random access memory (RAM) or a flash memory, a hard disk, an optical disk, or the like.

The processing circuitry 35 controls the entire medical image processing apparatus 3. For example, the processing circuitry 35 performs various types of processing in response to an input operation received from the user via the input interface 32. For example, the processing circuitry 35 receives data transmitted from another apparatus via the communication interface 31, and stores the received data in the storage circuitry 34. Furthermore, for example, the processing circuitry 35 transmits the received data from the storage circuitry 34 to the communication interface 31, thereby transmitting the data to another apparatus. In addition, for example, the processing circuitry 35 displays data received from the storage circuitry 34 on the display 33.

The configuration example of the medical image processing apparatus 3 according to the present embodiment has been described above. For example, the medical image processing apparatus 3 according to the present embodiment is installed in a medical facility such as a hospital or a clinic, and supports various diagnoses and planning of a treatment plan performed by a user such as a doctor. For example, the medical image processing apparatus 3 executes various types of processing for appropriately performing simulation.

As described above, in a mitral valve simulator used in surgery for a patient with mitral valve regurgitation, it is important to accurately calculate the valve orifice area, and the loss function of the optimization method is often configured by the overall shape of the mitral valve and the valve orifice area. However, it takes time to calculate the valve orifice area. Therefore, in a case where the loss function includes the valve orifice area, it is necessary to calculate the valve orifice area every time the parameter is updated, and the number of times of updating the parameter is enormous, from several thousands of times to several tens of thousands of times, thereby taking much time for optimization calculation.

Therefore, the medical image processing apparatus 3 according to the present embodiment performs the parameter estimation method with a two-stage algorithm, thereby suppressing the time required for optimization calculation and enabling simulation to be appropriately performed. Hereinafter, the medical image processing apparatus 3 having such a configuration will be described in detail.

For example, as illustrated in FIG. 1, in the present embodiment, the processing circuitry 35 of the medical image processing apparatus 3 executes a control function 351, an image data acquisition function 352, a feature data acquisition function 353, an estimation function 354, a calculation function 355, a specifying function 356, and a determination function 357. Here, the image data acquisition function 352 is an example of a medical image data acquisition unit. In addition, the feature data acquisition function 353 is an example of a feature data acquisition unit. In addition, the estimation function 354 is an example of an estimation unit. In addition, the calculation function 355 is an example of a calculation unit. In addition, the specifying function 356 is an example of a specifying unit. In addition, the determination function 357 is an example of the determination unit.

The control function 351 controls to generate various graphical user interfaces (GUIs) and various display information in response to operations via the input interface 32 and display the generated information on the display 33. For example, the control function 351 causes the display 33 to display a result of processing by each function and the like. Furthermore, the control function 351 can also generate and display various display images on the basis of the medical image acquired by the image data acquisition function 352.

The image data acquisition function 352 acquires a medical image of a subject from the medical image diagnosis apparatus 1 or the medical image storage apparatus 2 via the communication interface 31. Specifically, the image data acquisition function 352 acquires a medical image including morphology information of a three-dimensional anatomical structure (structure of interest) of a region of interest to be processed. Here, the image data acquisition function 352 can also acquire a plurality of medical images obtained by capturing a plurality of images in a three-dimensional time direction. For example, the image data acquisition function 352 acquires a first medical image and a second medical image scanned at least at a first timing and at a second timing different from the first timing.

The image data acquisition function 352 acquires a CT image, an ultrasound image, an MRI image, an X-ray image, an Angio image, and the like as the plurality of medical images described above. By executing the image data acquisition function 352 described above, the processing circuitry 35 receives a medical image of the subject from the medical image diagnosis apparatus 1 or the medical image storage apparatus 2, and stores the received medical image in the storage circuitry 34.

The feature data acquisition function 353 acquires feature data for the medical image acquired by the image data acquisition function 352. Specifically, the feature data acquisition function 353 acquires first feature data related to the structure of interest on the basis of the first medical image and second feature data related to the structure of interest on the basis of the second medical image data. Note that the processing by the feature data acquisition function 353 will be described in detail later.

The estimation function 354 estimates the feature data of the structure of interest by performing simulation using the medical image acquired by the image data acquisition function 352. Specifically, the estimation function 354 estimates the third feature data by estimating the structure of interest at the second timing by simulation on the basis of the first feature data. Note that the processing by the estimation function 354 will be described in detail later.

The calculation function 355 calculates a feature value related to the structure of interest on the basis of the feature data acquired by the feature data acquisition function 353 and the feature data estimated by the estimation function 354. Specifically, the calculation function 355 calculates a first feature value and a second feature value that is a local feature value more than the first feature value from the second feature data and the third feature data. Here, the first feature value is a feature value of the entire structure of interest. Note that the processing by the calculation function 355 will be described in detail later.

The specifying function 356 specifies a plurality of parameter sets related to simulation on the basis of the feature value calculated by the calculation function 355. Specifically, the specifying function 356 specifies a plurality of parameter sets related to simulation on the basis of optimization calculation having a loss function including the first feature value. Note that the processing by the specifying function 356 will be described in detail later.

The determination function 357 determines a parameter set of interest from the plurality of parameter sets specified by the specifying function 356. Specifically, the determination function 357 determines the parameter set of interest from the plurality of parameter sets based on the second feature value. Note that the processing by the determination function 357 will be described in detail later.

The processing circuitry 35 described above is realized by, for example, a processor. In that case, each processing function described above is stored in the storage circuitry 34 in the form of a program executable by a computer. Then, the processing circuitry 35 reads and executes each program stored in the storage circuitry 34 to implement a function corresponding to each program. In other words, the processing circuitry 35 has each processing function illustrated in FIG. 1 in a state where each program is read out.

Figure 2:
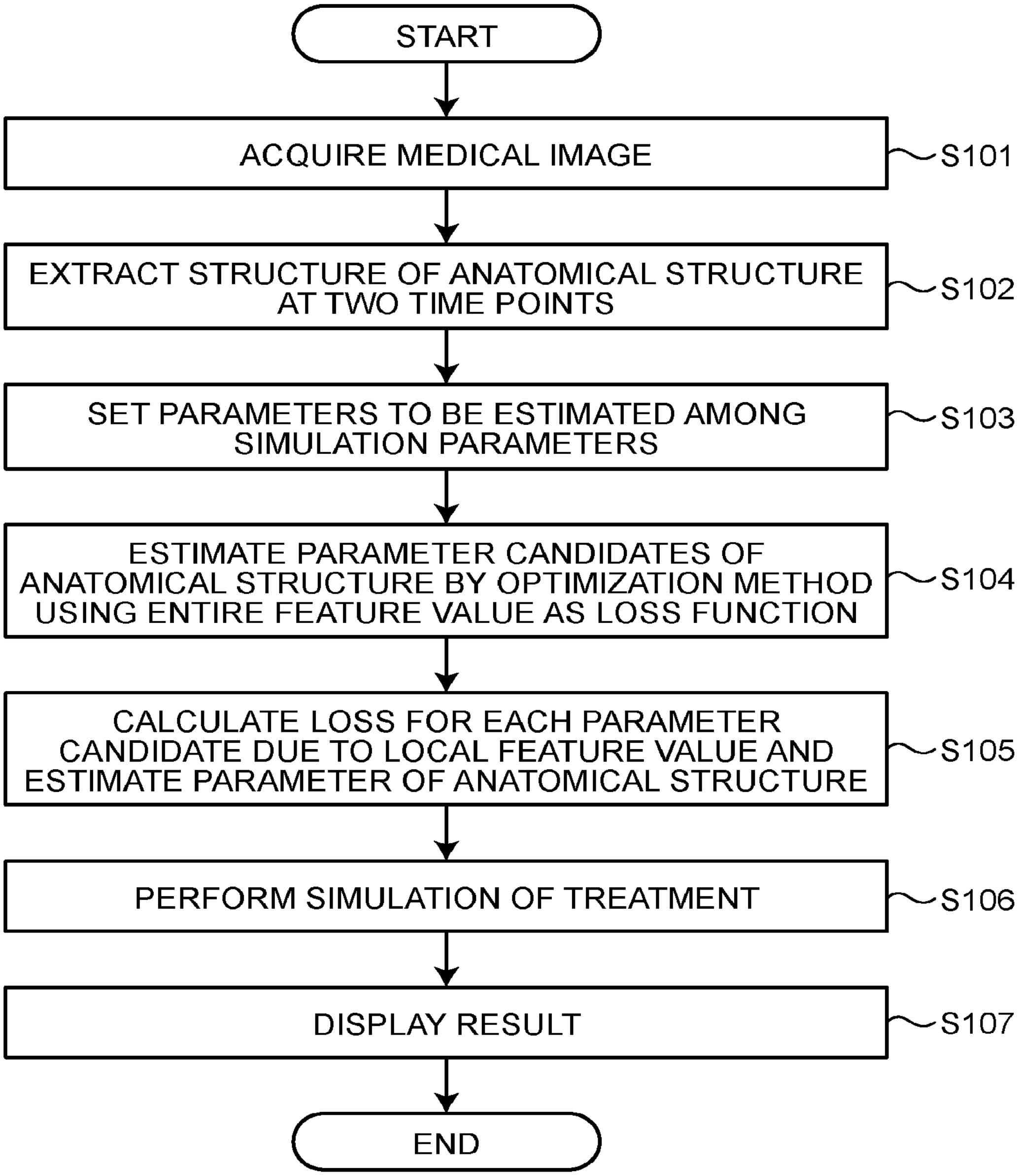
FIG. 2 is a flowchart illustrating a processing procedure of processing performed by each processing function of the processing circuitry of the medical image processing apparatus according to the first embodiment.

Next, a procedure of processing by the medical image processing apparatus 3 will be described with reference to FIG. 2, and then details of each processing will be described. FIG. 2 is a flowchart illustrating a processing procedure of processing performed by each processing function of the processing circuitry 35 of the medical image processing apparatus 3 according to the first embodiment.

For example, as illustrated in FIG. 2, in the present embodiment, the image data acquisition function 352 acquires a medical image of the subject from the medical image diagnosis apparatus 1 or the medical image storage apparatus 2 (step S101). For example, the image data acquisition function 352 acquires a plurality of medical images which include morphology information of an anatomical structure of a living body organ to be processed and are collected at different timings in response to an acquisition operation of a medical image via the input interface 32. This processing is realized, for example, by the processing circuitry 35 calling and executing a program corresponding to the image data acquisition function 352 from the storage circuitry 34.

Subsequently, the feature data acquisition function 353 extracts, for the acquired medical image, a structure of an anatomical structure (structure of interest) at two time points included in the medical image (step S102). This processing is realized, for example, by the processing circuitry 35 calling and executing a program corresponding to the feature data acquisition function 353 from the storage circuitry 34.

Subsequently, the estimation function 354 sets parameters to be estimated among the simulation parameters (step S103). This processing is realized, for example, by the processing circuitry 35 calling and executing a program corresponding to the estimation function 354 from the storage circuitry 34.

Subsequently, the estimation function 354, the calculation function 355 and the specifying function 356 estimate parameter candidates of the anatomical structure by an optimization method using an entire feature value as a loss function (step S104). This processing is realized, for example, by the processing circuitry 35 calling and executing a program corresponding to the estimation function 354, the calculation function 355 and the specifying function 356 from the storage circuitry 34.

Subsequently, the calculation function 355 and the determination function 357 calculate a loss for each parameter candidate due to the local feature value and estimate the parameter of the anatomical structure (step S105). This processing is realized, for example, by the processing circuitry 35 calling and executing a program corresponding to the calculation function 355 and the determination function 357 from the storage circuitry 34.

Subsequently, the estimation function 354 performs a simulation of the treatment input by the doctor (step S106). This processing is realized, for example, by the processing circuitry 35 calling and executing a program corresponding to the estimation function 354 from the storage circuitry 34.

Subsequently, the control function 351 displays a result of the simulation on the display 33 (step S107). This processing is realized, for example, by the processing circuitry 35 calling and executing a program corresponding to the control function 351 from the storage circuitry 34.

Hereinafter, details of each processing executed by the medical image processing apparatus 3 will be described. Note that, in the following, a description will be given on an example of processing in a case where the mitral valve is a structure of interest, the shape deviation of the mitral valve is an entire feature value (first feature value), and the deviation of the valve orifice area of the mitral valve is a local feature value (second feature value). Note that the target of the processing described in the present embodiment is not limited thereto, and for example, an aortic valve, a tricuspid valve, a blood vessel, a left ventricle, or the like may be the structure of interest. In addition, the effective height, the geometric height, the valve annulus length, and the like may be used as the local feature value.

Medical Image Acquisition Processing

As described in step S101 of FIG. 2, the image data acquisition function 352 acquires the medical image including the three-dimensional morphology information of the mitral valve in response to the acquisition operation of the medical image via the input interface 32. For example, the image data acquisition function 352 acquires a CT image captured at a timing obtained by dividing a period from the start of the R wave to the end of the R wave into 20 equal time periods (20 phase) by electrocardiographic synchronization when the mitral valve is within the angle of view. Note that the CT image to be acquired only needs to include the image of the phase in which the mitral valve is closed (or the phase in which regurgitation occurs) and the image of the phase in which the mitral valve is open, and is not necessarily a 20-phase.

Then, the image data acquisition function 352 selects an image captured (first medical image data) in the phase in which the mitral valve is opened (first timing) and an image captured (second medical image data) in the phase in which the mitral valve is closed (second timing) from the 20-phase CT images. For example, the image data acquisition function 352 acquires first medical image data and second medical image data scanned at least during systole and diastole of the heart. As an example, the image data acquisition function 352 selects the phase at the point of time when 70% elapses from the start of the R wave at the R-R interval (70% cycle) as the open phase, and selects the 20% cycle as the closed phase.

Note that the method of selecting the open phase and the closed phase is not limited to the above, and other methods may be used. For example, any phase of mid-diastolic phases (60% to 80% cycle) may be selected as the open phase. Furthermore, any one of mid-systolic phases (10% to 30% cycle) may be selected as the closed phase.

The image data acquisition function 352 can also acquire images of a phase manually selected by a doctor by visual judgment, and can also automatically select a phase based on information described in the DICOM header.

Here, for a patient with mitral valve regurgitation, there is likely no image of the phase in which the mitral valve is completely closed. Therefore, in that case, it is conceivable to select the phase in which the blood flow around the mitral valve is in regurgitation, the phase in which the aortic valve is open, and the phase in which the left ventricle contracts. Hereinafter, a case where these are selected will be described.

The phase in which the blood flow around the mitral valve is in regurgitation may be selected on the basis of the corresponding ultrasound image or may be selected on the basis of the shape of the mitral valve. For example, the image data acquisition function 352 specifies the phase of the ultrasound image in which regurgitation of blood flow occurs in the Doppler image collected by the electrocardiographic synchronization, and selects the CT image having substantially the same phase as the specified phase. Furthermore, for example, the image data acquisition function 352 selects a CT image of a phase in which a part of the mitral valve is turned up to the left atrium (LA) side or a phase in which the valve is not in contact in the mitral valve included in the CT image.

The phase in which the aortic valve is open may be determined by obtaining the shape of the aortic valve from the CT image or the ultrasound image. In this case, the acquisition of the shape of the aortic valve may be performed manually, or may be performed automatically using a known segmentation method (machine learning, image processing). Here, the determination as to whether the aortic valve is open is performed, for example, by determining whether the area is completely separated between the left ventricular (LV) side and the aortic arch side across the aortic valve. That is, the image data acquisition function 352 performs the above determination, specifies the phase in which the aortic valve is opened on the basis of the determination result, and selects the CT image of the specified phase.

The phase in which the left ventricle contracts may be determined based on a change in volume of the left ventricle and a moving direction of the left ventricular wall (when the left ventricle contracts, the left ventricular wall moves in the center direction of the left ventricle) by acquiring the shape of the left ventricle from the CT image or the ultrasound image. For example, the image data acquisition function 352 calculates the volume of the left ventricle in each of the 20-phase CT images, and determines that the left ventricle is contracting in a phase in which the calculated volume of the left ventricle is reduced as compared to the previous phase. In addition, the image data acquisition function 352 sets points at equal intervals inside the left ventricular wall on a short axis cross section (for example, a plane that is horizontal to the approximate plane of the mitral annulus and through the center of gravity of the left ventricular wall) of the left ventricle, and defines the total distance between each point and the center of gravity of the left ventricle as the left ventricular wall centroid distance. Then, the image data acquisition function 352 determines that the left ventricle is contracting when the difference between the left ventricular wall centroid distance one phase before and the current phase is positive. The shape of the left ventricle may be acquired manually or automatically using a known segmentation method (machine learning, image processing).

Note that, in a case where there is no image of a phase corresponding to the condition, an image of a phase having a condition closest to the condition may be selected. For example, when there is no phase at the mid-diastolic phase, the phase at the early-diastolic phase or the end-diastolic phase may be used.

In addition, in a case where the mitral valve does not appear clear, the phase at the early-diastolic phase or the end-diastolic phase may be used. Here, the case where the mitral valve does not appear clear is, for example, a case where there is no pixel determined to be a mitral valve with a likelihood of 60% or more as a result of executing pixel-wise mitral valve segmentation according to Deep Learning, or a case where there is a pixel determined to be a mitral valve with a likelihood of 60% or more at a position not in contact with the left ventricular lumen and the left atrial lumen. That is, the image data acquisition function 352 determines whether or not the mitral valve appears clear as described above and determines the phase to use based on the determination result.

Also, if there is no diastolic data, the phase furthest from the phase selected as the phase in which the mitral valve is open may be selected instead of the open phase.

Here, the image data acquisition function 352 may determine a newly stored medical image based on a preset acquisition condition, and execute the acquisition processing in a case where the medical image satisfies the acquisition condition. For example, an acquisition condition under which the state of the medical image can be determined is stored in the storage circuitry 34, and the image data acquisition function 352 determines the newly stored medical image based on the acquisition condition stored in the storage circuitry 34.

As an example, the storage circuitry 34 stores, as the acquisition condition, "acquisition of a medical image captured in an imaging protocol for the heart", "acquisition of an enlarged and reconstructed medical image", or a combination thereof. The image data acquisition function 352 acquires a medical image satisfying the above-described acquisition condition.

Extraction Processing of Structure of Interest

As described in step S102 of FIG. 2, the feature data acquisition function 353 extracts the mitral valve (coordinate information of pixels indicating the mitral valve) for each of the images at the two time points selected by the image data acquisition function 352 (image captured in the phase in which the mitral valve is open and image captured in the phase in which it is closed). That is, the feature data acquisition function 353 acquires shape data of the mitral valve (first feature data) in a phase in which the mitral valve is open (first timing) and shape data of the mitral valve (second feature data) in a phase in which the mitral valve is closed (second timing). Here, the feature data acquisition function 353 can extract the structure of interest by various methods. For example, the feature data acquisition function 353 can extract a region specified on the CT image via the input interface 32 as the structure of interest. That is, the feature data acquisition function 353 extracts an area manually designated by the user as the structure of interest.

In addition, for example, the feature data acquisition function 353 can extract a structure of interest based on an anatomical structure rendered in a CT image by a known region extraction technique. For example, the feature data acquisition function 353 extracts a structure of interest in the CT image by using segmentation of pixel-wise by Deep learning, fitting of a template shape based on an energy function, Otsu's binarization method based on a CT value, a region expansion method, a snake method, a graph cut method, a mean shift method, or the like.

Parameter Setting Processing

As described in step S103 in FIG. 2, the estimation function 354 sets parameters to be estimated among parameters in the simulation. Here, as a simulation method, a simulation by FEM in which the mitral valve is modeled, FSI in which the mitral valve and the blood flow around the mitral valve are modeled, a particle method, and the like can be considered. Parameters (groups) used for these simulations are defined in advance.

The estimation function 354 sets a parameter to be estimated (a parameter to be subjected to data assimilation) among predefined parameters (groups). For example, the estimation function 354 sets a parameter to be estimated by specifying a parameter that does not undergo data assimilation among predefined parameters (groups). As an example, the estimation function 354 specifies a parameter having a small influence on the regurgitant orifice area based on the evaluation result of the magnitude of the influence of each parameter on the regurgitant orifice area, and specifies the parameter as a parameter that does not undergo data assimilation. The magnitude of the influence of each parameter on the regurgitant orifice area is evaluated in advance and stored in the storage circuitry 34.

In addition, the parameter that does not undergo data assimilation may be set on the basis of an empirical rule or may be set on the basis of known knowledge such as literature. In addition, the values of the parameter that does not undergo data assimilation may be determined on the basis of known knowledge such as literature, may be determined on the basis of empirical rules, or may be randomly determined from a range set on the basis of known knowledge or empirical rules.

The estimation function 354 sets parameters to be estimated by the above-described processing. Here, the parameter to be estimated is, for example, the Young's modulus of the valve, the hardness of chordae tendineae, the valve-specific physical property value such as the number of chordae tendineae, the physical property value of the object strongly affecting the movement of the valve, and the like.

Parameter Candidate Estimation Processing

As described in step S104 of FIG. 2, the estimation function 354, the calculation function 355 and the specifying function 356 estimate parameter candidates (a plurality of parameter sets) of the anatomical structure by an optimization method using the entire feature value as a loss function. Specifically, the estimation function 354 estimates the shape (third feature data) of the mitral valve in the phase in which the mitral valve is closed by simulation with the image of the phase in which the mitral valve is open as an input. The calculation function 355 calculates a feature value (first feature value) regarding a difference in the shape of the mitral valve based on the shape of the mitral valve acquired from the image by the feature data acquisition function 353 (second feature data: shape of the mitral valve in the phase in which the mitral valve is closed) and the shape of the mitral valve estimated by simulation (shape of the mitral valve in the phase in which the mitral valve is closed). The specifying function 356 estimates an optimum value of the set parameter by a multi-start optimization method based on the feature value regarding the difference in the shape of the mitral valve.

Here, the specifying function 356 estimates a plurality of parameter sets using a difference in the overall shape of the mitral valve, which is the entire feature value, as a loss function of optimization. Specifically, the specifying function 356 specifies a plurality of parameter sets having a relatively small first feature value. In normal optimization, one parameter set having the smallest loss function is estimated, but the specifying function 356 according to the present embodiment estimates a predetermined number of parameter sets in ascending order of the loss function. For example, the specifying function 356 estimates 16 parameter sets.

The number of parameter sets to be estimated is not limited to 16, and may be 8 or 2, or may be dynamically determined. In the case of dynamic determination, for example, it may be changed according to an object to be estimated by simulation. In this case, for example, the number may be 10 in the case of the mitral valve simulation, 8 in the case of the aortic valve simulation, and the like.

Furthermore, in the case of dynamic determination, for example, it may be changed according to the state of the mitral valve. In this case, for example, the number may be ten when the classification of mitral regurgitation is "type I", twelve when the classification is "type II", and the like. In addition, the number may be sixteen when there is calcification, ten when there is no calcification, and the like.

In addition, in the case of dynamically determining, for example, it may be set according to the value of loss. In this case, for example, a parameter set included within 10% of the loss value of the parameter set whose loss reduced the most may be selected. Alternatively, a parameter set below a preset loss value may be selected. The above 10% may also be changed according to the state of the mitral valve.

Note that, in the data assimilation described above, the case where the shape of the mitral valve in the phase in which the mitral valve is closed is estimated using the shape of the mitral valve in the phase in which the mitral valve is open as an input has been described, however, the embodiment is not limited thereto, and the shape of the mitral valve in the phase in which the mitral valve is open may be estimated using the shape of the mitral valve in the phase in which the mitral valve is closed as an input.

In addition, the difference in the overall shape of the mitral valve is calculated as follows, for example. For example, the calculation function 355 calculates, as the difference in the overall shape of the mitral valve, the sum of distances between a certain point on the mitral valve shape obtained by simulation and the nearest neighbor point on the mitral valve shape obtained from the image, calculated at all nodes. That is, the calculation function 355 sets node points for the mitral valve obtained by the simulation and the mitral valve obtained from the image, and calculates and adds the distances between the nearest node points to obtain a total value as the difference in the overall shape of the mitral valve.

Note that not all the nodes on the mitral valve obtained by the simulation but the sum of the calculated values at several representative points may be used. Here, the representative point may be set in advance or may be set randomly. In addition, not only the "Sum of distances between a certain point on the mitral valve shape obtained by simulation and the nearest neighbor point on the mitral valve shape obtained by measurement, calculated at all nodes" but also the "Sum of distances between a certain point on the mitral valve shape obtained by measurement and the nearest neighbor point on the mitral valve shape obtained by simulation, calculated at all nodes" may be calculated together and the two may be added up.

Parameter Estimation Processing

As described in step S105 in FIG. 2, the calculation function 355 and the determination function 357 calculate a loss for each parameter candidate due to the local feature value and estimate the parameter of the anatomical structure. Specifically, the calculation function 355 calculates a feature value (second feature value) regarding a difference in the valve orifice area based on the shape of the mitral valve acquired from the image by the feature data acquisition function 353 (second feature data: shape of the mitral valve in the phase in which the mitral valve is closed) and the shape of the mitral valve estimated by simulation (third feature data: shape of the mitral valve in the phase in which the mitral valve is closed). For example, the calculation function 355 calculates a feature value regarding a difference in the valve orifice area for each of the plurality of parameter sets based on the third feature data corresponding to the plurality of estimated parameter sets (parameter candidates) and the second feature data.

Here, the calculation function 355 calculates the difference (loss) of the valve orifice area as follows. For example, the calculation function 355 calculates the center of gravity of a point group belonging to the valve tip of the mitral valve (a point group of tips of the anterior leaflet and the posterior leaflet), and calculates the area of a triangle having two adjacent points of the center of gravity and the point belonging to the valve tip as vertices at all points constituting the valve orifice. Then, the calculation function 355 calculates the total area of the calculated triangles as the valve orifice area. The calculation function 355 calculates the valve orifice area in the mitral valve shape obtained by the simulation and the mitral valve shape obtained from the image, and calculates the difference in the valve orifice area by taking the difference between the calculated values.

The determination function 357 determines a parameter set of interest from the plurality of parameter sets based on the feature value related to the difference of the valve orifice area in the cardiac valve. Specifically, the determination function 357 determines a parameter set having a relatively small corresponding second feature value among the plurality of parameter sets as the parameter set of interest. For example, the determination function 357 determines a parameter set having the smallest difference (loss) of the valve orifice area among the plurality of parameter sets (a predetermined number of parameter sets).

Figure 3:
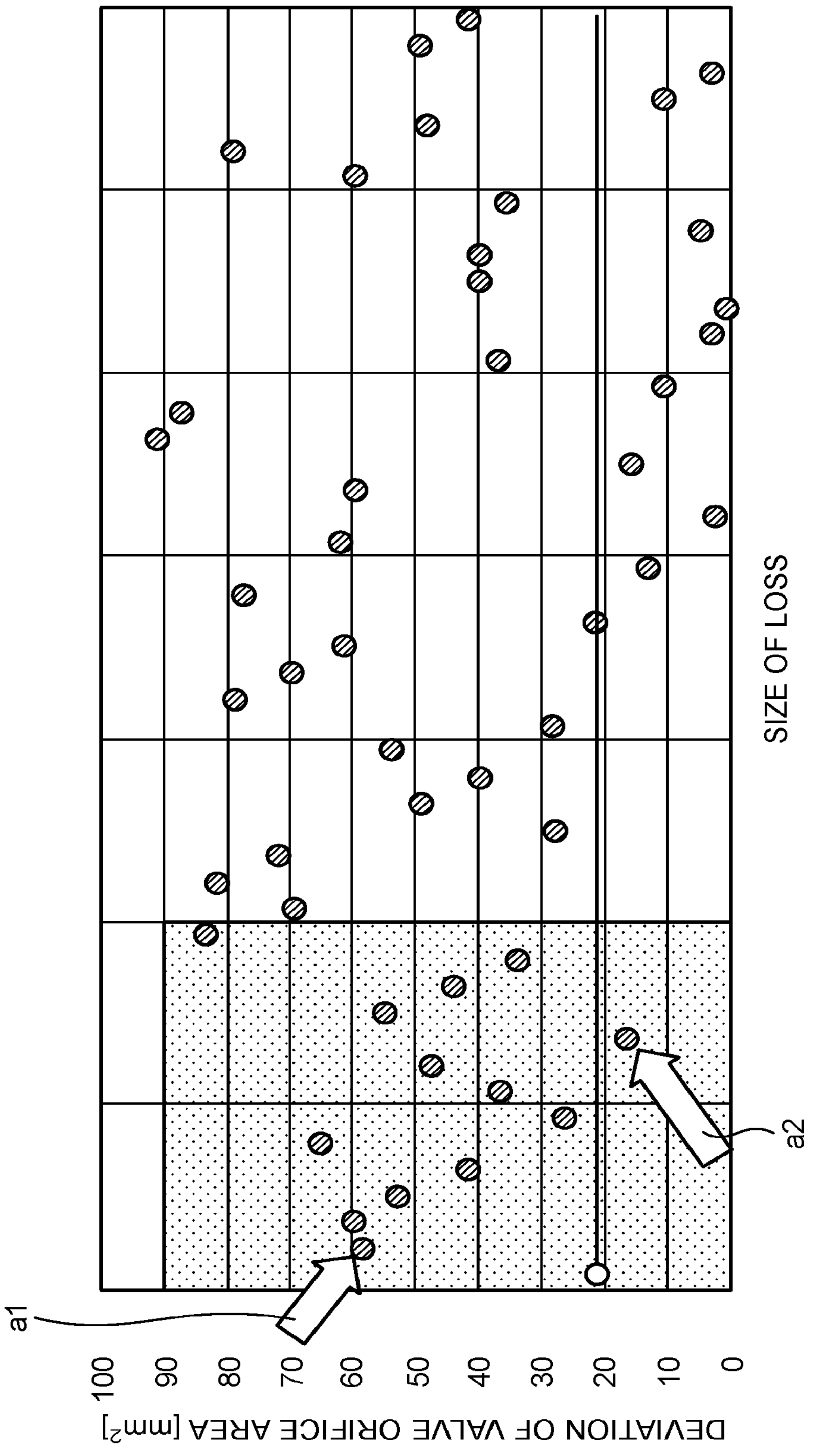
FIG. 3 is a diagram for explaining an example of processing by the medical image processing apparatus according to the first embodiment.

FIG. 3 is a diagram for explaining an example of processing by the medical image processing apparatus 3 according to the first embodiment. Here, in FIG. 3, the vertical axis represents the deviation of the valve orifice area, the horizontal axis represents the size of the loss function (deviation of the shape of the entire mitral valve), and the distribution of the parameter set obtained by the optimization processing is illustrated.

For example, as illustrated in FIG. 3, the medical image processing apparatus 3 according to the present embodiment estimates the parameter set by the optimization method. Here, in normal optimization, one parameter set with the smallest size of loss (in the drawing, a parameter set indicated by an arrow a1) is estimated. However, in the present embodiment, first, a plurality of parameter sets in which the size of loss is relatively small (in the drawing, a plurality of parameter sets included in a gray area on the left side) is estimated, and among the parameter sets, a parameter set in which the deviation of the valve orifice area is the smallest (in the drawing, a parameter set indicated by an arrow a2) is determined as a final parameter set.

Simulation

As described in step S106 of FIG. 2, the estimation function 354 executes simulation of treatment input by a doctor. Specifically, the estimation function 354 estimates the shape of the mitral valve and the valve orifice area when the input treatment is performed by simulation using the parameter set determined by the determination function 357.

Result Display Processing

As described in step S107 of FIG. 2, the control function 351 causes the display 33 to display the result of the simulation estimated by the estimation function 354. For example, the control function 351 displays the shape and valve orifice area of the postoperative mitral valve. Here, the control function 351 can also display various types of information regarding the parameter set used for the simulation. For example, the control function 351 can display the order of the deviation in the shape of the entire mitral valve for the parameter set used in the simulation. In addition, the control function 351 can also display the difference in the valve orifice area for the parameter set used in the simulation. Furthermore, in a case where the difference in the valve orifice area is equal to or larger than a predetermined threshold value, the control function 351 can also display the fact.

First Modification

In the above-described embodiment, in step S105, the final parameter is estimated using the local feature value (valve orifice area). However, the embodiment is not limited thereto, and for example, not only the local feature value but also the entire feature value may be used. For example, the determination function 357 determines the final parameter from the value of the local feature value and the value of the entire feature value. Here, different weights may be set for the value of the local feature value and the value of the entire feature value. In this case, for example, the reciprocals of the representative values of the local feature value and the entire feature value calculated in advance may be set as weights. Alternatively, in order to place more importance on the local feature value, the weight for the value of the local feature value may be set to be large.

Second Modification

In the method of the above-described embodiment, after the parameter candidates are estimated by the optimization method using the entire feature value as the loss function, the parameter set is determined using the local feature value, however, a method of determining the parameter set by performing optimization using the entire feature value and the local feature value as the loss function from the beginning may also be selectable. In such a case, for example, in step S104, the medical image processing apparatus 3 estimates approximate values of the calculation times in the two methods, and displays the estimated results on the display 33. The doctor selects which method to use with reference to the displayed calculation times. Note that, for the approximate value, for example, both parameter estimation methods are performed with available data in advance, and the time taken is displayed. Alternatively, the approximate value displayed may be changed depending on the case of interest. For example, if the shape of the mitral valve is significantly larger or smaller than usual, it may take time to search the parameter set, and thus a value obtained by multiplying the previous approximate value by 1.2 may be displayed.

As described above, according to the first embodiment, the image data acquisition function 352 acquires first medical image data and second medical image data scanned at least at the first timing and at the second timing different from the first timing. The feature data acquisition function 353 acquires the first feature data related to the structure of interest on the basis of the first medical image data and the second feature data related to the structure of interest on the basis of the second medical image data. The estimation function 354 estimates the third feature data by estimating the structure of interest at the second timing by simulation on the basis of the first feature data. The calculation function 355 calculates the first feature value and the second feature value that is a local feature value more than the first feature value from the second feature data and the third feature data. The specifying function 356 specifies a plurality of parameter sets related to simulation on the basis of optimization calculation having a loss function including the first feature value. The determination function 357 determines a parameter set of interest from the plurality of parameter sets based on the second feature value. Therefore, the medical image processing apparatus 3 according to the first embodiment can estimate a parameter without including a local feature value requiring a calculation time in a loss function in a case of performing a simulation using a parameter (physical property value) unique to an individual, and can appropriately perform the simulation while suppressing an increase in calculation time required for optimization.

Furthermore, according to the first embodiment, the first feature value is a feature value of the entire structure of interest. Therefore, the medical image processing apparatus 3 according to the first embodiment can perform optimization using a feature value that does not take much calculation time, and can suppress an increase in calculation time required for optimization.

In addition, according to the first embodiment, the specifying function 356 specifies a plurality of parameter sets based on the first feature value calculated by the loss function from the parameter set group obtained based on the multi-start optimization calculation. Therefore, the medical image processing apparatus 3 according to the first embodiment makes it possible to extract a candidate for selecting an appropriate parameter set from among parameter sets obtained by optimization using the entire feature value.

In addition, according to the first embodiment, the specifying function 356 specifies a plurality of parameter sets having a relatively small first feature value. Therefore, the medical image processing apparatus 3 according to the first embodiment enables selection of an appropriate parameter candidate in the entire feature value.

In addition, according to the first embodiment, the determination function 357 determines a parameter set having a relatively small corresponding second feature value among the plurality of parameter sets as the parameter set of interest. Therefore, the medical image processing apparatus 3 according to the first embodiment makes it possible to determine an appropriate parameter in the local feature value from among appropriate parameter candidates in the entire feature value.

In addition, according to the first embodiment, the image data acquisition function 352 acquires first medical image data and second medical image data scanned at least during systole and diastole of the heart. Therefore, the medical image processing apparatus 3 according to the first embodiment enables acquisition of a medical image with an appropriate phase in simulation of a cardiac valve.

In addition, according to the first embodiment, the feature data acquisition function 353 acquires the shape data of the cardiac valve in the systole of the heart based on the first medical image data, and acquires the shape data of the cardiac valve in the diastole of the heart based on the second medical image data. The estimation function 354 estimates the shape data of the cardiac valve in the diastole of the heart by simulation based on the shape data of the cardiac valve in the systole of the heart acquired based on the first medical image data. The calculation function 355 calculates a feature value regarding a difference in the shape of the cardiac valve and a feature value regarding a difference in the valve orifice area in the cardiac valve based on the shape data of the cardiac valve based on the second medical image data and the shape data of the cardiac valve estimated by simulation. The specifying function 356 specifies a plurality of parameter sets based on the optimization calculation having a loss function including the feature value related to a difference in the shape of the cardiac valve. The determination function 357 determines a parameter set of interest from the plurality of parameter sets based on the feature value related to the difference of the valve orifice area in the cardiac valve. Therefore, the medical image processing apparatus 3 according to the first embodiment enables simulation of the cardiac valve to be appropriately performed.

Second Embodiment

In a second embodiment, a method of selecting a phase when selecting a medical image to be used for simulation will be described. As described in the first embodiment, at the time of data assimilation, typically, the mitral valve shape in two phases is acquired from a CT image or the like, the mitral valve shape in one phase is predicted from the mitral valve shape in the other phase by the mitral valve simulator, and an optimization problem for searching for a parameter with which the simulation result in the same phase approximately matches the actual shape is solved. Here, in a case where there is no phase selection criterion, the phase selected by an operator varies, and as a result, a variation may occur in the estimated parameter.

Therefore, in the second embodiment, by providing a selection criterion of determining whether or not there is an abnormality in the cardiac valve and selecting the phase on the basis of the determination result and the shape of the cardiac valve, it is possible to suppress variation due to dependence on operators and appropriately perform simulation.

For example, when a simulation of the mitral valve is performed, the classification (type I or type III, or type II) of mitral regurgitation is determined from the shape of the mitral valve, and in the case of type II, the phase having the largest regurgitant orifice area in the systole is selected as the "closed phase". In the case of type I or type III, the phase having the smallest valve orifice area in the systole is selected as the "closed phase". Further, regardless of type II, type I or type III, the phase in which the mitral valve shape is most uniformly open in the end-diastolic phase is selected as the "open phase". By selecting two phases of the "closed phase" and the "open phase" based on such a criterion, it is possible to select a phase suitable for data assimilation without depending on the operator.

Figure 4:
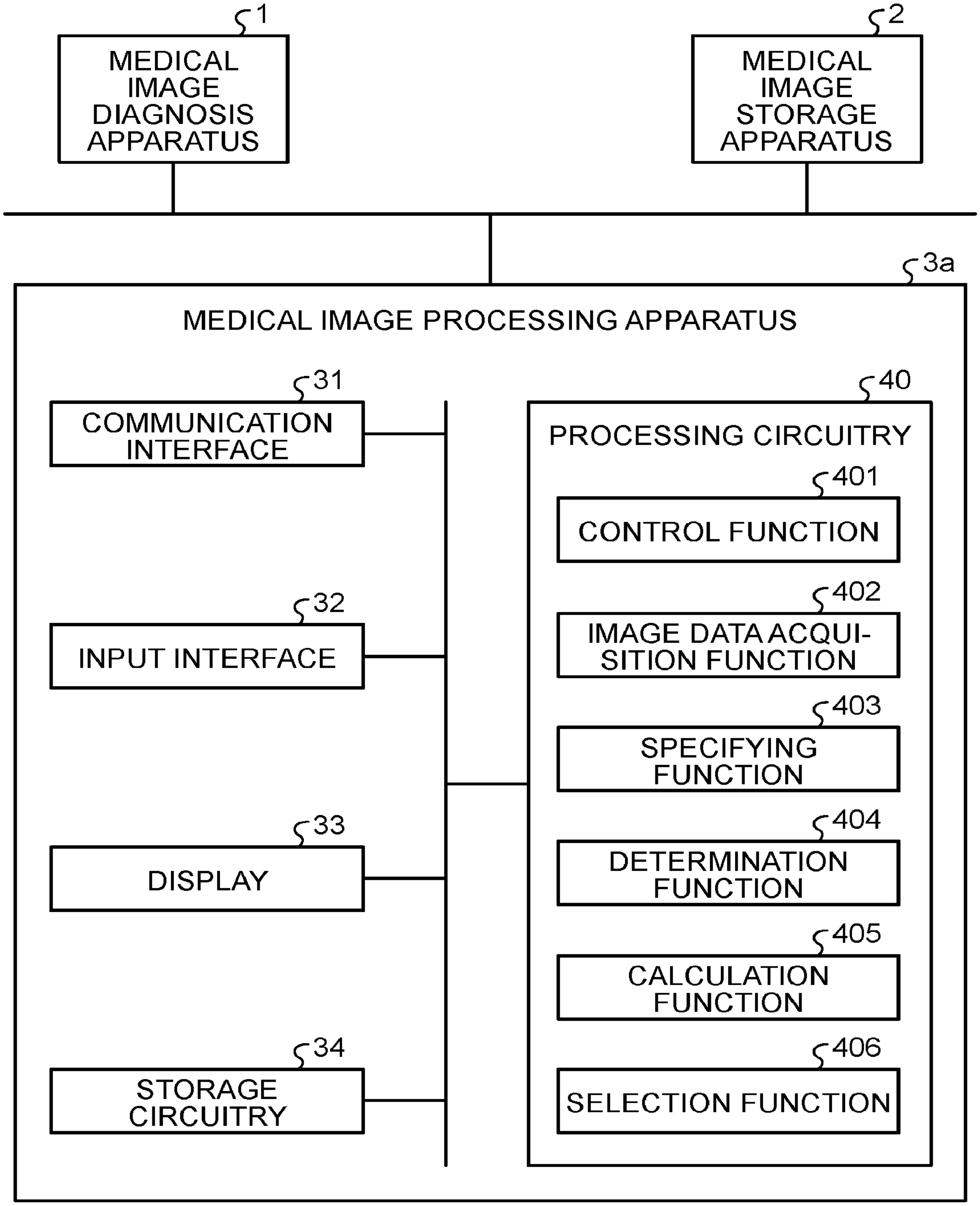
FIG. 4 is a diagram illustrating a configuration example of a medical image processing apparatus according to a second embodiment.

FIG. 4 is a diagram illustrating a configuration example of a medical image processing apparatus 3*a* according to the second embodiment. For example, as illustrated in FIG. 4, the medical image processing apparatus 3*a* according to the present embodiment is communicably connected to a medical image diagnosis apparatus 1 and a medical image storage apparatus 2 via a network. Note that various other apparatuses and systems may be connected to the network illustrated in FIG. 4.

Here, the second embodiment is different from the first embodiment in processing contents by processing circuitry. Hereinafter, an explanation will be given mainly on this point. As illustrated in FIG. 4, the medical image processing apparatus 3*a* includes a communication interface 31, an input interface 32, a display 33, storage circuitry 34, and processing circuitry 40.

As illustrated in FIG. 4, the processing circuitry 40 executes a control function 401, an image data acquisition function 402, a specifying function 403, a determination function 404, a calculation function 405, and a selection function 406, thereby controlling the entire medical image processing apparatus 3*a*. Here, the image data acquisition function 402 is an example of a medical image data acquisition unit. In addition, the specifying function 403 is an example of a specifying unit. In addition, the determination function 404 is an example of a determination unit. In addition, the calculation function 405 is an example of a calculation unit. In addition, the selection function 406 is an example of a determination unit.

The control function 401 controls to generate various GUIs and various display information in response to operations via the input interface 32 and display the generated information on the display 33. For example, the control function 401 causes the display 33 to display a result of processing by each function and the like. Furthermore, the control function 401 can also generate and display various display images on the basis of the medical image acquired by the image data acquisition function 402.

In addition, the control function 401 can estimate parameters for the simulation by data assimilation and perform the simulation using the estimated parameters.

The image data acquisition function 402 acquires a medical image of a subject from the medical image diagnosis apparatus 1 or the medical image storage apparatus 2 via the communication interface 31. Specifically, the image data acquisition function 352 acquires a medical image including morphology information of a three-dimensional anatomical structure (structure of interest) of a region of interest to be processed. Here, the image data acquisition function 402 can also acquire a plurality of medical images obtained by capturing a plurality of images in a three-dimensional time direction. For example, the image data acquisition function 402 acquires a first medical image and a second medical image scanned at least at a first timing and at a second timing different from the first timing. Note that the image data acquisition function 402 can acquire various medical images and store the acquired medical images in the storage circuitry 34, similarly to the image data acquisition function 352 described in the first embodiment.

The specifying function 403 specifies a structure of interest for the medical image acquired by the image data acquisition function 402. Specifically, the specifying function 403 identifies the structure of interest on the basis of the first medical image data and the second medical image data.

Here, the structure of interest is a cardiac valve. Note that the processing by the specifying function 403 will be described in detail later.

The determination function 404 determines the presence or absence of abnormality of the structure of interest on the basis of the shape of the structure of interest. Note that the processing by the determination function 404 will be described in detail later.

The calculation function 405 calculates a first feature value on the basis of the shape of the structure of interest. Note that the processing by the calculation function 405 will be described in detail later.

The selection function 406 selects a phase on the basis of the determination result on the presence or absence of abnormality of the structure of interest and the first feature value. Note that the processing by the selection function 406 will be described in detail later.

The processing circuitry 40 described above is realized by, for example, a processor. In that case, each processing function described above is stored in the storage circuitry 34 in the form of a program executable by a computer. Then, the processing circuitry 40 reads and executes each program stored in the storage circuitry 34 to implement a function corresponding to each program. In other words, the processing circuitry 40 has each processing function illustrated in FIG. 4 in a state where each program is read out.

Figure 5:
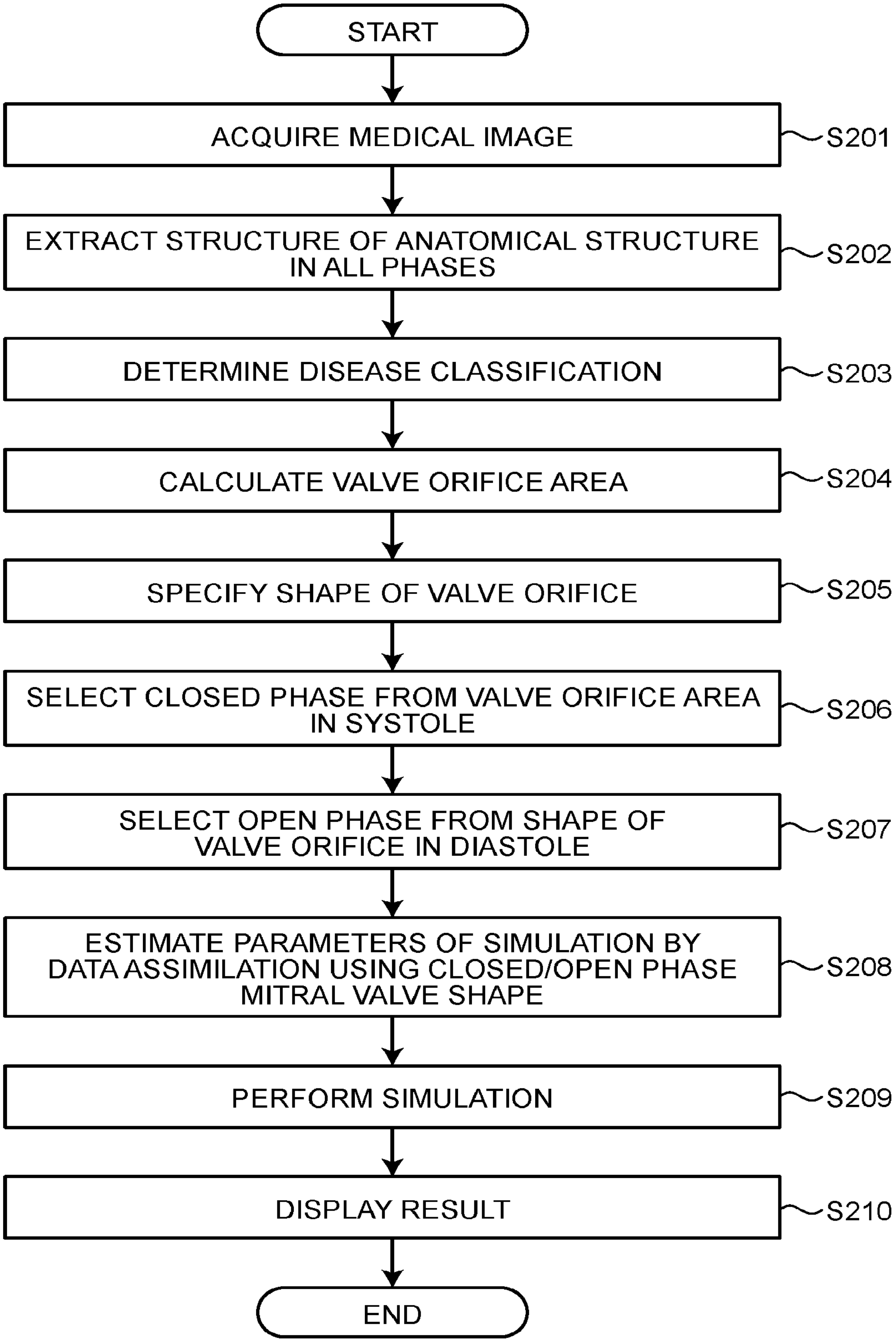
FIG. 5 is a flowchart illustrating a processing procedure of processing performed by each processing function of the processing circuitry of the medical image processing apparatus according to the second embodiment.

Next, a procedure of processing by the medical image processing apparatus 3*a* will be described with reference to FIG. 5, and then details of each processing will be described. FIG. 5 is a flowchart illustrating a processing procedure of processing performed by each processing function of the processing circuitry 40 of the medical image processing apparatus 3*a* according to the second embodiment.

For example, as illustrated in FIG. 5, in the present embodiment, the image data acquisition function 402 acquires a medical image of the subject from the medical image diagnosis apparatus 1 or the medical image storage apparatus 2 (step S201). Specifically, the image data acquisition function 402 acquires multi-phase medical images including a cardiac valve. This processing is realized, for example, by the processing circuitry 40 calling and executing a program corresponding to the image data acquisition function 402 from the storage circuitry 34.

Subsequently, the specifying function 403 extracts, for the plurality of acquired medical images, a structure of an anatomical structure (structure of interest) in all phases (step S202). This processing is realized, for example, by the processing circuitry 40 calling and executing a program corresponding to the specifying function 403 from the storage circuitry 34.

Subsequently, the determination function 404 determines disease classification of the specified structure of interest (step S203). This processing is realized, for example, by the processing circuitry 40 calling and executing a program corresponding to the determination function 404 from the storage circuitry 34.

Subsequently, the calculation function 405 calculates the valve orifice area (step S204). This processing is realized, for example, by the processing circuitry 40 calling and executing a program corresponding to the calculation function 405 from the storage circuitry 34.

Subsequently, the specifying function 403 specifies the shape of the valve orifice (step S205). This processing is realized, for example, by the processing circuitry 40 calling and executing a program corresponding to the specifying function 403 from the storage circuitry 34.

Subsequently, the selection function 406 selects the closed phase from the valve orifice area in the systole (step S206). This processing is realized, for example, by the processing circuitry 40 calling and executing a program corresponding to the selection function 406 from the storage circuitry 34.

Subsequently, the selection function 406 selects the open phase from the shape of the valve orifice in the diastole (step S207). This processing is realized, for example, by the processing circuitry 40 calling and executing a program corresponding to the selection function 406 from the storage circuitry 34.

Subsequently, the control function 401 estimates parameters of the simulation by data assimilation using the closed/open phase mitral valve shape (step S208), performs the simulation (step S209), and displays the result (step S210). This processing is realized, for example, by the processing circuitry 40 calling and executing a program corresponding to the control function 401 from the storage circuitry 34.

Hereinafter, details of each processing executed by the medical image processing apparatus 3*a* will be described. Note that, in the following, processing in a case where the mitral valve is set as the structure of interest and the phase in which the mitral valve is closed and the phase in which the mitral valve is open are selected will be described as an example. Note that the target of the processing described in the present embodiment is not limited thereto, and for example, an aortic valve, a tricuspid valve, a blood vessel, a left ventricle, or the like may be the structure of interest.

Medical Image Acquisition Processing

As described in step S201 of FIG. 5, the image data acquisition function 402 acquires the medical images that include the three-dimensional morphology information of the mitral valve and have been collected at a plurality of time points, in response to the acquisition operation of the medical image via the input interface 32. For example, similarly to the first embodiment, the image data acquisition function 402 acquires the CT image captured in 20 phases per one heartbeat. Note that the CT image to be acquired only needs to include the image of the phase in which the mitral valve is closed (or the phase in which regurgitation occurs) and the image of the phase in which the mitral valve is open, and is not necessarily a 20-phase.

Extraction Processing of Structure of Interest

As described in step S202 of FIG. 5, the specifying function 403 extracts the mitral valve for each of the multi-phase images acquired by the image data acquisition function 402. Here, similarly to the feature data acquisition function 353 described in the first embodiment, the specifying function 403 can extract the structure of interest by various methods.

Disease Classification Determination Processing

As described in step S203 of FIG. 5, the determination function 404 determines the disease classification of the mitral valve on the basis of the shape of the mitral valve specified by the specifying function 403. Here, for example, mitral regurgitation is classified by several classification methods from the mechanism of its pathology. For example, mitral regurgitation is classified into primary MR, which is an abnormality of the mitral valve complex including the mitral valve, chordae tendineae, and papillary muscles, and secondary MR, which is an abnormality of other than the mitral valve. In addition, mitral regurgitation is classified into type I in which the movement of the valve is normal (annulus dilation or valvular perforation), type II in which the MR is caused by excessive movement of the valve (valve prolapse or papillary muscle rupture), and type III in which the MR is caused by restriction of mobility of the valve (rheumatism or tethering).

The determination function 404 executes determination processing on the basis of the above classification. Specifically, the determination function 404 determines whether the mitral valve is type II mitral regurgitation. That is, the determination function 404 determines whether there is an abnormality in the mitral valve itself. Here, a method of determining whether the type is type II or not, for example, determines "whether a part of the valve tip of the mitral valve is positioned above the valve annulus of the mitral valve", and if it is true, determines that the type is type II. Here, "above" means the upward direction directing from the LV side to the LA side in the vertical vector of the approximate plane of the valve annulus of the mitral valve. That is, the determination function 404 calculates an approximate plane of the valve annulus of the mitral valve specified in the CT image, and determines whether or not a part of the leaflet of the mitral valve is in the upward direction with respect to the approximate plane, thereby determining whether or not the type is type II.

Note that the method for determining type II or other than type II is not limited to the above-described method, and other methods may be used. For example, the determination function 404 can also make a determination by acquiring a classification described in medical records or the like. Furthermore, the determination function 404 can also make a determination by acquiring a result determined by a doctor who has observed the CT image.

In addition, the determination of classification is not limited to determining whether it is type II or other than type II, and classification may be determined based on whether it is primary MR or secondary MR. In such a case, the determination function 404 classifies the mitral valve as primary MR or secondary MR based on whether there is a cleft in the shape of the segmented mitral valve, whether a part of the mitral valve is flipped over to the LA side, or whether there is a rupture of the papillary muscle.

Calculation Processing of Valve Orifice Area

As described in step S204 of FIG. 5, the calculation function 405 calculates the valve orifice area based on the segmented shape of the mitral valve. For example, the calculation function 405 calculates the center of gravity of a point group belonging to the valve tip of the mitral valve (a point group of tips of the anterior leaflet and the posterior leaflet), and calculates the area of a triangle having two adjacent points of the center of gravity and the point belonging to the valve tip as vertices at all points constituting the valve orifice. Then, the calculation function 355 calculates the total area of the calculated triangles as the valve orifice area.

Specifying Processing of Valve Orifice Shape

As described in step S205 of FIG. 5, the specifying function 403 specifies the shape of the valve orifice based on the segmented shape of the mitral valve. Specifically, the specifying function 403 specifies the shape of the valve orifice with the mitral valve open. For example, the specifying function 403 projects the valve shape in parallel on a predetermined plane, and specifies a determination coefficient ($R^2$) when the opening of the valve (valve orifice) is approximated by a circle as the shape of the valve orifice. Alternatively, the specifying function 403 sets points at substantially equal intervals on the valve orifice, projects the point group on the valve annulus plane, and calculates the center of gravity of the projected point group. Then, the specifying function 403 calculates the variance of the distance between each point and the center of gravity, and specifies the calculated variance as the shape of the valve orifice.

Processing of Selecting Closed Phase

As described in step S206 of FIG. 5, the selection function 406 selects the phase in which the mitral valve is closed based on the valve orifice area calculated by the calculation function 405. Here, the selection function 406 executes selection according to the disease classification.

For example, when it is determined that there is an abnormality in the structure of interest, the selection function 406 selects the phase that is the systole of the heart and in which the valve orifice of the cardiac valve is maximized as the phase in which the cardiac valve is closed. That is, when the disease of the mitral valve is type II in which the mitral valve itself is abnormal, the selection function 406 selects the phase that is in the systole and in which the valve orifice area is maximized as the "closed phase".

Here, the selection function 406 selects the phase in which regurgitation occurs as the systole. That is, when it is determined that there is an abnormality in the structure of interest, the selection function 406 selects the phase in which regurgitation of blood occurs as the systole of the heart, and selects the phase that is the systole of the heart and in which the valve orifice of the cardiac valve is maximized as the phase in which the cardiac valve is closed.

Whether or not regurgitation has occurred can be estimated, for example, from the shape of the segmented mitral valve. In such a case, for example, the selection function 406 determines that regurgitation has occurred in a case where a part of the mitral valve is turned up toward the LA side, or in a case where the mitral valve is near the boundary between LA and LV but the valve is not completely closed. Note that the phase in which regurgitation has occurred may be selected using an ultrasound image collected by transesophageal echocardiography (TEE). In addition, whether or not regurgitation has occurred may be estimated by an ultrasound image collected by a color Doppler method. Furthermore, the phase in which regurgitation has occurred may be selected by a doctor.

On the other hand, when it is determined that there is no abnormality in the structure of interest, the selection function 406 selects the phase that is the systole of the heart and in which the valve orifice of the cardiac valve is minimized as the phase in which the cardiac valve is closed. That is, when the disease of the mitral valve is other than type II, the selection function 406 selects the phase that is the systole and in which the valve orifice area is minimized as the "closed phase".

Further, as in the case type II, the selection function 406 selects the phase in which regurgitation occurs as the systole. That is, when it is determined that there is no abnormality in the structure of interest, the selection function 406 selects the phase in which regurgitation of blood occurs as the systole of the heart, and selects the phase that is the systole of the heart and in which the valve orifice of the cardiac valve is minimized as the phase in which the cardiac valve is closed.

Processing of Selecting Open Phase

As described in step S207 of FIG. 5, the selection function 406 selects the phase in which the mitral valve is open based on the shape of the valve orifice specified by the specifying function 403. Specifically, the selection function 406 selects the phase that is the diastole of the heart and in which the cardiac valve is uniformly open as the phase in which the cardiac valve is open. For example, the selection function

406 selects the phase that is end-diastolic phase and in which the mitral valve is most uniformly open as the “open phase”.

For example, in the mitral valve in the end-diastolic phase of the heart, the selection function 406 determines a phase in which the coefficient of determination ($R^2$) specified by the specifying function 403 is the highest or a phase in which the variance is the smallest as the phase in which the mitral valve is most uniformly open and selects the phase as the “open phase”.

Here, for example, the selection function 406 estimates the diastole of the heart from the electrocardiogram, and specifies the last section when the diastole is divided into three as the end-diastolic phase. Note that the diastole may be estimated not only by the electrocardiogram, but may also be estimated by the phase in which the aortic valve is closed, the phase in which the left ventricle is dilated, or the like. In addition, the diastole may also be specified by a doctor.

It should be noted that if the mitral valve is more uniformly open immediately after being closed compared to the end-diastolic phase, the time point may be selected as the “open phase”. In addition, in a case where there is no end-diastolic phase, the selection function 406 performs selection from the mid-diastolic phase. In addition, in a case where there is no mid-diastolic phase, the selection function 406 performs selection from the early-diastolic phase. In addition, the valve orifice area or the length of the valve annulus may be used as an index for selecting the “open phase”.

Parameter Estimation Processing

As described in step S208 of FIG. 5, the control function 401 estimates the parameter set for the simulation of the mitral valve by data assimilation using the shape of the mitral valve in the “closed phase” selected by the selection function 406 and the shape of the mitral valve in the “open phase” selected by the selection function 406.

Simulation

As described in step S209 of FIG. 5, the control function 401 executes a simulation of treatment input by a doctor. Specifically, the control function 401 estimates the shape of the mitral valve, the valve orifice area, and the like when the input treatment is performed by simulation using the parameter set determined by the determination function 357.

Result Display Processing

As described in step S210 of FIG. 5, the control function 401 causes the display 33 to display the result of the simulation estimated. For example, the control function 401 displays the shape, valve orifice area, and the like of the postoperative mitral valve. Here, the control function 401 can further display various types of information, for example, the disease classification, the used phase, the shape of the valve in the used phase, and the like. Further, the control function 401 may receive the change of the phase by the operator. In such a case, the control function 401 performs a simulation based on the shape of the mitral valve in the changed phase and displays the result.

First Modification

In the above embodiment, the case of selecting the “closed phase” and the “open phase” has been described. However, the embodiment is not limited thereto, and for example, different phases may be selected for each parameter for performing data assimilation. In such a case, for example, the selection function 406 preferentially selects the phase in which the valve is clearly depicted when estimating the parameter related to the valve. In addition, the selection function 406 selects two phases in which valve deformation is large when estimating the parameter related to the chordae tendineae.

As described above, according to the second embodiment, the image data acquisition function 402 acquires first medical image data and second medical image data scanned at least at the first timing and at the second timing different from the first timing. The specifying function 403 identifies the structure of interest on the basis of the first medical image data and the second medical image data. The determination function 404 determines the presence or absence of abnormality of the structure of interest on the basis of the shape of the structure of interest. The calculation function 405 calculates a first feature value on the basis of the shape of the structure of interest. The selection function 406 selects a phase on the basis of the determination result on the presence or absence of abnormality of the structure of interest and the first feature value. Therefore, the medical image processing apparatus 3*a* according to the second embodiment can select the phase of the image to be used for simulation on the basis of the determined criterion, and can suppress the occurrence of variation due to dependence on operators and appropriately perform the simulation.

According to the second embodiment, the structure of interest is a cardiac valve. Therefore, the medical image processing apparatus 3*a* according to the second embodiment enables simulation of the cardiac valve to be appropriately performed.

In addition, according to the second embodiment, when it is determined that there is an abnormality in the structure of interest, the selection function 406 selects the phase that is the systole of the heart and in which the valve orifice of the cardiac valve is maximized as the phase in which the cardiac valve is closed. Therefore, the medical image processing apparatus 3*a* according to the second embodiment enables selection of a closed phase according to a disease.

Furthermore, according to the second embodiment, when it is determined that there is an abnormality in the structure of interest, the selection function 406 selects the phase in which regurgitation of blood occurs as the systole of the heart, and selects the phase that is the systole of the heart and in which the valve orifice of the cardiac valve is maximized as the phase in which the cardiac valve is closed. Therefore, the medical image processing apparatus 3*a* according to the second embodiment enables appropriate selection of the systole of the heart.

In addition, according to the second embodiment, when it is determined that there is no abnormality in the structure of interest, the selection function 406 selects the phase that is the systole of the heart and in which the valve orifice of the cardiac valve is minimized as the phase in which the cardiac valve is closed. Therefore, the medical image processing apparatus 3*a* according to the second embodiment enables appropriate selection of the phase in which the cardiac valve is closed.

In addition, according to the second embodiment, when it is determined that there is no abnormality in the structure of interest, the selection function 406 selects the phase in which regurgitation of blood occurs as the systole of the heart, and selects the phase that is the systole of the heart and in which the valve orifice of the cardiac valve is minimized as the phase in which the cardiac valve is closed. Therefore, the medical image processing apparatus 3*a* according to the second embodiment enables appropriate selection of the systole of the heart.

Furthermore, according to the second embodiment, the selection function 406 selects the phase that is the diastole of the heart and in which the cardiac valve is uniformly open as the phase in which the cardiac valve is open. Therefore, the medical image processing apparatus 3*a* according to the second embodiment enables appropriate selection of the phase in which the cardiac valve is open.

Third Embodiment

In a third embodiment, a method of correcting the length of a cardiac valve will be described. As described in the first embodiment, at the time of data assimilation, the mitral valve shape in two phases is acquired from the CT image or the like, and the mitral valve shape in one on the phases is predicted from the mitral valve shape in the other phase by the mitral valve simulator. However, the mitral valve is a thin object having a thickness of about 0.5 mm, and the resolution of CT and ultrasonography is almost the same as the thickness of the mitral valve. In addition, since the mitral valve moves at a high speed at the time of opening and closing, it is difficult to accurately segment the mitral valve on a CT image or an ultrasound image. Furthermore, although the anterior leaflet and the posterior leaflet overlap when the mitral valve is closed, it is difficult to determine whether two valves overlap or it is only one valve by resolution of CT and ultrasonography.

Therefore, when data assimilation is performed using a mitral valve shape including an error in segmentation, parameter estimation accuracy may be deteriorated. Therefore, it is necessary to correct the shape of the mitral valve based on knowledge, but there has been no valve correction method for the purpose of data assimilation so far.

Therefore, in the third embodiment, by correcting the length when the mitral valve is open by the length when the mitral valve is closed, the accuracy of the estimation of the simulation parameter is improved, and the simulation can be appropriately performed.

Here, in the present embodiment, the length of the valve is corrected in consideration of the following points. (1) The valve should be approximately equal in length when the valve is open and closed. However, since the pressure applied to the valve is larger when the valve is closed, it is assumed that the length is slightly longer when the valve is closed than the length when the valve is opened. (2) The area with which the valve is in contact when the valve is closed is not made too short, since it will not be in contact if the length of the valve when opened is too short. On the other hand, if the length of the valve is too long, the area that is not in contact with the valve is brought into contact with the valve. Therefore, the area that is not in contact with the valve is not made too long.

Figure 6:
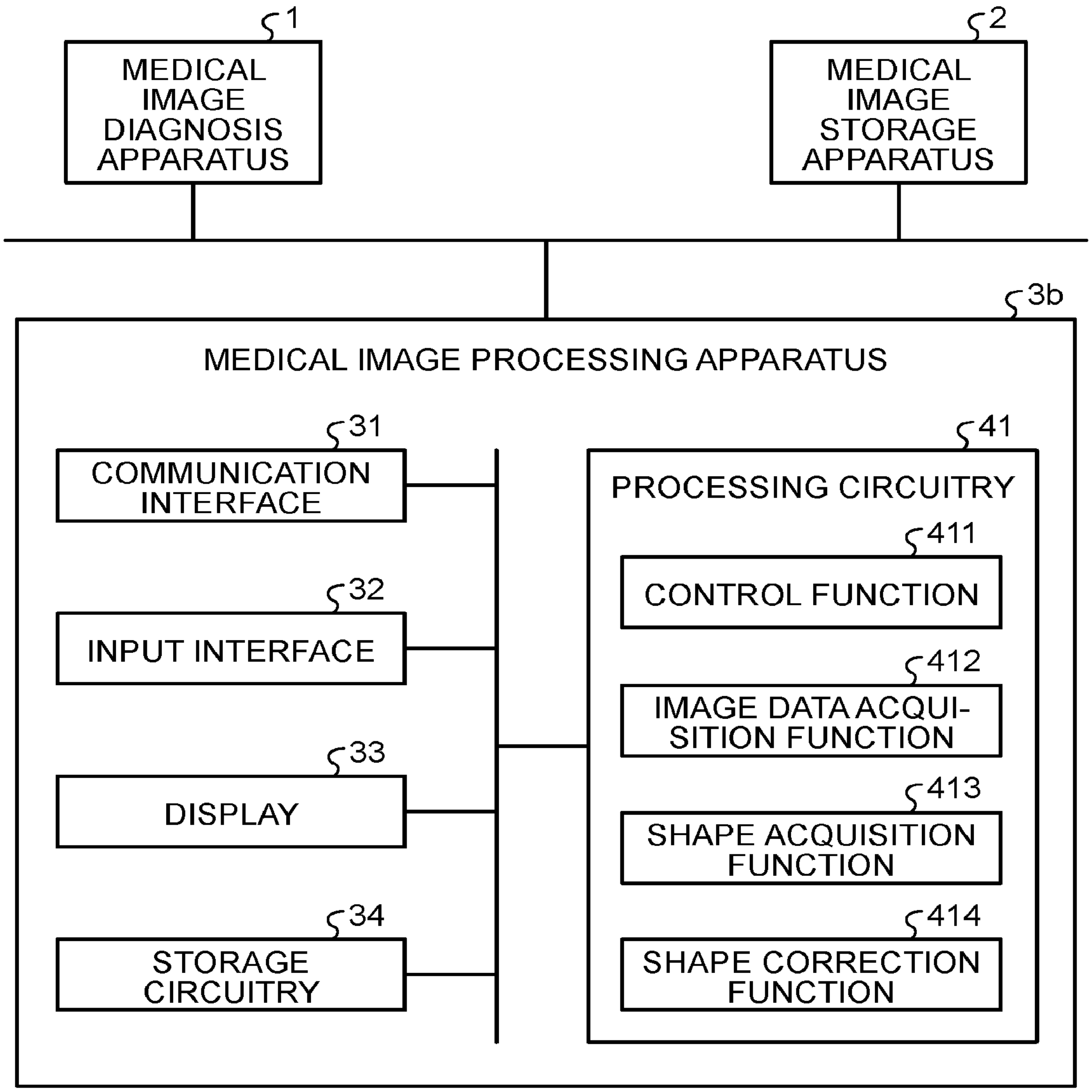
FIG. 6 is a diagram illustrating a configuration example of a medical image processing apparatus according to a third embodiment.

FIG. 6 is a diagram illustrating a configuration example of a medical image processing apparatus 3*b* according to the third embodiment. For example, as illustrated in FIG. 6, the medical image processing apparatus 3*b* according to the present embodiment is communicably connected to a medical image diagnosis apparatus 1 and a medical image storage apparatus 2 via a network. Note that various other apparatuses and systems may be connected to the network illustrated in FIG. 6.

Here, the third embodiment is different from the first embodiment in processing contents by processing circuitry. Hereinafter, an explanation will be given mainly on this point. As illustrated in FIG. 6, the medical image processing apparatus 3*b* includes a communication interface 31, an input interface 32, a display 33, storage circuitry 34, and processing circuitry 41.

As illustrated in FIG. 6, the processing circuitry 41 executes a control function 411, an image data acquisition function 412, a shape acquisition function 413, and a shape correction function 414, thereby controlling the entire medical image processing apparatus 3*b*. Here, the control function 411 is an example of a control unit. In addition, the image data acquisition function 412 is an example of a medical image data acquisition unit. Further, the shape acquisition function 413 is an example of a shape acquisition unit. Furthermore, the shape correction function 414 is an example of a shape correction unit.

The control function 411 controls to generate various GUIs and various display information in response to operations via the input interface 32 and display the generated information on the display 33. For example, the control function 411 causes the display 33 to display a result of processing by each function and the like. Furthermore, the control function 411 can also generate and display various display images on the basis of the medical image acquired by the image data acquisition function 412.

In addition, the control function 411 can estimate parameters for the simulation by data assimilation and perform the simulation using the estimated parameters.

The image data acquisition function 412 acquires a medical image of a subject from the medical image diagnosis apparatus 1 or the medical image storage apparatus 2 via the communication interface 31. Specifically, the image data acquisition function 412 acquires a medical image including morphology information of a three-dimensional anatomical structure (structure of interest) of a region of interest to be processed. Here, the image data acquisition function 412 can also acquire a plurality of medical images obtained by capturing a plurality of images in a three-dimensional time direction. For example, the image data acquisition function 412 acquires a first medical image and a second medical image scanned at least at a first timing and at a second timing different from the first timing. Note that the image data acquisition function 412 can acquire various medical images and store the acquired medical images in the storage circuitry 34, similarly to the image data acquisition function 352 described in the first embodiment.

The shape acquisition function 413 acquires a shape data for the medical image acquired by the image data acquisition function 412. Specifically, the shape acquisition function 413 acquires first shape data related to the structure of interest from the first medical image data and second shape data related to the structure of interest from the second medical image data. Here, the structure of interest is a cardiac valve. Note that the processing by the shape acquisition function 413 will be described in detail later.

The shape correction function 414 corrects the first shape data based on the second shape data. Specifically, the shape correction function 414 corrects the first shape data based on the mechanical field in the first phase and the second phase and the contact state of the shape of the structure of interest in the second phase. Here, the first phase is an open phase of the cardiac valve and the second phase is a closed phase of the cardiac valve. The shape correction function 414 calculates a third length obtained by correcting the second length that is the length of the valve leaflet in the first phase based on the first length that is the length of the valve leaflet in the second phase. Note that the processing by the shape correction function 414 will be described in detail later.

The processing circuitry 41 described above is realized by, for example, a processor. In that case, each processing function described above is stored in the storage circuitry 34 in the form of a program executable by a computer. Then, the processing circuitry 41 reads and executes each program stored in the storage circuitry 34 to implement a function corresponding to each program. In other words, the processing circuitry 41 has each processing function illustrated in FIG. 6 in a state where each program is read out.

Figure 7:
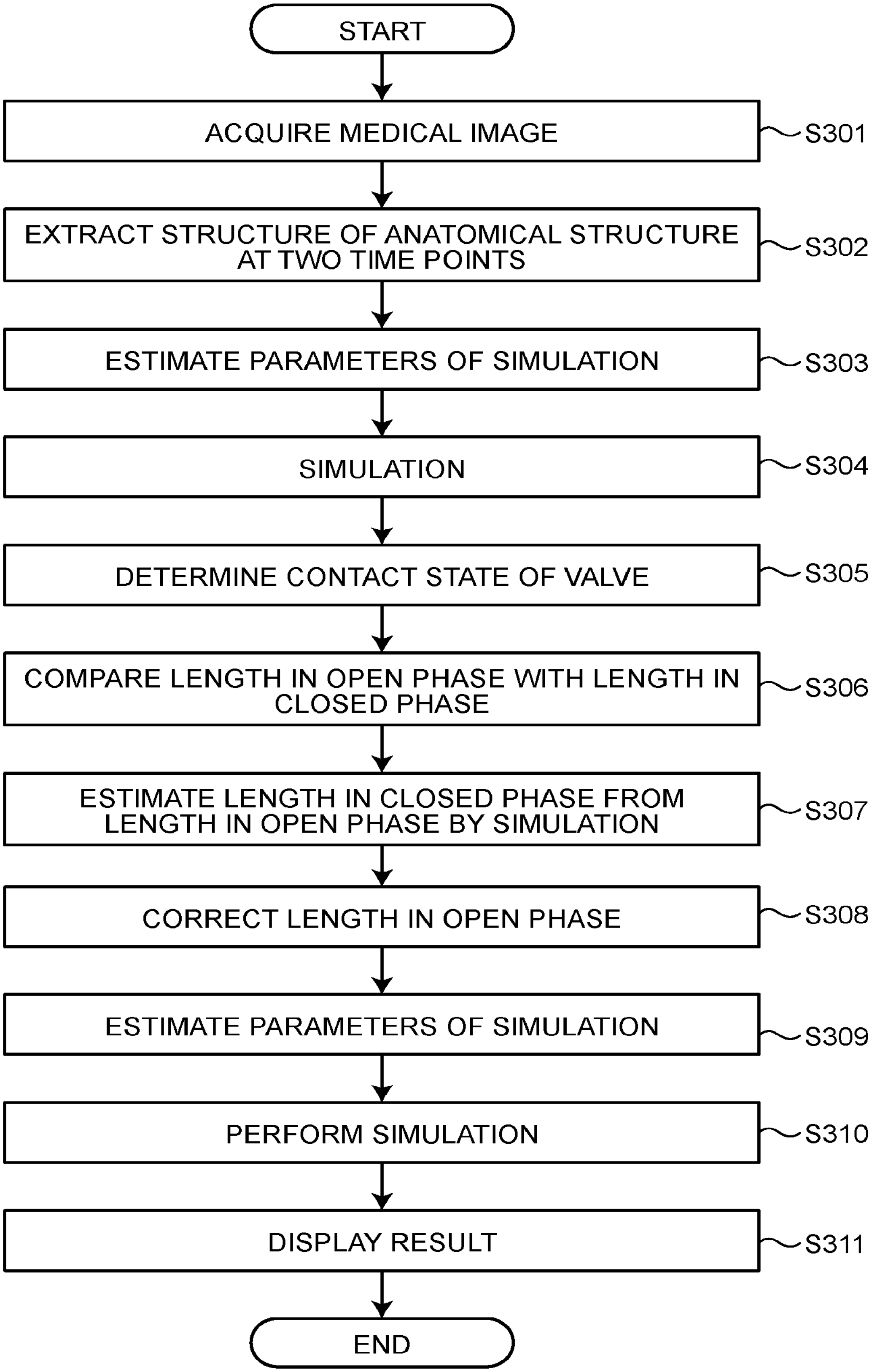
FIG. 7 is a flowchart illustrating a processing procedure of processing performed by each processing function of the processing circuitry of the medical image processing apparatus according to the third embodiment.

Next, a procedure of processing by the medical image processing apparatus 3*b* will be described with reference to FIG. 7, and then details of each processing will be described. FIG. 7 is a flowchart illustrating a processing procedure of processing performed by each processing function of the processing circuitry 41 of the medical image processing apparatus 3*b* according to the third embodiment.

For example, as illustrated in FIG. 7, in the present embodiment, the image data acquisition function 412 acquires a medical image of the subject from the medical image diagnosis apparatus 1 or the medical image storage apparatus 2 (step S301). Specifically, the image data acquisition function 412 acquires multi-phase medical images including a cardiac valve. This processing is realized, for example, by the processing circuitry 41 calling and executing a program corresponding to the image data acquisition function 412 from the storage circuitry 34.

Subsequently, the shape acquisition function 413 extracts, for the plurality of acquired medical images, a structure of an anatomical structure (structure of interest) at two time points included in the medical image (step S302). This processing is realized, for example, by the processing circuitry 41 calling and executing a program corresponding to the shape acquisition function 413 from the storage circuitry 34.

Subsequently, the control function 411 estimates parameters of the simulation by data assimilation using the closed/open phase mitral valve shape (step S303), performs the simulation (step S304). This processing is realized, for example, by the processing circuitry 41 calling and executing a program corresponding to the control function 411 from the storage circuitry 34.

Subsequently, the shape correction function 414 determines the contact state of the mitral valve in the open phase (step S305). This processing is realized, for example, by the processing circuitry 41 calling and executing a program corresponding to the shape correction function 414 from the storage circuitry 34.

Subsequently, the shape correction function 414 compares the length of the mitral valve in the open phase with the length of the mitral valve in the closed phase (step S306), estimates the length (size) of the mitral valve in the shape of the mitral valve in the closed phase obtained from the shape data in the open phase by simulation (step S307), and corrects the length of the mitral valve in the open phase (step S308). This processing is realized, for example, by the processing circuitry 41 calling and executing a program corresponding to the shape correction function 414 from the storage circuitry 34.

Subsequently, the control function 411 estimates parameters of the simulation by data assimilation using the open phase mitral valve shape with the corrected shape and the closed phase mitral valve shape (step S309), performs the simulation (step S310), and displays the result (step S311). This processing is realized, for example, by the processing circuitry 41 calling and executing a program corresponding to the control function 411 from the storage circuitry 34.

Hereinafter, details of each processing executed by the medical image processing apparatus 3*b* will be described. Note that, in the following, processing in a case where the mitral valve is set as the structure of interest and the shape of the mitral valve in the open phase is corrected from the shape of the mitral valve in the closed phase will be described as an example. Note that the target of the processing described in the present embodiment is not limited thereto, and for example, an aortic valve, a tricuspid valve, or the like may be the structure of interest. In the following description, a case where a CT image is used will be described as an example, but an MR image or an ultrasound image may be used as a medical image.

Medical Image Acquisition Processing

As described in step S301 of FIG. 7, the image data acquisition function 412 acquires the medical images that include the three-dimensional morphology information of the mitral valve and have been collected at a plurality of time points, in response to the acquisition operation of the medical image via the input interface 32. For example, the image data acquisition function 412 acquires the CT image captured at least at two time points. Note that the CT image to be acquired only needs to include the image of the phase in which the mitral valve is closed and the image of the phase in which the mitral valve is open.

Extraction Processing of Structure of Interest

As described in step S302 of FIG. 7, the shape acquisition function 413 extracts the mitral valve for each of the images of at least two phases (image of the phase in which the mitral valve is closed and image of the phase in which the mitral valve is open) acquired by the image data acquisition function 412. Here, similarly to the feature data acquisition function 353 described in the first embodiment, the shape acquisition function 413 can extract the structure of interest by various methods.

Parameter Estimation Processing/Simulation

As described in step S303 of FIG. 7, the control function 411 estimates the parameter set for the simulation of the mitral valve by data assimilation using the shape of the mitral valve in the open phase and the shape of the mitral valve in the closed phase. Then, as described in step S304 in FIG. 7, the control function 411 estimates the shape of the mitral valve in the closed phase from the shape of the mitral valve in the open phase by simulation using the estimated parameter set.

Determining Processing of Contact State of Valve

As described in step S305 of FIG. 7, the shape correction function 414 determines the contact state of the valve for the open phase mitral valve to be corrected. For example, the shape correction function 414 divides the anterior and posterior leaflet regions by elements and determines whether or not they are in contact based on whether the distance between a node at the anterior leaflet and any node at the posterior leaflet or the distance between a node at the posterior leaflet and any node at the anterior leaflet is within 1 mm.

Here, the shape correction function 414 can change the determination method for each area. For example, for a region empirically known that the valve is thick, it may be determined whether or not the distance between the node points of the anterior leaflet and the posterior leaflet is within 2 mm, and for a region empirically known that the valve is thin, it may be determined whether or not the distance is within 1 mm. Further, when the contact state of the valve is determined, the determination may be made only by the node as described above, or the determination may be made using other than the node (such as a line segment connecting the node and the node).

In addition, the determination of the contact state of the valve may be made on the basis of whether or not regurgitation has occurred using the ultrasound image, or may be made when a result determined by a doctor is acquired.

As described above, the shape correction function 414 determines the contact state of the mitral valve and corrects the length of the valve according to the contact state. FIG.

Figure 8:
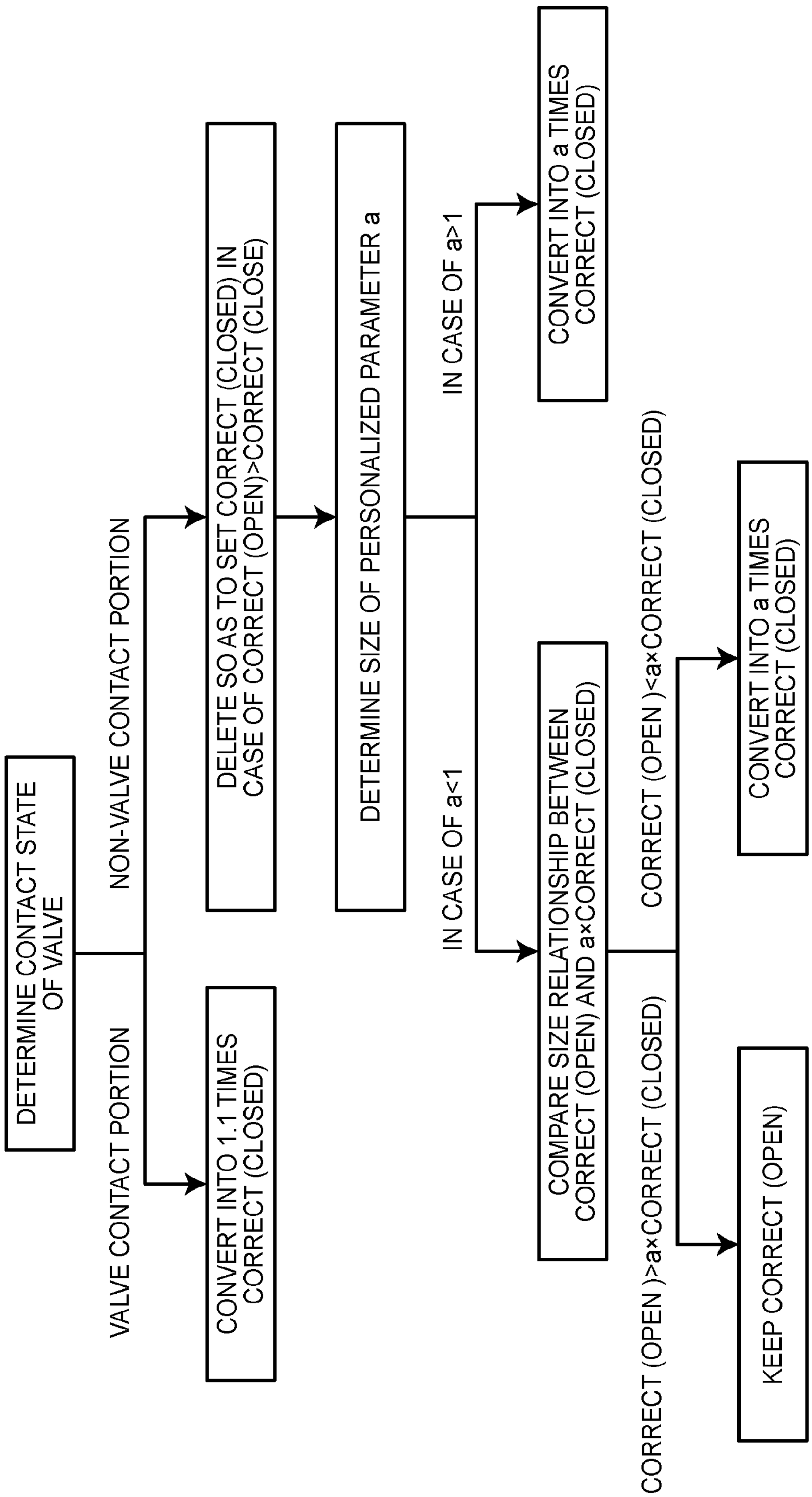
FIG. 8 is a diagram for explaining processing by the shape correction function according to the third embodiment.

8 is a diagram for explaining processing by the shape correction function 414 according to the third embodiment. As illustrated in FIG. 8, the shape correction function 414 first determines the contact state of the valve, and performs different corrections for a portion where the anterior leaflet and the posterior leaflet are in contact (in the drawing, a valve contact portion) and a portion where the anterior leaflet and the posterior leaflet are not in contact (in the drawing, a non-valve contact portion). Here, the shape correction function 414 acquires the length of the mitral valve in the open phase acquired by the shape acquisition function 413 (hereinafter, referred to as a correct (open) length), the length of the mitral valve in the closed phase acquired by the shape acquisition function 413 (hereinafter, referred to as a correct (closed) length), and the size of the mitral valve in the closed phase obtained by simulation (hereinafter, the simulation (closed) length (size)), and performs correction processing using them.

Length Comparison Processing

As described in step S306 in FIG. 7, the shape correction function 414 performs the comparison processing between the correct (open) length and the correct (closed) length. Specifically, the shape correction function 414 performs a comparison processing between the correct (open) length and the correct (closed) length when correcting the non-valve contact portion.

Figure 9A:
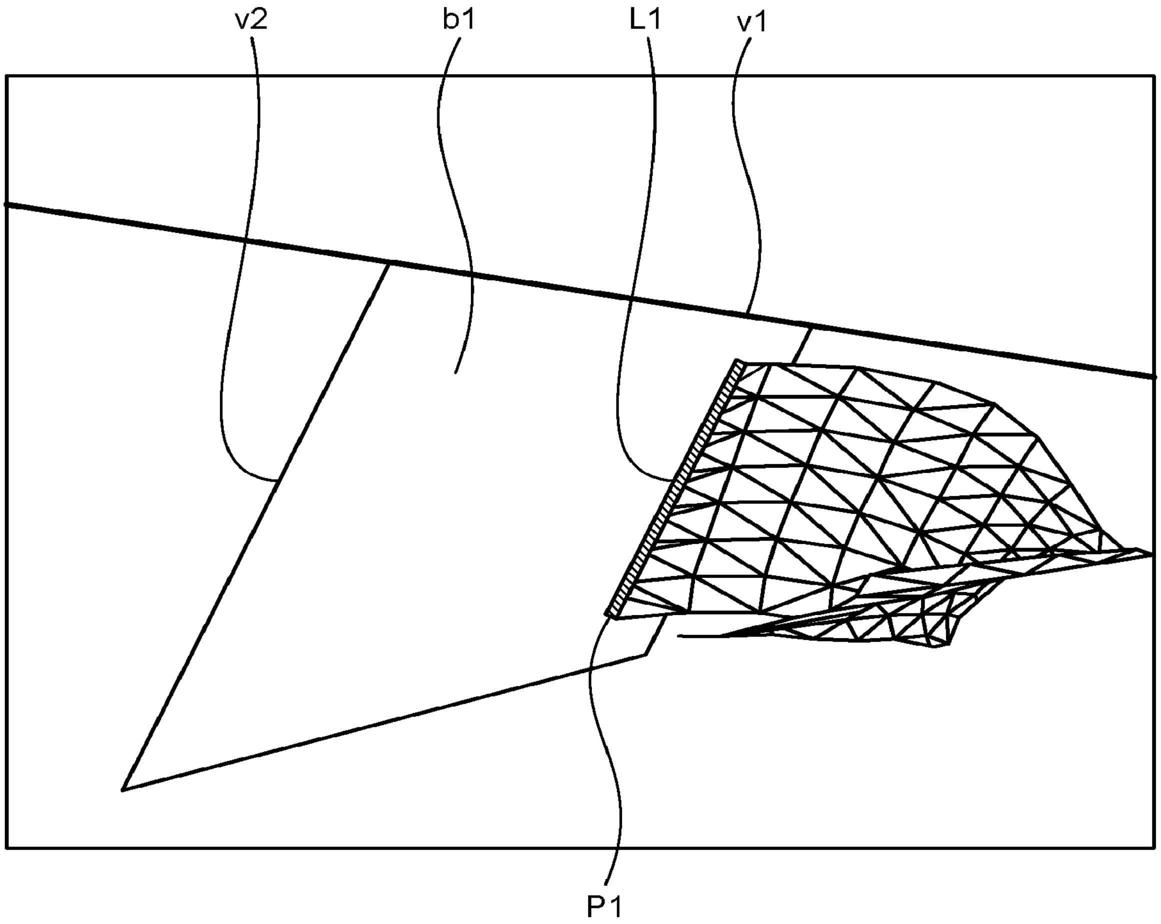
FIG. 9A is a diagram for explaining an example of the length of the valve according to the third embodiment.

Here, the shape correction function 414 uses the length of one point on the valve annulus and the node of the valve leaflet end as the length of the valve. FIG. 9A is a diagram for explaining an example of the length of the valve according to the third embodiment. For example, as illustrated in FIG. 9A, the shape correction function 414 first sets a plane b1 that passes through one node of the valve leaflet end (point P1) and includes a vector v2 perpendicular to the valve annulus plane and a vector v1 connecting the commissure. Then, the shape correction function 414 calculates length L1 of the valve area on the plane b1 as the length of the valve.

The shape correction function 414 calculates the correct (closed) length from the shape of the mitral valve in the open phase and calculates the correct (closed) length from the shape of the mitral valve in the closed phase. Then, the shape correction function 414 compares the calculated lengths. Here, the shape correction function 414 compares lengths of the anterior leaflet and the posterior leaflet at the same node number at the valve leaflet end.

Note that the comparison of the lengths is not limited to the case of comparing with the same node number described above, and may be performed in other points. For example, the shape correction function 414 may register the mitral valve in the open phase and the mitral valve in the closed phase to specify points at corresponding positions and compare the specified points. The shape correction function 414 can also remesh the mesh representing the valve to specify corresponding points and compare the specified points.

Processing of Estimating Length (Size) of Simulation (Closed)

As described in step S307 of FIG. 7, the shape correction function 414 estimates the length (size) of the simulation (closed) based on the shape of the mitral valve in the closed phase obtained by the simulation from the shape of the mitral valve in the open phase. For example, the shape correction function 414 calculates the length of the valve annulus of the mitral valve in the closed phase obtained by the simulation and the volume of a cube surrounding the anterior leaflet and the posterior leaflet as the length (size) of the simulation (closed). The shape correction function 414 also calculates the length of the valve annulus and the volume (hereinafter, described as the correct (closed) size) of cube surrounding the anterior leaflet and the posterior leaflet for the shape of the mitral valve in the closed phase.

Then, the shape correction function 414 calculates a personalized parameter a reflecting the difference between the correct (closed) size and the simulation (closed) size. For example, the shape correction function 414 calculates "a=simulation (closed) size/correct (closed) size". That is, a is larger than 1 in the case of "simulation (closed) size>correct (closed) size", and a is less than 1 in the case of "simulation (closed) size<correct (closed) size". Note that the personalized parameter a is optimized similarly to other parameters (pressure applied to valve, Young's modulus of valve, etc.) at the time of data assimilation.

Length Correction Processing

As described in step S308 of FIG. 7, the shape correction function 414 corrects the correct (open) length based on the contact state of the valve and the valve length. Specifically, the shape correction function 414 calculates the third length obtained by correcting the correct (open) length (second length) that is the length of the valve leaflet in the open phase (first phase) based on the correct (closed) length (first length) that is the length of the valve leaflet in the closed phase (second phase) according to the contact state of the valve. Hereinafter, the valve correction processing for each condition will be described.

First, correction processing in the valve contact portion will be described. The shape correction function 414 corrects the correct (open) length (second length) of the valve contact portion in contact with the valve in the mitral valve in the open phase to a length obtained by converting the correct (closed) length (first length) by a ratio based on the mechanical field. For example, as illustrated in FIG. 8, the shape correction function 414 converts the correct (open) length into 1.1 times the correct (closed) length for the valve contact portion.

Figure 9B:
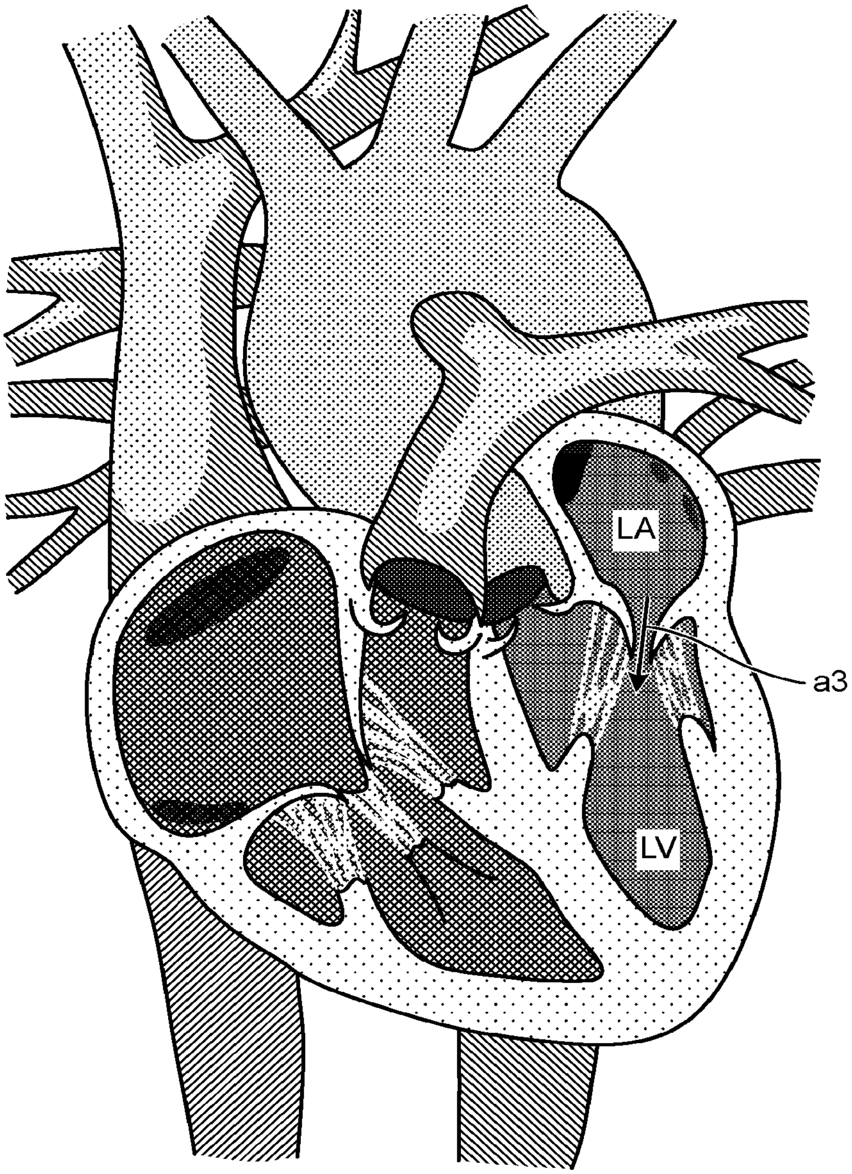
FIG. 9B is a diagram illustrating an example of a stretching direction of the valve according to the third embodiment.

Here, the direction in which the valve is stretched is a direction perpendicular to the approximate plane of the valve annulus and directed from LA to LV. FIG. 9B is a diagram illustrating an example of a stretching direction of the valve according to the third embodiment. For example, as illustrated in FIG. 9B, the shape correction function 414 stretches the tip of the valve in a direction perpendicular to the approximate plane of the valve annulus and from LA toward LV (a direction indicated by an arrow a3). The shape correction function 414 performs the above processing for all the nodes in the valve contact portion.

Note that the direction in which the valve is stretched is not limited to the above-described direction, and the valve may be stretched in other directions. For example, the shape correction function 414 can stretch the tip of the valve in a reverse vector direction opposite to a vector facing the LA direction among vectors formed by a node to be stretched and a node joined to the node. In addition, the shape correction function 414 can stretch the tip of the valve in a reverse vector direction of a vector obtained by acquiring and averaging a plurality of vectors formed by a node to be stretched and a node joined to the node. The shape correction function 414 can also stretch the valve randomly.

Next, correction processing in the non-valve contact portion will be described. The shape correction function 414 corrects the correct (open) length (second length) of the non-valve contact portion with which the valve is not in contact in the mitral valve in the open phase using the ratio between the size of the mitral valve in the shape of the mitral valve in the closed phase (second shape data) and the size of the mitral valve in the shape of the mitral valve obtained by simulation (third shape data).

For example, as illustrated in FIG. 8, the shape correction function 414 sets the correct (open) length as the correct (closed) length in the case of "the correct (open) size>the correct (closed) size" for the non-valve contact portion. Then, the shape correction function 414 determines the size of the personalized parameter a. Here, in the case of "a>1", the shape correction function 414 converts the correct (open) length into "a×correct (closed) length".

On the other hand, in the case of "a<1", the shape correction function 414 compares the size relationship between the correct (open) length and a×correct (closed) length. Here, in the case of "correct (open) length>a×correct (closed) length", the shape correction function 414 keeps the correct (open) length as it is. On the other hand, in the case of "correct (open) length<a×correct (closed) length", the shape correction function 414 converts the correct (open) length into "a×correct (closed) length".

Parameter Estimation Processing/Simulation

As described in step S309 of FIG. 7, the control function 411 estimates the parameter set for the simulation of the mitral valve by data assimilation using the corrected shape of the mitral valve in the open phase and the shape of the mitral valve in the closed phase. Then, as described in step S310 in FIG. 7, the control function 411 estimates the shape of the mitral valve in the closed phase from the shape of the mitral valve in the open phase by simulation using the estimated parameter set.

Result Display Processing

As described in step S311 of FIG. 7, the control function 411 causes the display 33 to display the result of the simulation estimated. For example, the control function 411 displays the shape of the mitral valve and the like. Here, for example, in the region of the mitral valve, the control function 411 can change the color, transmittance, and saturation of the stretched region to be displayed. In addition, the control function 411 can display a resected portion with a different transmittance. Further, the control function 411 can also display a reason for stretching, a reason for resection, and the like.

First Modification

The stretching magnification described in the above embodiment may be dynamically changed according to the disease classification of the valve, the simulation result, the state of the valve, the type of medical image, the type of surgery, the condition of the simulation, and the like. For example, the valve may be 1.2 times in the case of type II, and 1.1 times in the case of type I. In addition, for example, in a case where the valve is not joined in the shape of the mitral valve in the closed phase, it may be 1.2 times. Alternatively, the tension of the chordae tendineae may be estimated, and the length of the valve may be multiplied by M according to the estimated tension of the chordae tendineae. Further, when the vertical stress applied to the valve exceeds the threshold value, the vertical stress may be multiplied by 1.1. In addition, in a case where there is calcification, it may be 1.2 times, and in a case where the valve is wobbled, it may be 1.1 times. Alternatively, the magnification may be changed according to the size of the mesh in the simulation. In addition, for example, a region in which the valve is not stretched, such as a region in which the valve is not stretched in the vicinity of the commissure, may be set.

As described above, according to the third embodiment, the image data acquisition function 412 acquires first medical image data and second medical image data scanned at least at the first timing and at the second timing different from the first timing. The shape acquisition function 413 acquires first shape data related to the structure of interest from the first medical image data and second shape data related to the structure of interest from the second medical image data. The shape correction function 414 corrects the first shape data based on the second shape data. The shape correction function 414 corrects the first shape data based on the mechanical field in the first phase and the second phase and the contact state of the shape of the structure of interest in the second phase. Therefore, the medical image processing apparatus 3*b* according to the third embodiment can appropriately correct shape data, improve parameter estimation accuracy, and appropriately perform simulation.

In addition, according to the third embodiment, the first phase is the open phase of the cardiac valve and the second phase is the closed phase of the cardiac valve, and the shape correction function 414 calculates the third length obtained by correcting the second length that is the length of the valve leaflet in the first phase based on the first length that is the length of the valve leaflet in the second phase. Therefore, the medical image processing apparatus 3*b* according to the third embodiment can appropriately correct shape data of a cardiac valve, and appropriately perform simulation of the cardiac valve.

In addition, according to the third embodiment, the shape correction function 414 corrects the second length of the contact portion with which the valve is in contact in the cardiac valve in the open phase to a length obtained by converting the first length by a ratio based on the mechanical field. Therefore, the medical image processing apparatus 3*b* according to the third embodiment makes it possible to appropriately correct the length of the contact portion in the cardiac valve.

In addition, according to the third embodiment, the control function 411 acquires the third shape data regarding the structure of interest in the closed phase by simulation using the first shape data. The shape correction function 414 corrects the second length of the non-contact portion with which the valve is not in contact in the cardiac valve in the open phase using the ratio between the size of the cardiac valve in the second shape data and the size of the cardiac valve in the third shape data. Therefore, the medical image processing apparatus 3*b* according to the third embodiment makes it possible to appropriately correct the length of the non-contact portion in the cardiac valve.

Fourth Embodiment

In a fourth embodiment, a method for distributing the tension of the chordae tendineae of the cardiac valve and making the shape of the cardiac valve appropriate will be described. As described in the first embodiment, the simulator predicts, for example, a treatment result by a treatment method input by a doctor. As a result, the doctor can accurately predict the result after the treatment, and can improve the accuracy of the treatment plan. For example, a mitral valve simulator for the purpose of predicting the prognosis of a valve replacement operation or a valvuloplasty typically cites or predicts a formula representing a physical property value and a deformation from a literature value for a shape including a mitral valve and chordae tendineae as an object.

Here, the chordae tendineae are thin threads joined to the mitral valve and strongly affect the movement of the valve. The chordae tendineae join the mitral valve and the papillary muscle, and are made of a material having almost no extension, so that the mitral valve is prevented from rolling up to the LA side. There are several types of chordae tendineae, and they differ in junction position, thickness, and the like. Typical examples of the chordae tendineae include a marginal chord, a strut chord, and a basal chord.

As described above, chordae tendineae strongly affect the dynamics of the mitral valve, but it is difficult to completely capture the chordae tendineae in a CT image or an ultrasound image due to their thinness. Thus, data assimilation may estimate where in the mitral valve and how much chordae tendineae are joined. However, since the number of chordae tendineae is considerably large and the number varies depending on the patient, there is a disadvantage that it is difficult to completely model the chordae tendineae and it takes time to estimate the chordae tendineae. Therefore, in existing studies, a representative chordae tendineae model that collectively represents the effects of a plurality of chordae tendineae is often introduced.

However, strong tension is applied to the connection position between the representative chordae tendineae and the valve, and no tension is applied to the non-connection position. Therefore, since the chordae tendineae installation position is strongly pulled by the chordae tendineae, the shape of the valve forms a zigzag pattern, and an error occurs between the simulation result and the actual shape of the mitral valve.

Therefore, in the fourth embodiment, when the tension of the chordae tendineae is calculated, force is distributed to several pixels around the connection position between the representative chordae tendineae and the valve, so that the accuracy of the estimation of the shape of the cardiac valve is improved and the simulation can be appropriately performed.

Figure 10:
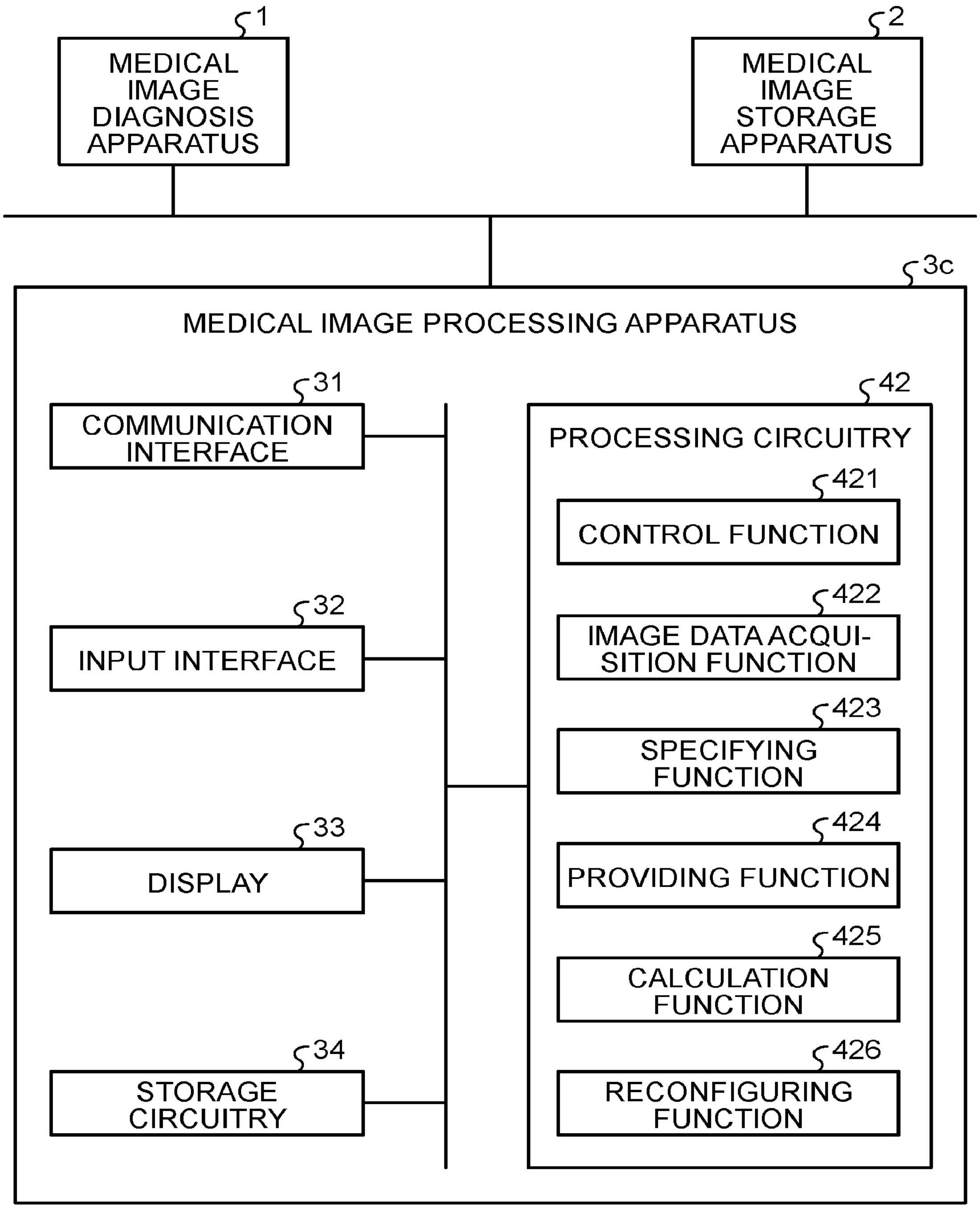
FIG. 10 is a diagram illustrating a configuration example of a medical image processing apparatus according to a fourth embodiment.

FIG. 10 is a diagram illustrating a configuration example of a medical image processing apparatus 3*c* according to the fourth embodiment. For example, as illustrated in FIG. 10, the medical image processing apparatus 3*c* according to the present embodiment is communicably connected to a medical image diagnosis apparatus 1 and a medical image storage apparatus 2 via a network. Note that various other apparatuses and systems may be connected to the network illustrated in FIG. 10.

Here, the fourth embodiment is different from the first embodiment in processing contents by processing circuitry. Hereinafter, an explanation will be given mainly on this point. As illustrated in FIG. 10, the medical image processing apparatus 3*c* includes a communication interface 31, an input interface 32, a display 33, storage circuitry 34, and processing circuitry 42.

As illustrated in FIG. 10, the processing circuitry 42 executes a control function 421, an image data acquisition function 422, a specifying function 423, a providing function 424, a calculation function 425, and a reconfiguring function 426, thereby controlling the entire medical image processing apparatus 3*c*. Here, the image data acquisition function 422 is an example of an acquisition unit. In addition, the specifying function 423 is an example of a specifying unit. In addition, the providing function 424 is an example of a providing unit. The calculation function 425 is an example of a calculation unit. The reconfiguring function 426 is an example of a reconfiguring unit.

The control function 421 controls to generate various GUIs and various display information in response to operations via the input interface 32 and display the generated information on the display 33. For example, the control function 421 causes the display 33 to display a result of processing by each function and the like. Furthermore, the control function 421 can also generate and display various display images on the basis of the medical image acquired by the image data acquisition function 422.

The image data acquisition function 422 acquires a medical image of a subject from the medical image diagnosis apparatus 1 or the medical image storage apparatus 2 via the communication interface 31. Specifically, the image data acquisition function 422 acquires a medical image including morphology information of a three-dimensional anatomical structure (structure of interest) of a region of interest to be processed. Here, the image data acquisition function 422 can also acquire a plurality of medical images obtained by capturing a plurality of images in a three-dimensional time direction. Note that the image data acquisition function 422 can acquire various medical images and store the acquired medical images in the storage circuitry 34, similarly to the image data acquisition function 352 described in the first embodiment.

The specifying function 423 specifies shape data related to the structure of interest included in the medical image. Specifically, the specifying function 423 specifies the shape data of the cardiac valve included in the medical image. Note that the processing by the specifying function 423 will be described in detail later.

The providing function 424 provides data regarding a structure simulating a predetermined anatomical feature to the shape data. Specifically, the providing function 424 provides data related to the chordae tendineae to the shape data of the cardiac valve. Note that the processing by the providing function 424 will be described in detail later.

The calculation function 425 calculates deformation of the shape data based on the mechanical condition caused by the structure. In addition, the calculation function 425 calculates the deformation of the shape data on the basis of the mechanical conditions dispersed by the reconfiguring function 426. Specifically, the calculation function 425 calculates the deformation of the shape data of the cardiac valve on the basis of dispersion points set by the reconfiguring function 426. More specifically, the calculation function 425 can estimate parameters for simulation by data assimilation using dispersion points and perform the simulation using the estimated parameters. Note that the processing by the calculation function 425 will be described in detail later.

The reconfiguring function 426 reconfigures the conditions so as to disperse the mechanical conditions caused by the structure in the vicinity of the junction between the structure and the shape data. Specifically, the reconfiguring function 426 sets the dispersion points so as to disperse the mechanical conditions caused by the chordae tendineae in the vicinity of the junction between the chordae tendineae and the shape data of the cardiac valve. Note that the processing by the reconfiguring function 426 will be described in detail later.

The processing circuitry 42 described above is realized by, for example, a processor. In that case, each processing function described above is stored in the storage circuitry 34 in the form of a program executable by a computer. Then, the processing circuitry 42 reads and executes each program stored in the storage circuitry 34 to implement a function corresponding to each program. In other words, the processing circuitry 42 has each processing function illustrated in FIG. 10 in a state where each program is read out.

Figure 11:
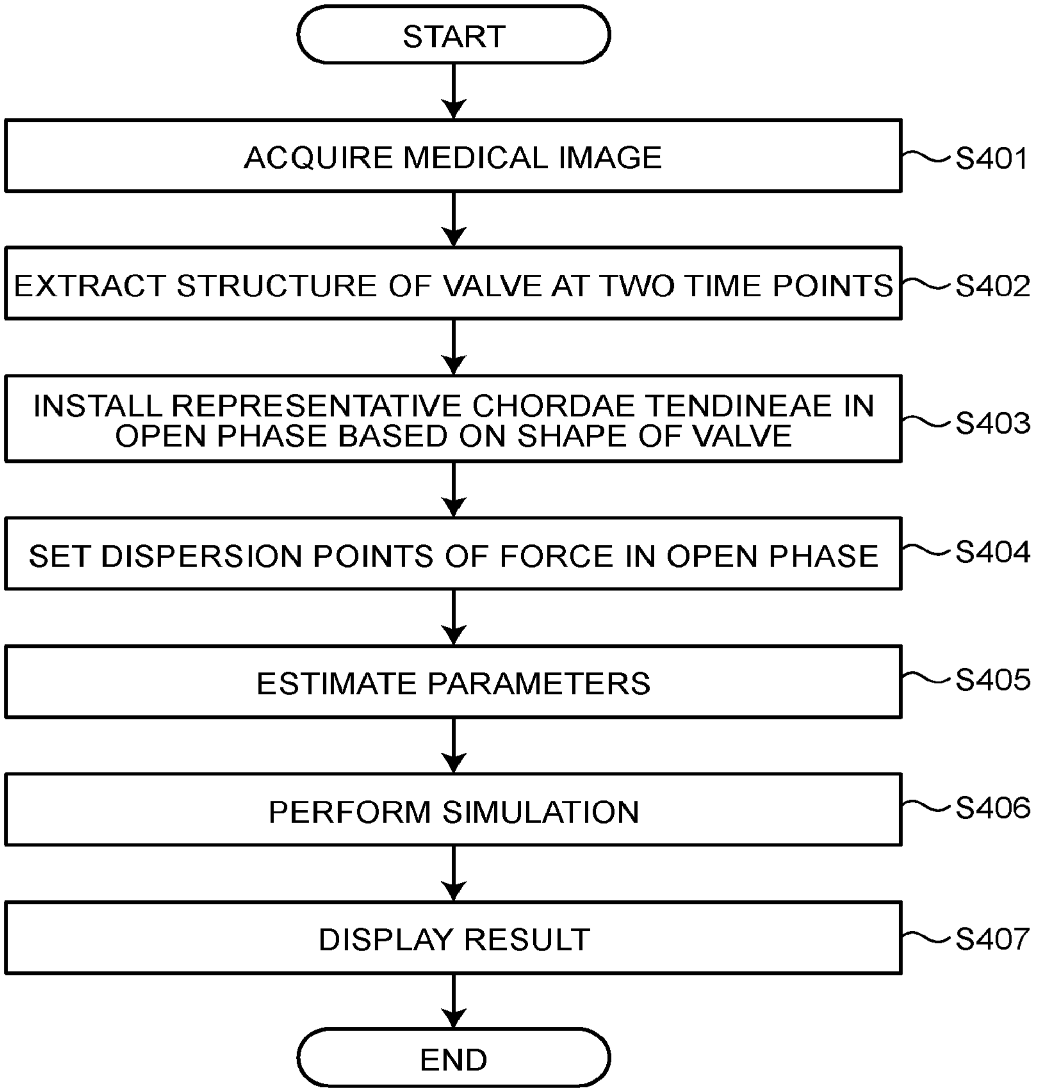
FIG. 11 is a flowchart illustrating a processing procedure of processing performed by each processing function of the processing circuitry of the medical image processing apparatus according to the fourth embodiment.

Next, a procedure of processing by the medical image processing apparatus 3*c* will be described with reference to FIG. 11, and then details of each processing will be described. FIG. 11 is a flowchart illustrating a processing procedure of processing performed by each processing function of the processing circuitry 42 of the medical image processing apparatus 3*c* according to the fourth embodiment.

For example, as illustrated in FIG. 11, in the present embodiment, the image data acquisition function 422 acquires a medical image of the subject from the medical image diagnosis apparatus 1 or the medical image storage apparatus 2 (step S401). Specifically, the image data acquisition function 422 acquires multi-phase medical images including a cardiac valve. This processing is realized, for example, by the processing circuitry 42 calling and executing a program corresponding to the image data acquisition function 422 from the storage circuitry 34.

Subsequently, the specifying function 423 extracts, for the plurality of acquired medical images, a structure of the cardiac valve (structure of interest) at two time points (step S402). This processing is realized, for example, by the processing circuitry 42 calling and executing a program corresponding to the specifying function 423 from the storage circuitry 34.

Subsequently, the providing function 424 installs the representative chordae tendineae in the open phase based on the shape of the cardiac valve (step S403). This processing is realized, for example, by the processing circuitry 42 calling and executing a program corresponding to the providing function 424 from the storage circuitry 34.

Subsequently, the reconfiguring function 426 sets dispersion points of force in the open phase (step S404). This processing is realized, for example, by the processing circuitry 42 calling and executing a program corresponding to the reconfiguring function 426 from the storage circuitry 34.

Subsequently, the calculation function 425 estimates parameters by data assimilation using dispersion points (step S405), and performs simulation (step S406). This processing is realized, for example, by the processing circuitry 42 calling and executing a program corresponding to the calculation function 425 from the storage circuitry 34. Subsequently, the control function 421 displays the result (step S407). This processing is realized, for example, by the processing circuitry 42 calling and executing a program corresponding to the control function 421 from the storage circuitry 34.

Hereinafter, details of each processing executed by the medical image processing apparatus 3*c* will be described. Note that, hereinafter, processing in a case where the mitral valve is the structure of interest will be described as an example. Note that the target of the processing described in the present embodiment is not limited thereto, and for example, an aortic valve, a tricuspid valve, or the like may be the structure of interest. In the following description, a case where a CT image is used will be described as an example, but an MR image or an ultrasound image may be used as a medical image.

Medical Image Acquisition Processing

As described in step S401 of FIG. 11, the image data acquisition function 422 acquires the medical images that include the three-dimensional morphology information of the mitral valve and have been collected at a plurality of time points, in response to the acquisition operation of the medical image via the input interface 32. For example, the image data acquisition function 422 acquires the CT image captured at least at two time points. Here, the CT image to be acquired only needs to include the image of the phase in which the mitral valve is closed and the image of the phase in which the mitral valve is open. For example, the image data acquisition function 422 acquires a mid-systolic CT image as a phase in which the mitral valve is closed. In addition, the image data acquisition function 422 acquires a CT image in the mid-diastolic phase as a phase in which the mitral valve is open.

Note that the image data acquisition function 422 can estimate the mid-diastolic phase or the mid-systolic phase, for example, from an electrocardiogram or the like. Further, the image data acquisition function 422 can estimate the mid-diastolic phase or the mid-systolic phase from the shape of the aortic valve or the shape of the LV. Furthermore, the mid-diastolic phase and the mid-systolic phase are merely examples, and the phase in which the mitral valve is closed needs only to be not the diastole. In addition, the phase in which the mitral valve is open needs only to be not the systole.

Extraction Processing of Structure of Interest

As described in step S402 of FIG. 11, the specifying function 423 extracts the mitral valve for each of the images of two phases (image of the phase in which the mitral valve is closed and image of the phase in which the mitral valve is open) acquired by the image data acquisition function 422. Here, similarly to the feature data acquisition function 353 described in the first embodiment, the specifying function 423 can extract the structure of interest by various methods.

Processing of Installing Representative Chordae Tendineae

As described in step S403 of FIG. 11, the providing function 424 installs the representative chordae tendineae to the mitral valve in the open phase. Specifically, the providing function 424 determines the installation position of the chordae tendineae based on anatomical knowledge based on the shape of the mitral valve. For example, the providing function 424 installs four chordae tendineae in total at the anterior leaflet and the posterior leaflet at the tip of the valve, and eight chordae tendineae in the middle of the valve.

Note that the method of setting the chordae tendineae may be designated by a doctor in addition to the method described above. In addition, a portion to which chordae tendineae should not be attached (valve annulus portion or the like) may be set, and the chordae tendineae may be set in other regions randomly. The valve may also be divided into several regions based on the area, and chordae tendineae designated may be set randomly in the regions. In addition, the type of chordae tendineae (basal chordae, marginal chordae, etc.) may be classified, and the physical property value may be changed according to the type of chordae tendineae. In addition, the position of the chordae tendineae may be subject to data assimilation.

Dispersion Point Installation Processing

As described in step S404 of FIG. 11, the reconfiguring function 426 sets dispersion points of force for the mitral valve in the open phase in which the representative chordae tendineae are installed. For example, the reconfiguring function 426 sets the eight vicinities of the circumference of the installation position of the representative chordae tendineae (five vicinities when representative chordae tendineae are valve tips) as the dispersion points of force, and disperses 1/16 of the force of the tension applied to the installation point of the representative chordae tendineae to the dispersion points.

Figure 12:
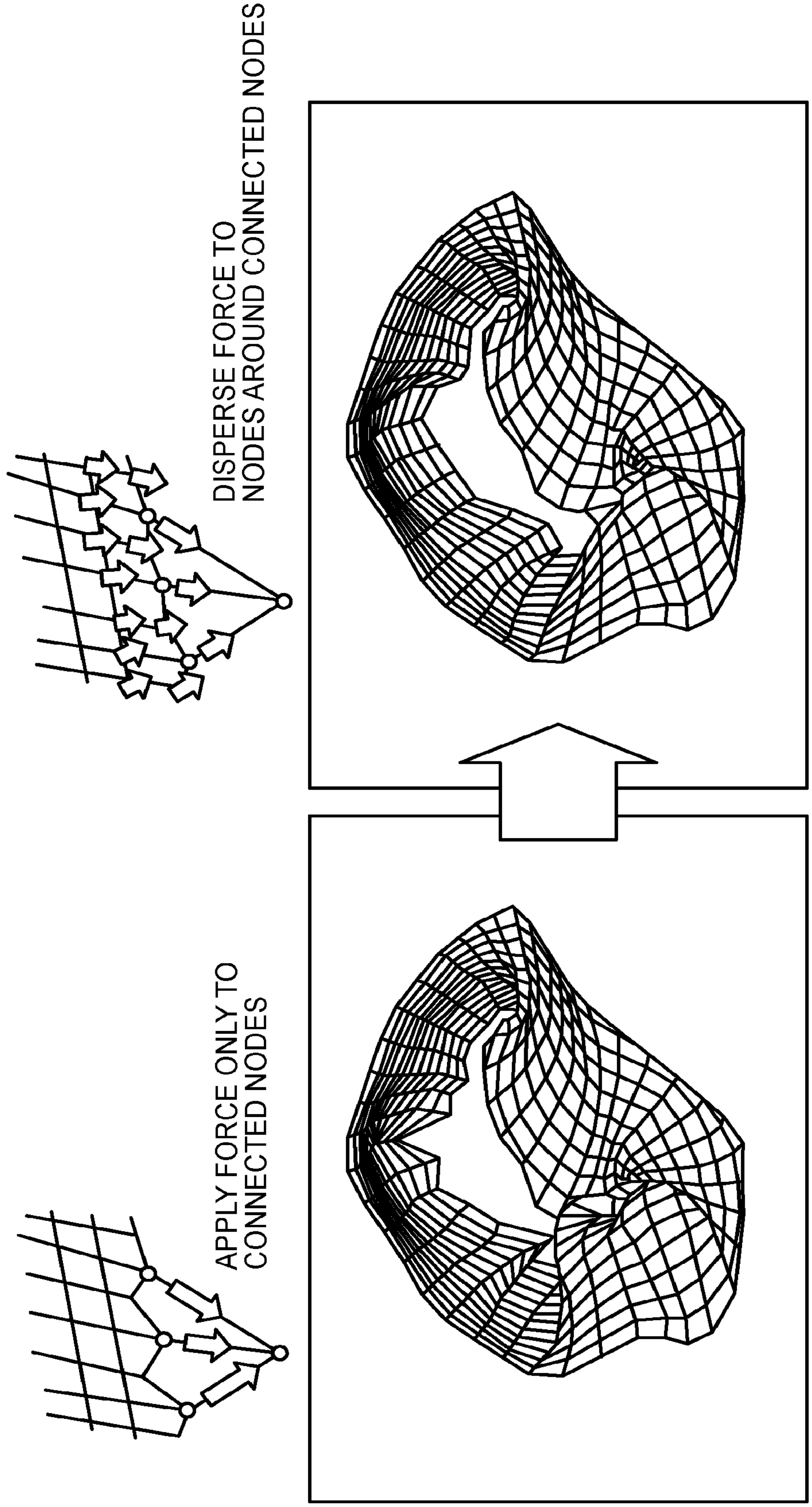
FIG. 12 is a diagram schematically illustrating setting of dispersion points of force with respect to the representative chordae tendineae according to the fourth embodiment.

FIG. 12 is a diagram schematically illustrating setting of dispersion points of force with respect to the representative chordae tendineae according to the fourth embodiment. Additionally, FIG. 12 illustrates an example in which dispersion points are set in the five vicinities of the circumference of the representative chordae tendineae installed at the valve tip. For example, as illustrated in the left diagram of FIG. 12, in a case where the dispersion point is not set, the force is applied only to the connected node points (nodes), and thus, the shape of the valve leaflet end forms a zigzag pattern. On the other hand, as illustrated in the right diagram of FIG. 12, in a case where the dispersion points are set around the representative chordae tendineae and the tension is dispersed, the shape of the valve leaflet end becomes smooth.

The number of dispersion points is not limited to the number described above. For example, the number of vicinities may be determined according to the area of the valve. As an example, the number of dispersion points may be increased as the area of the valve is increased. Further, the position to be dispersed may be changed based on the structure of the valve. For example, when the nearby valve is greatly deviated from the position of the chordae tendineae due to the valve being cut, the dispersion point of the chordae tendineae does not need to be set. In addition, the number of vicinities may be determined according to the stress applied to the valve. For example, when the stress applied to the valve exceeds a threshold value, the dispersion range may be expanded. In addition, the point (node) to be dispersed is not limited to the neighboring point, and may be installed by skipping one point.

In addition, data assimilation may be performed on how many vicinities are set, and data assimilation may be performed on how much dispersion is performed. In addition, the direction of the force may be the direction of the chordae tendineae of the dispersion source, or a vector directed from the dispersion point to the position of the papillary muscle may be used as the direction vector of the force assuming the position of the papillary muscle.

Parameter Estimation Processing

As described in step S405 of FIG. 11, the calculation function 425 estimates simulation parameters by data assimilation using the dispersion points and the tension set by the reconfiguring function 426. Here, for example, FEM, FSI, a particle method, or the like is adopted as the simulation. Note that a simulation parameter that does not undergo data assimilation may be selected among the simulation parameters. For example, whether or not to select one that does not perform data assimilation may be determined by sensitivity, may be set by an empirical rule, or may be set randomly.

The parameter that does not undergo data assimilation may be a value cited from a literature value or the like, or may be set by an empirical rule. In addition, a possible range of the parameter may be set on the basis of a literature value or an empirical rule, and may be randomly set within the range.

The calculation function 425 simulates the mitral valve in the closed phase from the mitral valve in the open phase in which the representative chordae tendineae, dispersion points, and tension are set by the reconfiguring function 426, and performs data assimilation to estimate parameters such that the shapes of the extracted closed phase match.

Simulation

As described in step S406 in FIG. 11, the calculation function 425 estimates the shape of the mitral valve in the closed phase from the shape of the mitral valve in the open phase by simulation using the estimated parameter.

Result Display Processing

As described in step S407 of FIG. 11, the control function 421 causes the display 33 to display the result of the simulation estimated. For example, the control function 421 displays the shape of the mitral valve and the like. Here, for example, the control function 421 can color and display the representative chordae tendineae in which the dispersion points are set. The control function 421 can also display how much force is distributed from which chordae tendineae.

As described above, according to the fourth embodiment, the image data acquisition function 422 acquires medical image data. The specifying function 423 specifies shape data related to the structure of interest included in the medical image data. The providing function 424 provides data regarding a structure simulating a predetermined anatomical feature to the shape data. The calculation function 425 calculates deformation of the shape data based on the mechanical condition caused by the structure. The reconfiguring function 426 reconfigures the conditions so as to disperse the mechanical conditions caused by the structure in the vicinity of the junction between the structure and the shape data. The calculation function 425 calculates the deformation of the shape data on the basis of the mechanical conditions dispersed by the reconfiguring function 426. Therefore, the medical image processing apparatus 3*c* according to the fourth embodiment can disperse the force applied to the shape data, and smooths the shape of the shape data to enable simulation to be appropriately performed.

Furthermore, according to the fourth embodiment, the specifying function 423 specifies the shape data of the cardiac valve included in the medical image data. The providing function 424 provides data related to the chordae tendineae to the shape data of the cardiac valve. The reconfiguring function 426 sets the dispersion points so as to disperse the mechanical conditions caused by the chordae tendineae in the vicinity of the junction between the chordae tendineae and the shape data of the cardiac valve. The calculation function 425 calculates the deformation of the shape data of the cardiac valve on the basis of dispersion points set by the reconfiguring function 426. Therefore, the medical image processing apparatus 3*c* according to the fourth embodiment can disperse the force applied to the cardiac valve from the chordae tendineae, and enables simulation of the cardiac valve to be appropriately performed.

Fifth Embodiment

In a fifth embodiment, a method of introducing an offset error representing a dependent error into a loss function for performing data assimilation will be described. In a simulator of mitral regurgitation, a circuit model is one of the low computational cost approaches. The circuit model is a calculation method specialized for simply modeling blood flow, and represents blood flow as current, blood pressure as voltage, phase difference of blood flow as coil, blood flow resistance as resistance, dilation of blood vessel as compliance, and valve as diode. As a result, for example, the left ventricle can be represented as three components of a resistor, a coil, and a capacitor, or the veins of the whole body can be represented as two components of a resistor and a coil, so that the whole body blood flow can be calculated at a high speed.

Circuit models in the treatment of mitral regurgitation typically represent the mitral valve with a diode and often also represent the resistance of the diode as a function of the valve orifice area. As a result, as the valve orifice area increases, the resistance decreases, and as a result, the blood flow flows.

The simulator can predict the flow volume of the mitral valve at that time, for example, by a doctor predicting the postoperative valve orifice area and inputting the postoperative valve orifice area into the model. As a result, the doctor can accurately predict the result after the treatment, and can improve the accuracy of the treatment plan. Such a simulator is required to have high prediction accuracy. In order to improve the prediction accuracy, data assimilation is performed to identify physical property values unique to the patient so as to match the data by an inverse problem. In the mitral valve simulator, for example, the density of blood flow, the resistance of the left ventricle, and the like apply to the physical property values unique to the patient.

When such a parameter is estimated, values such as a pressure and flow volume in a certain region are measured, and the parameter is optimized so that a simulation result becomes the pressure and the flow volume. Such data assimilation is a technique widely applied to weather prediction, car navigation, and the like. As a parameter update method, there are methods such as a Nelder-Mead method and a Kalman filter. Typically, a CT image of one heartbeat or an ultrasound image of one heartbeat is acquired, and values of volume changes of heart lumens (LV, LA, RV) obtained by segmentation from these images is often used as a measurement value. In addition, the pressures of the maximum value and the minimum value of the aorta are acquired by the cuff pressure, and are also used as measurement values. In addition, the blood flow of the upper arm or the lower limb is acquired by the Doppler, and is also used as a measurement value.

Here, while the cuff pressure can be measured at two time points of the upper and lower points, the measurement values of the volumes of LV, LA and RV, the blood flow of the upper arm and the lower limb, and the like can be measured at a plurality of points in one heartbeat (typically, about 20 points), and thus the measurement points are different. Therefore, in the related art, a loss function is designed using a reciprocal of the number of measurement points of data as a weight. However, in this method, since all errors are treated as independent errors, there is a problem that calculation time is required.

Therefore, in the fifth embodiment, by introducing the offset error represented by the dependent component into the configuration of the loss function, the convergence time is shortened as compared with the case where only the independent component is handled, and the simulation can be appropriately performed.

Figure 13:
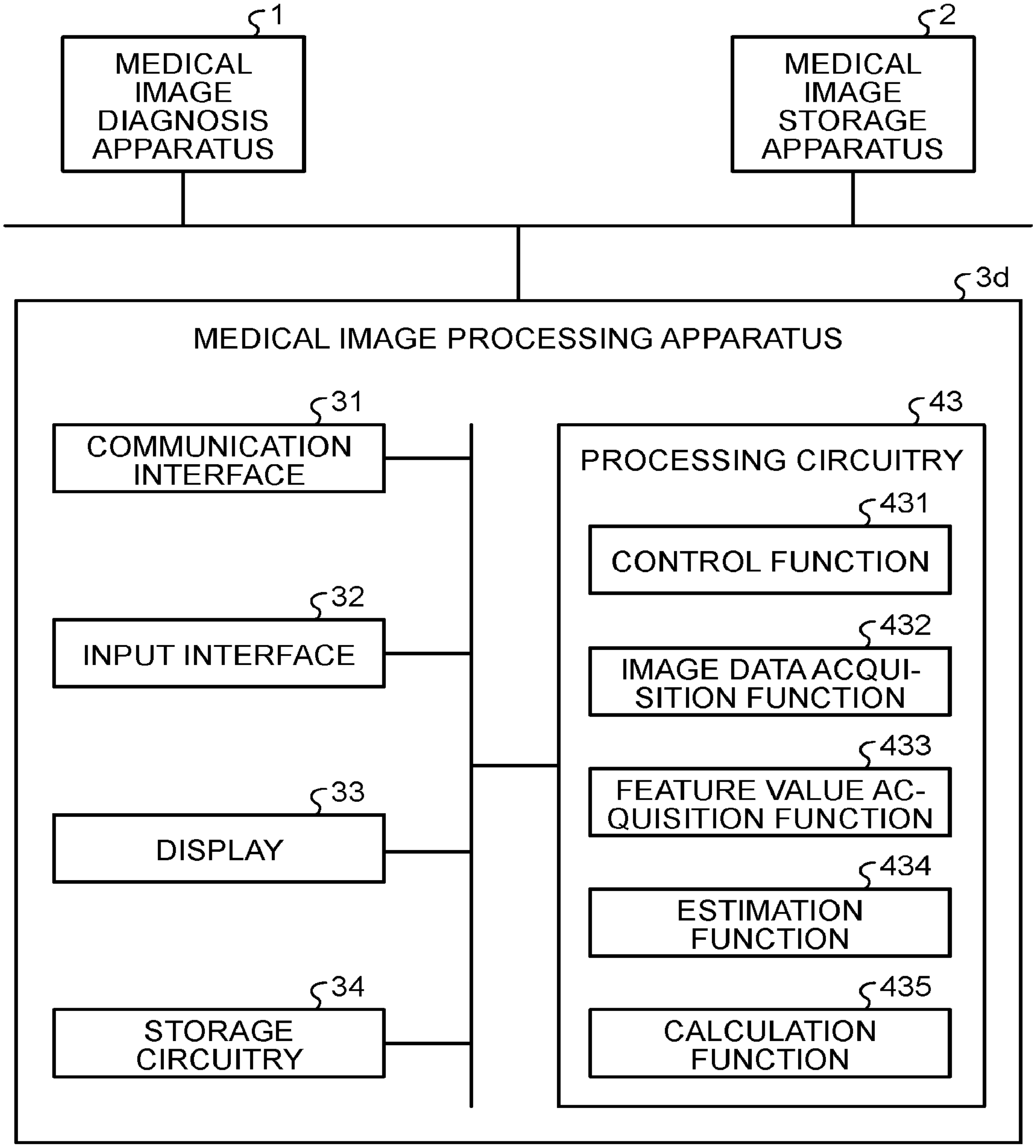
FIG. 13 is a diagram illustrating a configuration example of a medical image processing apparatus according to a fifth embodiment.

FIG. 13 is a diagram illustrating a configuration example of a medical image processing apparatus **3*d* according to the fifth embodiment. For example, as illustrated in FIG. 13, the medical image processing apparatus 3*d* according to the present embodiment is communicably connected to a medical image diagnosis apparatus 1 and a medical image storage apparatus 2 via a network. Note that various other apparatuses and systems may be connected to the network illustrated in FIG. 13**.

Here, the fifth embodiment is different from the first embodiment in processing contents by processing circuitry. Hereinafter, an explanation will be given mainly on this point. As illustrated in FIG. 13, the medical image processing apparatus **3*d* includes a communication interface 31, an input interface 32, a display 33, storage circuitry 34, and processing circuitry 43**.

As illustrated in FIG. 13, the processing circuitry 43 executes a control function 431, an image data acquisition function 432, a feature value acquisition function 433, an estimation function 434, and a calculation function 435, thereby controlling the entire medical image processing apparatus **3*d*. Here, the control function 431 is an example of a clinical information acquisition unit. In addition, the image data acquisition function 432 is an example of an image data acquisition unit. Further, the feature value acquisition function 433 is an example of an acquisition unit. In addition, the estimation function 434 is an example of an estimation unit. The calculation function 435** is an example of a calculation unit.

The control function 431 controls to generate various GUIs and various display information in response to operations via the input interface 32 and display the generated information on the display 33. For example, the control function 431 causes the display 33 to display a result of processing by each function and the like. Furthermore, the control function 431 can also generate and display various display images on the basis of the medical image acquired by the image data acquisition function 432. In addition, the control function 431 can acquire clinical information of the subject from various external apparatuses connected to the network in response to an operation via the input interface 32. For example, the control function 431 acquires the third feature value from the clinical information. Here, the third feature value is, for example, a cuff pressure.

The image data acquisition function 432 acquires a medical image of a subject from the medical image diagnosis apparatus 1 or the medical image storage apparatus 2 via the communication interface 31. Specifically, the image data acquisition function 432 acquires a medical image including morphology information of a three-dimensional anatomical structure (structure of interest) of a region of interest to be processed. Here, the image data acquisition function 432 can also acquire a plurality of medical images obtained by capturing a plurality of images in a three-dimensional time direction. Note that the image data acquisition function 432 can acquire various medical images and store the acquired medical images in the storage circuitry 34, similarly to the image data acquisition function 352 described in the first embodiment.

The feature value acquisition function 433 acquires a first feature value for each phase from multi-phase medical image data. Specifically, the feature value acquisition function 433 acquires the lumen volume of the heart for each phase from the multi-phase medical image data. Note that the processing by the feature value acquisition function 433 will be described in detail later.

The estimation function 434 estimates time-series data of the second feature value related to the first feature value by simulating the multi-phase medical image data. Specifically, the estimation function 434 estimates time-series data indicating a change in the lumen volume of the heart by simulation. Here, the loss function for data assimilation in the simulation includes an offset error and an independent error regarding a change in lumen volume. Alternatively, the loss function includes an offset error, an independent error related to a change in the lumen volume, and an independent error related to the cuff pressure. Note that the processing by the estimation function 434 will be described in detail later.

The calculation function 435 calculates an offset error based on multi-phase data on the basis of the first feature value and the second feature value for each phase. Specifically, the calculation function 435 calculates the offset error based on the lumen volume acquired from each of the multi-phase medical image data and the lumen volume estimated by simulation. Note that the processing by the calculation function 435 will be described in detail later.

The processing circuitry 43 described above is realized by, for example, a processor. In that case, each processing function described above is stored in the storage circuitry 34 in the form of a program executable by a computer. Then, the processing circuitry 43 reads and executes each program stored in the storage circuitry 34 to implement a function corresponding to each program. In other words, the processing circuitry 43 has each processing function illustrated in FIG. 13 in a state where each program is read out.

Figure 14:
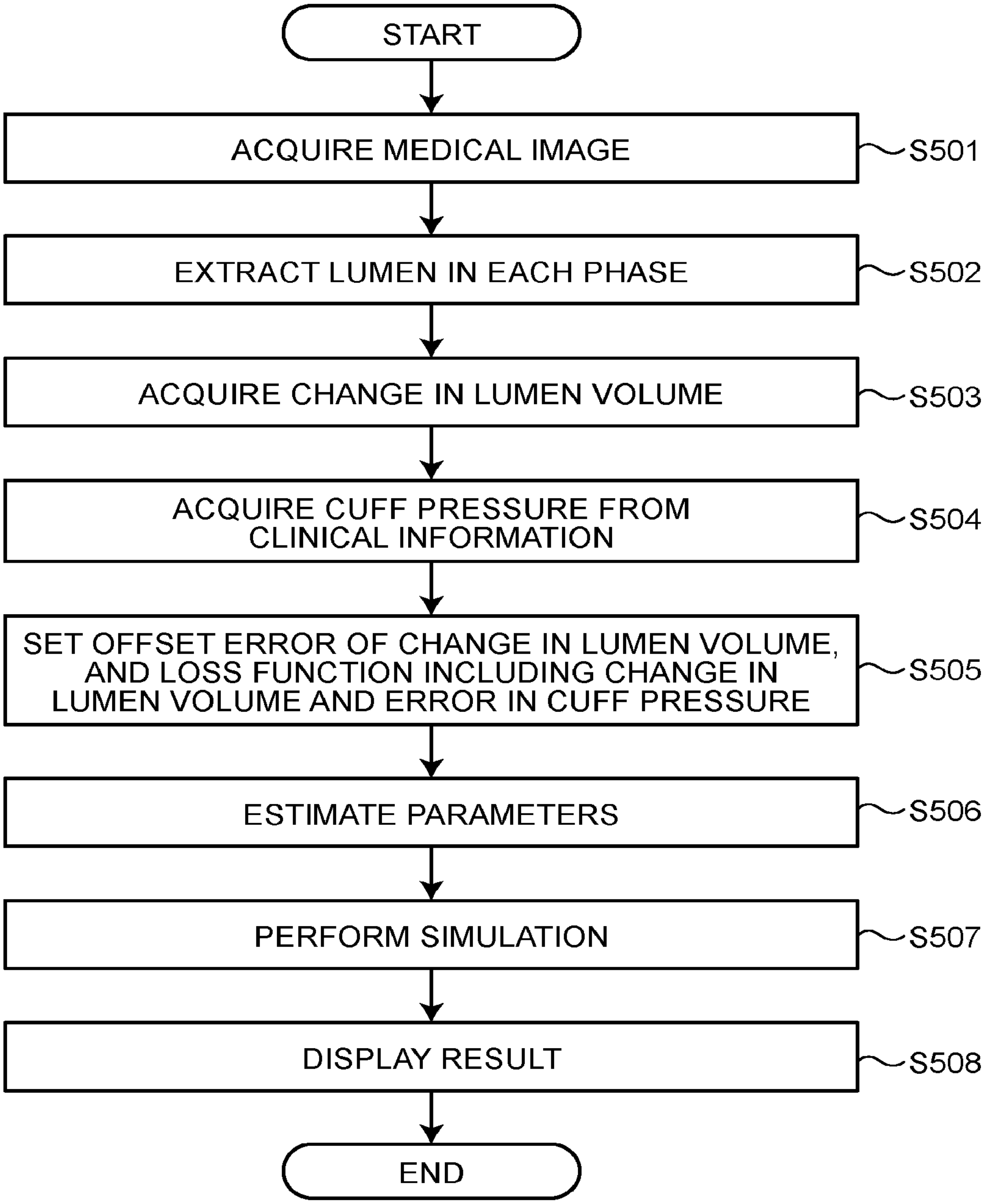
FIG. 14 is a flowchart illustrating a processing procedure of processing performed by each processing function of the processing circuitry of the medical image processing apparatus according to the fifth embodiment.

Next, a procedure of processing by the medical image processing apparatus 3*d* will be described with reference to FIG. 14, and then details of each processing will be described. FIG. 14 is a flowchart illustrating a processing procedure of processing performed by each processing function of the processing circuitry 43 of the medical image processing apparatus 3*d* according to the fifth embodiment.

For example, as illustrated in FIG. 14, in the present embodiment, the image data acquisition function 432 acquires a medical image of the subject from the medical image diagnosis apparatus 1 or the medical image storage apparatus 2 (step S501). Specifically, the image data acquisition function 432 acquires multi-phase medical images including the heart. This processing is realized, for example, by the processing circuitry 43 calling and executing a program corresponding to the image data acquisition function 432 from the storage circuitry 34.

Subsequently, the feature value acquisition function 433 extracts a lumen of the heart (structure of interest) for the acquired multi-phase medical images (step S502), and acquires a change in lumen volume on the basis of the extracted lumen (step S503). This processing is realized, for example, by the processing circuitry 43 calling and executing a program corresponding to the feature value acquisition function 433 from the storage circuitry 34.

Subsequently, the control function 431 acquires the cuff pressure from the clinical information (step S504). This processing is realized, for example, by the processing circuitry 43 calling and executing a program corresponding to the control function 431 from the storage circuitry 34.

Subsequently, the calculation function 435 calculates an offset error of the change in the lumen volume, and sets the offset error, and a loss function including the change in the lumen volume and the error in the cuff pressure (step S505). This processing is realized, for example, by the processing circuitry 43 calling and executing a program corresponding to the calculation function 435 from the storage circuitry 34.

Subsequently, the estimation function 434 estimates parameters by data assimilation using the loss function that has been set (step S506), and performs simulation (step S507). This processing is realized, for example, by the processing circuitry 43 calling and executing a program corresponding to the estimation function 434 from the storage circuitry 34.

Subsequently, the control function 431 displays the result (step S508). This processing is realized, for example, by the processing circuitry 43 calling and executing a program corresponding to the control function 431 from the storage circuitry 34.

Hereinafter, details of each processing executed by the medical image processing apparatus 3*d* will be described. Additionally, although a case where the lumen of the heart is extracted from the CT image will be described below, the medical image may be an MR image or an ultrasound image. In addition, a case where the lumen volume is used as the first feature value acquired from the image will be described, but the first feature value is not limited thereto, and a flow rate of blood flow at a predetermined position may be used.

Medical Image Acquisition Processing

As described in step S501 of FIG. 14, the image data acquisition function 432 acquires the medical images that include the three-dimensional morphology information of the heart and have been collected at a plurality of time points, in response to the acquisition operation of the medical image via the input interface 32. For example, the image data acquisition function 432 acquires the 20-phase CT image captured at 20 time points per one heartbeat.

Extraction Processing of Lumen and Acquisition Processing of Volume Change

As described in step S502 of FIG. 14, the feature value acquisition function 433 extracts the lumen (LV, LA, RV) of the heart and acquires the volume value of the lumen for each of the 20-phase CT images acquired by the image data acquisition function 432. Here, similarly to the feature data acquisition function 353 described in the first embodiment, the feature value acquisition function 433 can extract the lumen of the heart by various methods. When there is a data loss, the volume value of the phase may be excluded. In addition to the above volume, the volume of RA, the volume of LAA, and the like may be used.

As described in step S503 of FIG. 14, the feature value acquisition function 433 acquires a change in lumen volume based on the extracted lumen.

Cuff Pressure Acquisition Processing

As described in step S504 of FIG. 14, the control function 431 acquires the cuff pressure (upper and lower) whose measurement date and time is closest to the CT image capturing date and time from the clinical information. Here, the cuff pressure may be an average of 10 days before and after the CT image capturing date and time. In such a case, the outlier may be excluded with a value of 10 days.

Loss Function Setting Processing

As described in step S505 of FIG. 14, the calculation function 435 sets a loss function including an offset error of the change in the lumen volume, an error of the change in the lumen volume, and the error of the change in the cuff pressure. That is, the calculation function 435 sets a loss function for constructing a circuit model (for example, a circuit model in the treatment of mitral regurgitation). Here, the calculation function 435 can appropriately select a parameter for data assimilation. For example, the calculation function 435 selects a parameter that is highly sensitive to the mitral valve passing flow volume by pre-calculation. The calculation function 435 can also select a parameter on the basis of an empirical rule.

Figure 15:
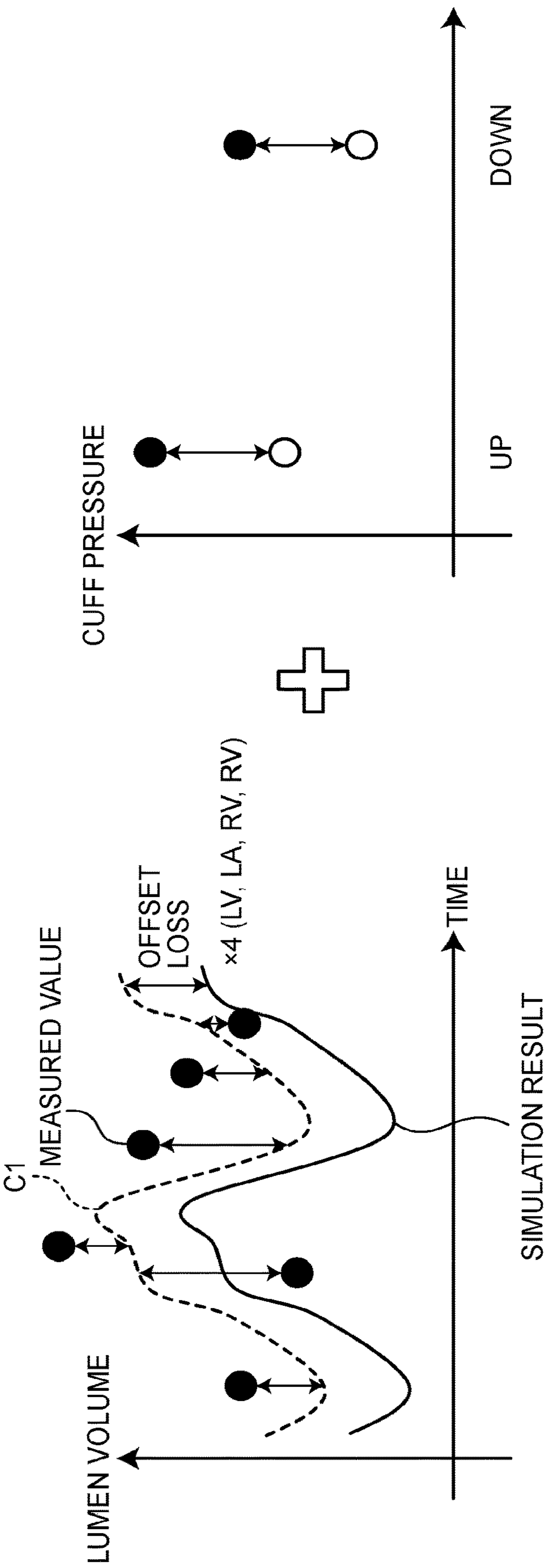
FIG. 15 is a diagram for explaining an example of a configuration of a loss function according to the fifth embodiment.

FIG. 15 is a diagram for explaining an example of a configuration of a loss function according to the fifth embodiment. For example, as illustrated in FIG. 15, the loss function set by the calculation function 435 includes an error of the measured value of the lumen volume, an offset error (offset loss) in the change in the lumen volume, and an error of the cuff pressure. Here, the offset error is an error depending on an image or an error depending on a segmentation algorithm, and is a dependent component of an error uniformly included in the entire measurement value.

Therefore, in the calculation function 435, as illustrated in FIG. 15, optimization is performed so that the distribution of the measured value of the lumen volume matches the distribution of the lumen volume of the simulation result. For example, the calculation function 435 calculates a difference between the distribution of the measured value of the lumen volume and the distribution of the lumen volume of the simulation result, and performs optimization so as to reduce the calculated difference. That is, the loss function includes an offset error in which the curve of the simulation result in FIG. 15 is a curve C1, and optimization is performed using the offset error.

The loss function includes at least an error of the measured value of the lumen volume and an error of the cuff pressure in addition to the offset error representing the dependent component. These errors are independent components, and optimization is performed so that the points coincide with each other. Here, the loss function includes an offset error of each lumen (LV, LA, RV, etc.) of the heart and an error in each phase of the lumen (LV, LA, RV, etc.) of the heart.

Parameter Estimation Processing

As described in step S506 of FIG. 14, the estimation function 434 estimates simulation parameters by data assimilation using the loss function set by the calculation function 435.

Simulation

As described in step S507 of FIG. 14, the estimation function 434 performs simulation using the estimated parameters. For example, the estimation function 434 acquires a simulation result in which the regurgitant volume is predicted by performing a simulation using a valve orifice area value changed by a doctor on the assumption of surgery.

Result Display Processing

As described in step S508 of FIG. 14, the control function 431 causes the display 33 to display the result of the simulation estimated. For example, the control function 431 displays the regurgitant volume of the mitral valve and the like. Here, the control function 431 can also display which variable the offset error is used for when the offset error is used.

First Modification

In the above embodiment, the case where the offset error is set for each lumen of the heart has been described. However, the embodiment is not limited thereto, and for example, one offset error may be set for all the lumens of the heart.

Second Modification

The offset error can be appropriately set according to the situation. For example, when the measured modalities are different, different offset errors may be set. In addition, in a case where the number of measurement points is different, the offset error may be set in a case where there are two times or more of the minimum number of measurement points. Furthermore, in a case where the imaging date and time are different or the segmentation algorithm is different, different offset errors may be set.

As described above, according to the fifth embodiment, the image data acquisition function 432 acquires multi-phase medical image data. The feature value acquisition function 433 acquires a first feature value for each phase from multi-phase medical image data. The estimation function 434 estimates time-series data of the second feature value related to the first feature value by simulating the multi-phase medical image data. The calculation function 435 calculates an offset error based on multi-phase data on the basis of the first feature value and the second feature value for each phase. The loss function of the estimation unit includes an offset error and an independent error related to the first feature value. Therefore, the medical image processing apparatus 3*d* according to the fifth embodiment can accelerate convergence of optimization, and enables simulation to be appropriately performed.

In addition, according to the fifth embodiment, the feature value acquisition function 433 acquires the lumen volume of the heart for each phase from the multi-phase medical image data. The estimation function 434 estimates time-series data indicating a change in the lumen volume of the heart by simulation. The calculation function 435 calculates the offset error based on the lumen volume acquired from each of the multi-phase medical image data and the lumen volume estimated by simulation. Therefore, the medical image processing apparatus 3*d* according to the fifth embodiment enables simulation related to the cardiac valve appropriately to be performed.

In addition, according to the fifth embodiment, the control function 431 acquires the third feature value from the clinical information. The loss function of the estimation unit includes an offset error, an independent error related to the first feature value, and an independent error related to the third feature value. Therefore, the medical image processing apparatus 3*d* according to the fifth embodiment enables simulation including clinical information to be appropriately performed.

In addition, according to the fifth embodiment, the control function 431 acquires the cuff pressure as the third feature value. Therefore, the medical image processing apparatus 3*d* according to the fifth embodiment can reduce the error of the lumen volume by the loss function including the offset error, reduce the imbalance between the error of the cuff pressure and the error of the lumen volume due to the data amount, and enable simulation to be appropriately performed.

Sixth Embodiment

In a sixth embodiment, a method of estimating an error of a simulation prediction result will be described. As described in the fifth embodiment, in a simulator of mitral regurgitation, a circuit model is one of the low computational cost approaches.

Circuit models in the treatment of mitral regurgitation typically represent the mitral valve with a diode and often also represent the resistance of the diode as a function of the valve orifice area. As a result, as the valve orifice area increases, the resistance is reduced, and a phenomenon in which a blood flow (current) flows more can be represented. In addition, the temporal change of the valve orifice area is represented by, for example, a maximum value and a minimum value of the valve orifice area, and an index indicating how the valve orifice area changes during one heartbeat. Thus, the change in the valve orifice area of one beat in various states of various patients can be represented by three variables.

As described in the fifth embodiment, the simulator can predict the flow volume of the mitral valve at that time, for example, by a doctor predicting the postoperative valve orifice area and inputting the postoperative valve orifice area into the model. As a result, the doctor can accurately predict the result after the treatment, and can improve the accuracy of the treatment plan. In such a simulator, in order to improve the prediction accuracy, data assimilation is performed to identify physical property values unique to the patient so as to match the data by an inverse problem.

Here, data assimilation is a method capable of estimating a parameter of a patient, but it is known in principle that errors are included or estimation results vary due to various factors. For example, when an error is included in the measured value, the estimation accuracy of the parameter decreases. Further, the optimization has initial value dependency, and different initial values may cause different parameter estimation results. In addition, parameters that do not undergo data assimilation are cited from literature values and the like, but since the values vary depending on the cited literature, it is conceivable that different parameter estimation results can be obtained depending on the cited values.

As described above, since the parameters obtained by the data assimilation include errors and variations, the mitral valve passing flow volume calculated using the parameters obtained by the data assimilation also has errors and variations. However, in the conventional simulation method, the prediction value is given at one point, and an error or variation is not considered.

In addition, in clinical practice, MR grade is known as a classification representing the degree of mitral regurgitation. MR grade is set in ESC guidelines and the like, and the severity of mitral valve regurgitation is classified into three stages (mild, moderate, severe) based on a plurality of measured values including the regurgitant orifice area and the regurgitant volume. However, there is no method of representing an estimation result estimated with an error or variation using MR grade.

Therefore, in the sixth embodiment, the reliability of the prediction result can be presented by estimating the error of the prediction result of the simulation, and the simulation can be appropriately performed.

Figure 16:
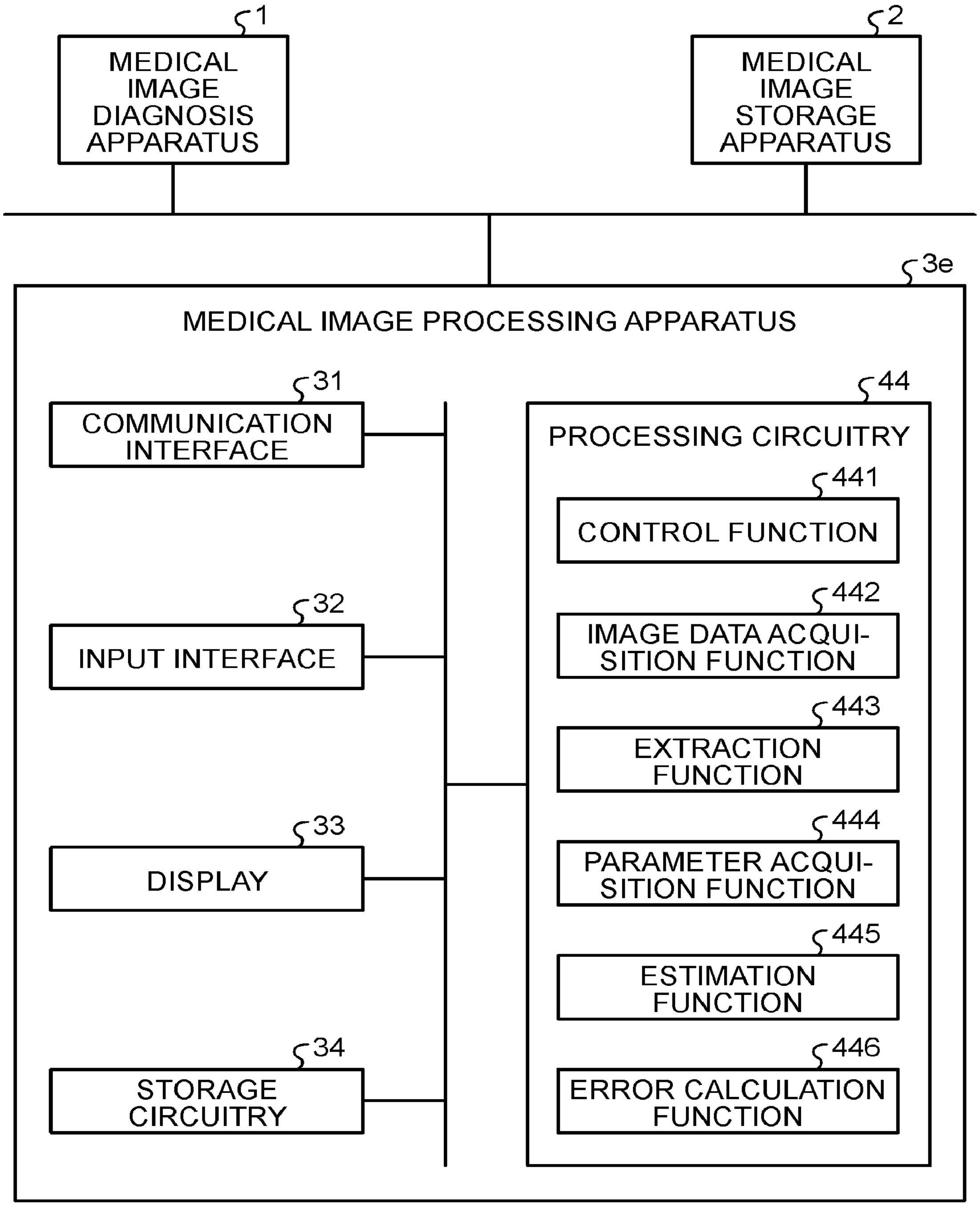
FIG. 16 is a diagram illustrating a configuration example of a medical image processing apparatus according to a sixth embodiment.

FIG. 16 is a diagram illustrating a configuration example of a medical image processing apparatus 3*e* according to the sixth embodiment. For example, as illustrated in FIG. 16, the medical image processing apparatus 3*e* according to the present embodiment is communicably connected to a medical image diagnosis apparatus 1 and a medical image storage apparatus 2 via a network. Note that various other apparatuses and systems may be connected to the network illustrated in FIG. 16.

Here, the sixth embodiment is different from the first embodiment in processing contents by processing circuitry. Hereinafter, an explanation will be given mainly on this point. As illustrated in FIG. 16, the medical image processing apparatus 3*e* includes a communication interface 31, an input interface 32, a display 33, storage circuitry 34, and processing circuitry 44.

As illustrated in FIG. 16, the processing circuitry 44 executes a control function 441, an image data acquisition function 442, an extraction function 443, a parameter acquisition function 444, an estimation function 445, and an error calculation function 446, thereby controlling the entire medical image processing apparatus 3*e*. Here, the control function 441 is an example of a control unit. In addition, the image data acquisition function 442 is an example of an acquisition unit. In addition, the extraction function 443 is an example of an extraction unit. In addition, the parameter acquisition function 444 is an example of a parameter acquisition unit. In addition, the estimation function 445 is an example of an estimation unit. The error calculation function 446 is an example of an error calculation unit.

The control function 441 controls to generate various GUIs and various display information in response to operations via the input interface 32 and display the generated information on the display 33. For example, the control function 441 causes the display 33 to display a result of processing by each function and the like. Furthermore, the control function 441 can also generate and display various display images on the basis of the medical image acquired by the image data acquisition function 442. In addition, the control function 441 displays display information indicating an overall error in the first feature value. In addition, the control function 441 displays display information indicating the disease classification determined on the basis of the first feature value including the overall error. Note that the processing by the control function 441 will be described in detail later.

The image data acquisition function 442 acquires a medical image of a subject from the medical image diagnosis apparatus 1 or the medical image storage apparatus 2 via the communication interface 31. Specifically, the image data acquisition function 442 acquires a medical image including morphology information of a three-dimensional anatomical structure (structure of interest) of a region of interest to be processed. Here, the image data acquisition function 442 can also acquire a plurality of medical images obtained by capturing a plurality of images in a three-dimensional time direction. Note that the image data acquisition function 442 can acquire various medical images and store the acquired medical images in the storage circuitry 34, similarly to the image data acquisition function 352 described in the first embodiment.

The extraction function 443 extracts the structure of interest on the basis of the medical image data. Specifically, the extraction function 443 extracts the lumen volume of the heart or the cardiac valve for each phase from the multi-phase medical image data. Note that the processing by the extraction function 443 will be described in detail later.

The parameter acquisition function 444 acquires a plurality of parameters to be input to the prediction model of the structure of interest. Specifically, the parameter acquisition function 444 acquires a plurality of predetermined measurement values and an initial value of optimization. Here, the plurality of predetermined measurement values are parameters whose numerical values are fixed in the optimization of the prediction model. In addition, the initial value of the optimization is a parameter whose numerical value is optimized in the optimization of the prediction model. That is, the parameter acquisition function 444 acquires a parameter that does not undergo data assimilation and a parameter that performs data assimilation. Note that the processing by the parameter acquisition function 444 will be described in detail later.

The estimation function 445 estimates a first feature value related to the structure of interest by inputting a plurality of parameters to the prediction model. Specifically, the estimation function 445 sets a numerical range for at least two of a plurality of predetermined measurement values, an initial value of optimization, and an extraction result of a structure of interest, and estimates the first feature value using a prediction model optimized under each condition in which a numerical value is changed in the set numerical range. Note that the processing by the estimation function 445 will be described in detail later.

The error calculation function 446 calculates an error of the first feature value. Specifically, the error calculation function 446 calculates at least two errors among an error based on a plurality of predetermined measurement values, an optimization initial value error and an extraction error of the structure of interest by the extraction function 443, and calculates an overall error based on the at least two errors. Note that the processing by the error calculation function 446 will be described in detail later.

The processing circuitry 44 described above is realized by, for example, a processor. In that case, each processing function described above is stored in the storage circuitry 34 in the form of a program executable by a computer. Then, the processing circuitry 44 reads and executes each program stored in the storage circuitry 34 to implement a function corresponding to each program. In other words, the processing circuitry 44 has each processing function illustrated in FIG. 16 in a state where each program is read out.

Figure 17:
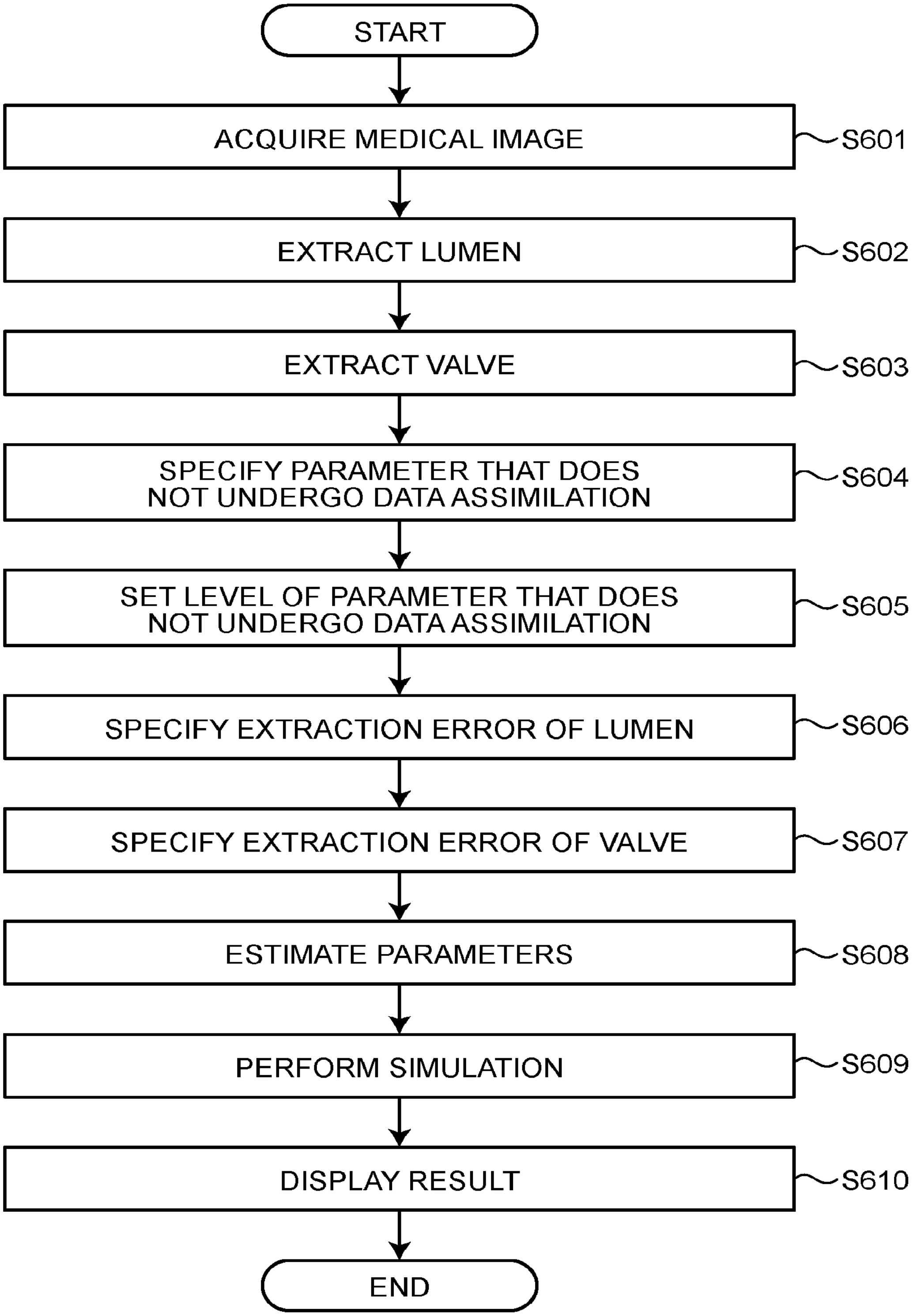
FIG. 17 is a flowchart illustrating a processing procedure of processing performed by each processing function of the processing circuitry of the medical image processing apparatus according to the sixth embodiment.

Next, a procedure of processing by the medical image processing apparatus 3*e* will be described with reference to FIG. 17, and then details of each processing will be described. FIG. 17 is a flowchart illustrating a processing procedure of processing performed by each processing function of the processing circuitry 44 of the medical image processing apparatus 3*e* according to the sixth embodiment.

For example, as illustrated in FIG. 17, in the present embodiment, the image data acquisition function 442 acquires a medical image of the subject from the medical image diagnosis apparatus 1 or the medical image storage apparatus 2 (step S601). Specifically, the image data acquisition function 442 acquires multi-phase medical images including the heart. This processing is realized, for example, by the processing circuitry 44 calling and executing a program corresponding to the image data acquisition function 442 from the storage circuitry 34.

Subsequently, the extraction function 443 extracts the lumen of the heart for the acquired multi-phase medical images (step S602) and extracts the cardiac valve (step S603). This processing is realized, for example, by the processing circuitry 44 calling and executing a program corresponding to the extraction function 443 from the storage circuitry 34.

Subsequently, the parameter acquisition function 444 specifies a parameter that does not undergo data assimilation (step S604). This processing is realized, for example, by the processing circuitry 44 calling and executing a program corresponding to the parameter acquisition function 444 from the storage circuitry 34.

Subsequently, the estimation function 445 sets a level of a parameter that does not undergo data assimilation (step S605), specifies an extraction error of the lumen (step S606), and specifies an extraction error of the cardiac valve (step S607). This processing is realized, for example, by the processing circuitry 44 calling and executing a program corresponding to the estimation function 445 from the storage circuitry 34.

Subsequently, the estimation function 445 estimates the parameters by data assimilation using the set parameter level, the extraction error of the lumen/cardiac valve, and the initial value having leeway (step S608). This processing is realized, for example, by the processing circuitry 44 calling and executing a program corresponding to the estimation function 445 from the storage circuitry 34.

Subsequently, the estimation function 445 performs a simulation using each parameter (step S609), and the error calculation function 446 calculates an error on the basis of a plurality of simulation results. This processing is realized, for example, by the processing circuitry 44 calling and executing a program corresponding to the estimation function 445 and the error calculation function 446 from the storage circuitry 34.

Subsequently, the control function 441 displays the result (step S610). This processing is realized, for example, by the processing circuitry 44 calling and executing a program corresponding to the control function 441 from the storage circuitry 34.

Hereinafter, details of each processing executed by the medical image processing apparatus 3*e* will be described. Additionally, although a case where the lumen of the heart and the cardiac valve are extracted from the CT image will be described below, the medical image may be an MR image or an ultrasound image.

Medical Image Acquisition Processing

As described in step S601 of FIG. 17, the image data acquisition function 442 acquires the medical images that include the three-dimensional morphology information of the heart and have been collected at a plurality of time points, in response to the acquisition operation of the medical image via the input interface 32. For example, the image data acquisition function 442 acquires the 20-phase CT image captured at 20 time points per one heartbeat.

Extraction Processing of Lumen

As described in step S602 of FIG. 17, the extraction function 443 extracts the lumen (LV, LA, RV) of the heart and calculates the volume of the lumen ($mm^3$) for each of the 20-phase CT images acquired by the image data acquisition function 442. Here, similarly to the feature data acquisition function 353 described in the first embodiment, the extraction function 443 can extract the lumen of the heart by various methods. Note that it is desirable to extract the lumen in all the 20 phases, but in a case where the accuracy is not good or in a case where it is desired to reduce the calculation time, the lumen may be extracted only in a part of the phases. In addition to the above volume, the volume of RA, the volume of LAA, and the like may be used.

In addition, the blood flow rate of the brachial artery, the artery of the lower limb, or the carotid artery may be acquired by the Doppler echocardiographic method. Regarding the blood flow rate, it is conceivable to acquire measured values by time-discrete points at equal intervals in one heartbeat.

Extraction Processing of Valve

As described in step S603 of FIG. 17, the extraction function 443 extracts the mitral valve for the CT images acquired by the image data acquisition function 442. Additionally, similarly to the feature data acquisition function 353 described in the first embodiment, the extraction function 443 can extract the mitral valve by various methods. Here, the extraction function 443 extracts the mitral valve in the mid-systolic phase and the mid-diastolic phase, and acquires the valve orifice area ($mm^2$). Note that the phase of extracting the mitral valve is not limited to the mid-systolic phase and the mid-diastolic phase. For example, one of the phases in which the mitral valve is closed or regurgitation is occurring may be selected instead of mid-systolic phase. Also, instead of mid-diastolic phase, one of the phases in which the mitral valve is open may be selected.

Parameter Specifying Processing

As described in step S604 of FIG. 17, the parameter acquisition function 444 specifies a parameter that does not undergo data assimilation among the parameters of the circuit model. Here, as the parameter that does not undergo data assimilation, for example, sensitivity calculation for the mitral valve passing flow volume is performed in advance, and a parameter that has low sensitivity and does not greatly affect the mitral valve passing flow volume is selected. For example, the parameter acquisition function 444 specifies a parameter that does not undergo data assimilation on the basis of the result of the sensitivity calculation described above. Alternatively, for example, the parameter acquisition function 444 can specify a parameter that does not perform data assimilation on the basis of an empirical rule, or can specify a parameter that does not undergo data assimilation on the basis of randomly set information. Note that the circuit model according to the present embodiment may be the one selected from, for example, several documents that report modeling of systematic blood flow and valve opening and closing.

Parameter Level Setting Processing

As described in step S605 of FIG. 17, the estimation function 445 sets the level of the parameter that does not undergo data assimilation. Specifically, the estimation function 445 first selects a parameter for changing the level among parameters that do not undergo data assimilation. Here, as the parameter that changes the level, for example, sensitivity calculation for the mitral valve passing flow volume is performed in advance, and a parameter that does not relatively greatly affect the mitral valve passing flow volume is selected among the parameters that do not undergo data assimilation. For example, the estimation function 445 selects the parameter for changing the level on the basis of the result of the sensitivity calculation described above. Alternatively, for example, the estimation function 445 can select a parameter for changing the level on the basis of an empirical rule, or can select a parameter for changing the level on the basis of randomly set information. Note that the values of the parameters not to change the level may be cited from literature values or the like, may be set on the basis of empirical rules, or may be set randomly.

Then, the estimation function 445 sets a level for the parameter for changing the level. For example, when the literature describes an average and a variance of parameter values, the estimation function 445 sets three levels of "average−variance", "average", and "average+variance". Further, in a case where there is no description of average and variance in the literature, the estimation function 445 sets a level of "literature value±10%". Furthermore, the estimation function 445 can also set a level of "literature value×2" or "literature value×3" depending on the parameter. Alternatively, three levels of "average−variance", "average", and "average+variance" may be set using a value and a variance set on the basis of an empirical rule. Note that the level to be changed is not limited to three levels.

Setting Processing of Initial Simplex Parameter for Data Assimilation

The estimation function 445 sets a level to be changed for the above-described parameters that do not undergo data assimilation. Further, the estimation function 445 sets a plurality of initial simplexes for parameters to be subjected to data assimilation. Here, an initial simplex is an initial value of a parameter group to be estimated when a multi-start optimization method such as a Nelder-Mead method is performed. For example, in a case where three parameters to be predicted are {a, b, c}, each of the initial values {a1, b1, c1} of a, b, and c is referred to as an initial simplex. Normally, about 10 to 20 initial simplexes are prepared for performing optimization.

For example, when setting the initial simplexes, a range of possible values of each parameter is set in advance from literature values or the like. The estimation function 445 randomly select the plurality of initial simplexes for parameters from the set range. Alternatively, the estimation function 445 divides the possible range into three, and sets any of the initial simplexes to be necessarily included in each of the three classifications. Alternatively, the estimation function 445 sets a Gaussian distribution in which the center of the range of possible values is an average and half of the range of possible values is 3σ, and select the plurality of initial simplexes for parameters based on the Gaussian distribution. Alternatively, the estimation function 445 can change the range of possible values of the parameter according to the patient. For example, since it is conceivable that the artery becomes harder as the age increases, the compliance of the blood vessel may be set to be small.

Setting Processing of Extraction Error of Lumen and Valve

As described in steps S606 and S607 in FIG. 17, the estimation function 445 sets an extraction error of the lumen and an extraction error of the mitral valve. For example, the estimation function 445 sets the lumen error and the valve segmentation error to ±1 pixel. In addition, the estimation function 445 can also set the lumen by including an error of ±10% or the like.

Here, the estimation function 445 can also change the value of the error according to the modality. For example, the estimation function 445 can also set the error in the case of CT as ±1 pixel and the error in the case of ultrasonography as ±2 pixel. Note that an error may be designated by a doctor. In addition, the value of the error may be changed according to the segmentation method. In addition, an error may be set on the basis of an empirical rule. In addition, the error may be changed depending on the phase. For example, the error may be set to be large in a phase in which the left ventricle moves at a high speed. Furthermore, it may be changed depending on the image quality or the contrast density.

When the error is set as described above, the estimation function 445 sets volume of the lumen and valve orifice areas within a range of the error in plural times.

Parameter Estimation Processing

As described in step S608 of FIG. 17, the estimation function 445 estimates simulation parameters by data assimilation. Specifically, the estimation function 445 performs data assimilation by changing the level of a parameter that does not undergo data assimilation for each initial simplex in each of lumen volume and valve orifice areas that are set in plural times. That is, the estimation function 445 performs data assimilation under various conditions for the lumen volume and the valve orifice area, the initial simplex, and the parameter that does not undergo data assimilation, and estimates the parameter under each condition.

Simulation

As described in step S609 of FIG. 17, the estimation function 445 performs simulation using the estimated parameters. Specifically, the estimation function 445 performs simulation using parameters estimated for each condition. For example, the estimation function 445 acquires a simulation result obtained by predicting the regurgitant volume under each condition by performing simulation using the parameter of each condition.

The error calculation function 446 calculates an error using the simulation result predicted by the estimation function 445. For example, the error calculation function 446 calculates an average and a variance of the prediction result of the regurgitant volume. As an example, the error calculation function 446 calculates an error due to variation of an initial simplex, an error due to segmentation, an error due to a parameter that does not perform data assimilation, and the like from a simulation result under each condition.

Result Display Processing

Figure 18:
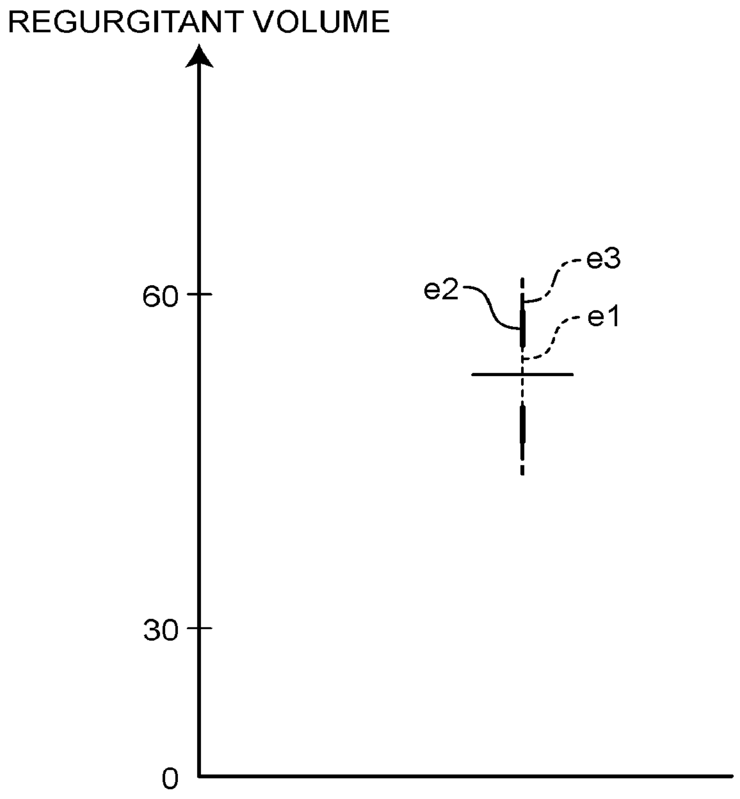
FIG. 18 is a diagram illustrating an example of display information according to the sixth embodiment.

As described in step S610 of FIG. 17, the control function 441 causes the display 33 to display the result of the simulation estimated. For example, the control function 441 displays an error for the regurgitant volume of the mitral valve. FIG. 18 is a diagram illustrating an example of display information according to the sixth embodiment. For example, as illustrated in FIG. 18, the control function 441 displays a graph in which the variance calculated for the prediction result of the regurgitant volume is indicated by an error bar. Here, as illustrated in FIG. 18, the control function 441 can color-code and display e1 indicating an error due to a segmentation error, e2 indicating an error due to an initial simplex variation, and e3 indicating an error due to a parameter that does not undergo data assimilation.

In addition, the control function 441 can collectively display some errors in the same color coding. For example, the control function 441 can color the segmentation error as a whole. In addition, the control function 441 can also display a level when the maximum value is taken and a level when the minimum value is taken side by side.

The control function 441 can also display the classification of the disease based on the error. Specifically, the control function 441 represents MR grade in five classifications of mild, mild-moderate, moderate, moderate-severe, and severe based on the calculated error. For example, the control function 441 determines which one of the five classifications the simulation result applies to, based on the classification to which the minimum value and the maximum value belong, among the plurality of calculated regurgitant volume results.

For example, when the minimum value of the obtained regurgitant volume is mild and the maximum value of the obtained regurgitant volume is moderate, the control function 441 classifies the obtained regurgitant volume as mild-moderate. When both the minimum value and the maximum value of the obtained regurgitant volume are moderate, the control function 441 classifies the obtained regurgitant volume as moderate. When the diseases are classified, the control function 441 can display not only the error bars but also the classifications.

First Modification

In the above embodiment, the case where the parameters are estimated for all the levels has been described, but the embodiment is not limited thereto, and the parameter does not need to be estimated for a level at which it is known that the result of the simulation is not minimum or maximum.

Second Modification

In a case where the minimum value is mild and the maximum value is severe, it may be displayed that the error is too large. Furthermore, an error that can be reduced may be displayed. For example, the segmentation error can be reduced by changing the modality or manually segmenting. In addition, the size of the error bar after the error is reduced may be displayed.

As described above, according to the sixth embodiment, the image data acquisition function 442 acquires medical image data. The extraction function 443 extracts the structure of interest on the basis of the medical image data. The parameter acquisition function 444 acquires a plurality of parameters to be input to the prediction model of the structure of interest. The estimation function 445 estimates a first feature value related to the structure of interest by inputting a plurality of parameters to the prediction model. The error calculation function 446 calculates an error of the first feature value. The error calculation function 446 calculates at least two errors among an error based on a plurality of predetermined measurement values, an optimization initial value error and an extraction error of the structure of interest by the extraction unit, and calculates an overall error based on the at least two errors. Therefore, the medical image processing apparatus **3*e*** according to the sixth embodiment can estimate an error for each factor, and enables simulation to be appropriately performed.

In addition, according to the sixth embodiment, the estimation function 445 sets a numerical range for at least two of a plurality of predetermined measurement values, an initial value of optimization, and an extraction result of a structure of interest, and estimates the first feature value using a prediction model optimized under each condition in which a numerical value is changed in the set numerical range. The error calculation function 446 calculates at least two errors based on the first feature value under each condition. Therefore, the medical image processing apparatus **3*e*** according to the sixth embodiment can estimate an error for each factor.

Further, according to the sixth embodiment, the plurality of predetermined measurement values are parameters whose numerical values are fixed in the optimization of the prediction model. Therefore, the medical image processing apparatus **3*e*** according to the sixth embodiment enables an error due to a parameter that does not undergo data assimilation to be estimated.

In addition, according to the sixth embodiment, the initial value of the optimization is an initial value of a parameter whose numerical value is optimized in the optimization of the prediction model. Therefore, the medical image processing apparatus **3*e*** according to the sixth embodiment enables an error due to an initial simplex to be estimated.

In addition, according to the sixth embodiment, the control function 441 displays display information indicating an overall error in the first feature value. Therefore, the medical image processing apparatus **3*e*** according to the sixth embodiment enables error information to be provided.

In addition, according to the sixth embodiment, the control function 441 displays display information indicating the disease classification determined on the basis of the first feature value including the overall error. Therefore, the medical image processing apparatus **3*e*** according to the sixth embodiment enables the prediction result with an error to be represented using the disease classification.

Seventh Embodiment

In a seventh embodiment, a method for simply estimating the flow volume of the mitral valve will be described. As described in the fifth embodiment, in a simulator of mitral regurgitation, a circuit model is one of the low computational cost approaches.

Circuit models in the treatment of mitral regurgitation typically represent the mitral valve with a diode and often also represent the resistance of the diode as a function of the valve orifice area. As a result, as the valve orifice area increases, the resistance is reduced, and a phenomenon in which a blood flow (current) flows more can be represented. In addition, the temporal change of the valve orifice area is represented by, for example, a maximum value and a minimum value of the valve orifice area, and an index indicating how the valve orifice area changes during one heartbeat. Thus, the change in the valve orifice area of one beat in various states of various patients can be represented by three variables.

The simulator can predict the flow volume of the mitral valve at that time, for example, by a doctor predicting the postoperative valve orifice area and inputting the postoperative valve orifice area into the model. As a result, the doctor can accurately predict the result after the treatment, and can improve the accuracy of the treatment plan. However, it is not always possible to acquire the measurement value used for the circuit model, and there is no method for simply estimating the regurgitant volume even with a small amount of data.

Therefore, in the seventh embodiment, by assuming the flow volume of the mitral valve in the early-systolic phase, the valve orifice area in the early-systolic phase, the time when the maximum pressure occurs, and the pressure gradient between the left ventricle and the left atrium, it is possible to estimate the regurgitant volume of the mitral valve from the measurement value of the valve orifice area in the open phase, the measurement value of the valve orifice area in the closed phase, and the measurement value of the cuff pressure.

Figure 19:
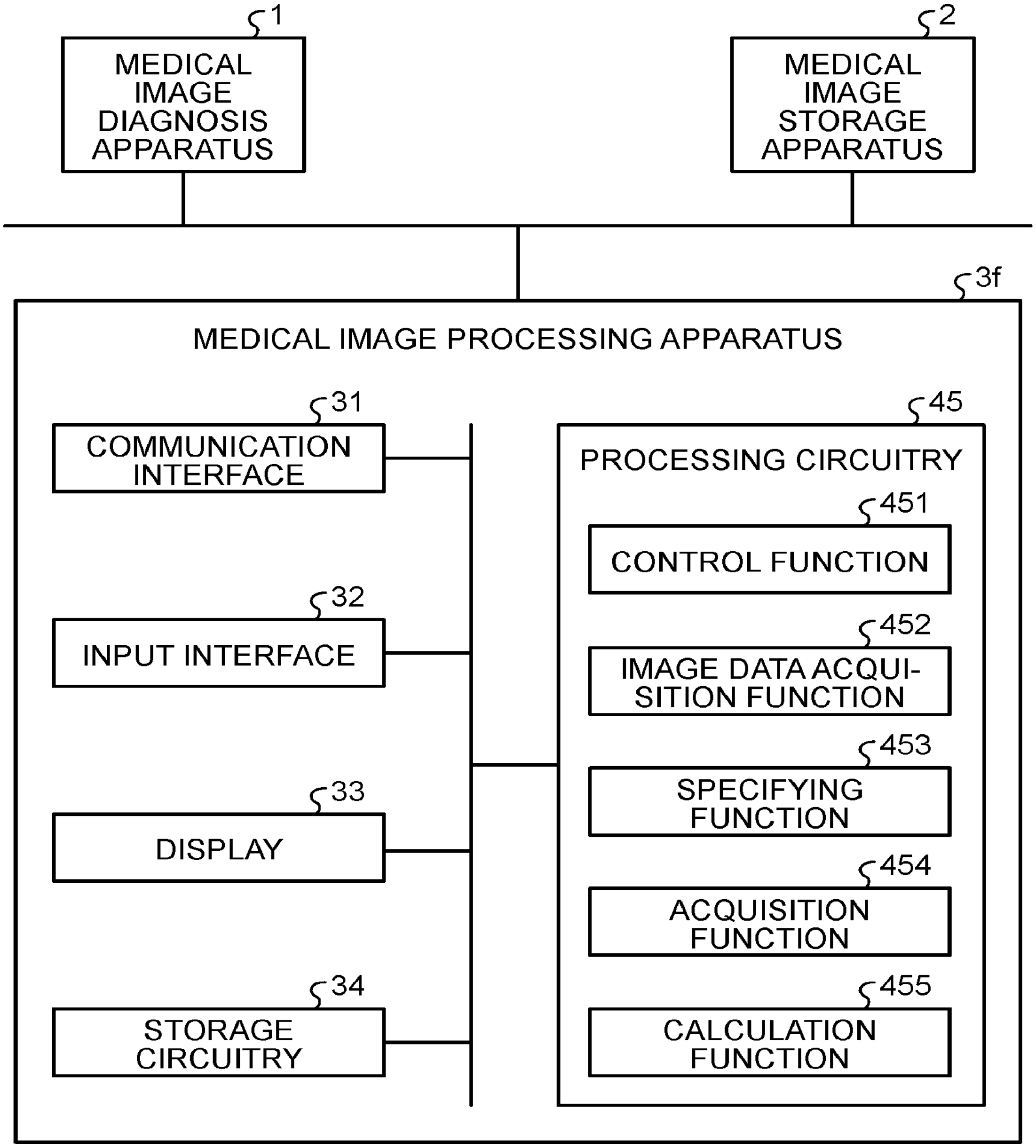
FIG. 19 is a diagram illustrating a configuration example of a medical image processing apparatus according to a seventh embodiment.

FIG. 19 is a diagram illustrating a configuration example of a medical image processing apparatus **3*f* according to the seventh embodiment. For example, as illustrated in FIG. 19, the medical image processing apparatus 3*f* according to the present embodiment is communicably connected to a medical image diagnosis apparatus 1 and a medical image storage apparatus 2 via a network. Note that various other apparatuses and systems may be connected to the network illustrated in FIG. 19**.

Here, the seventh embodiment is different from the first embodiment in processing contents by processing circuitry. Hereinafter, an explanation will be given mainly on this point. As illustrated in FIG. 19, the medical image processing apparatus 3*f* includes a communication interface 31, an input interface 32, a display 33, storage circuitry 34, and processing circuitry 45.

As illustrated in FIG. 19, the processing circuitry 45 executes a control function 451, an image data acquisition function 452, a specifying function 453, an acquisition function 454, and a calculation function 455, thereby controlling the entire medical image processing apparatus 3*f*. Here, the image data acquisition function 452 is an example of an image data acquisition unit. In addition, the specifying function 453 is an example of a specifying unit. Further, the acquisition function 454 is an example of an acquisition unit. In addition, the calculation function 455 is an example of a calculation unit.

The control function 451 controls to generate various GUIs and various display information in response to operations via the input interface 32 and display the generated information on the display 33. For example, the control function 451 causes the display 33 to display a result of processing by each function and the like. Furthermore, the control function 451 can also generate and display various display images on the basis of the medical image acquired by the image data acquisition function 452.

The image data acquisition function 452 acquires a medical image of a subject from the medical image diagnosis apparatus 1 or the medical image storage apparatus 2 via the communication interface 31. Specifically, the image data acquisition function 452 acquires medical images of at least two phases. Note that the image data acquisition function 452 can acquire various medical images and store the acquired medical images in the storage circuitry 34, similarly to the image data acquisition function 352 described in the first embodiment.

The specifying function 453 specifies first feature value in medical image data of at least two phases. Specifically, the specifying function 453 specifies the valve orifice area in the medical image data of the open phase of the mitral valve and the valve orifice area in the medical image data of the closed phase of the mitral valve. Note that the processing by the specifying function 453 will be described in detail later.

The acquisition function 454 acquires the second feature value from the clinical information. Specifically, the acquisition function 454 acquires the cuff pressure from the clinical information. Note that the processing by the acquisition function 454 will be described in detail later.

The calculation function 455 calculates a third feature value based on the first feature value and the second feature value. Specifically, the calculation function 455 calculates a pressure gradient between the left atrium and the left ventricle based on the second feature value, calculates the flow rate in the early-systolic phase and a valve orifice area in the early-systolic phase based on the first feature value and the second feature value, and calculates a third feature value based on the pressure gradient, the first feature value, the second feature value, the flow volume in the early-systolic phase, and the valve orifice area in the early-systolic phase. More specifically, the calculation function 455 calculates the flow volume in the mitral valve based on the pressure gradient, the valve orifice area in the open phase, the valve orifice area in the closed phase, the flow volume in the early-systolic phase, and the valve orifice area in the early-systolic phase. Note that the processing by the calculation function 455 will be described in detail later.

The processing circuitry 45 described above is realized by, for example, a processor. In that case, each processing function described above is stored in the storage circuitry 34 in the form of a program executable by a computer. Then, the processing circuitry 45 reads and executes each program stored in the storage circuitry 34 to implement a function corresponding to each program. In other words, the processing circuitry 45 has each processing function illustrated in FIG. 19 in a state where each program is read out.

Figure 20:
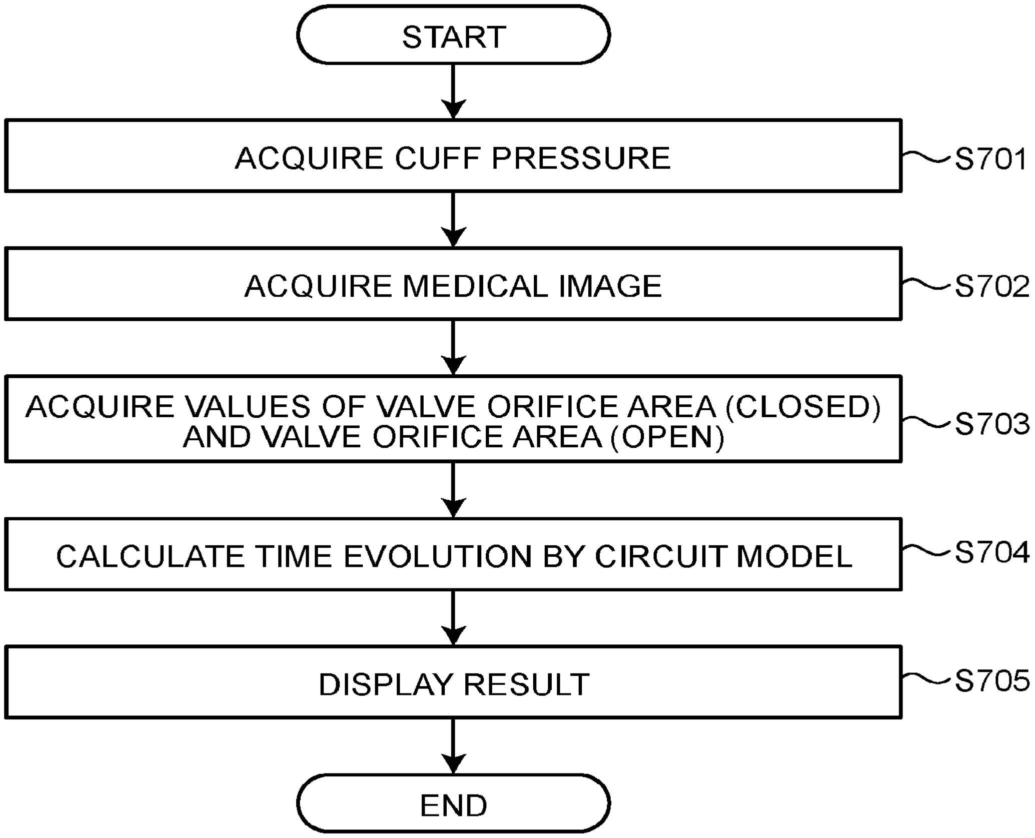
FIG. 20 is a flowchart illustrating a processing procedure of processing performed by each processing function of the processing circuitry of the medical image processing apparatus according to the seventh embodiment.

Next, a procedure of processing by the medical image processing apparatus 3*f* will be described with reference to FIG. 20, and then details of each processing will be described. FIG. 20 is a flowchart illustrating a processing procedure of processing performed by each processing function of the processing circuitry 45 of the medical image processing apparatus 3*f* according to the seventh embodiment.

For example, as illustrated in FIG. 20, in the present embodiment, the acquisition function 454 acquires the cuff pressure from the clinical information (step S701). This processing is realized, for example, by the processing circuitry 45 calling and executing a program corresponding to the acquisition function 454 from the storage circuitry 34.

Subsequently, the image data acquisition function 452 acquires a medical image of the subject from the medical image diagnosis apparatus 1 or the medical image storage apparatus 2 (step S702). Specifically, the image data acquisition function 452 acquires medical images of at least two phases. This processing is realized, for example, by the processing circuitry 45 calling and executing a program corresponding to the image data acquisition function 452 from the storage circuitry 34.

Subsequently, the specifying function 453 extracts the mitral valve from the acquired medical image of two phases, and acquires values of the valve orifice area (closed) which is the valve orifice area in the closed phase and the valve orifice area (open) which is the valve orifice area in the open phase (step S703). This processing is realized, for example, by the processing circuitry 45 calling and executing a program corresponding to the specifying function 453 from the storage circuitry 34.

Subsequently, the calculation function 455 calculates the time evolution by the circuit model (step S704). Specifically, the calculation function 455 calculates the flow volume of the mitral valve. This processing is realized, for example, by the processing circuitry 45 calling and executing a program corresponding to the calculation function 455 from the storage circuitry 34.

Hereinafter, details of each processing executed by the medical image processing apparatus 3*f* will be described. Additionally, although a case where the lumen of the heart and the cardiac valve are extracted from the CT image will be described below, the medical image may be an MR image or an ultrasound image.

Cuff Pressure Acquisition Processing

As described in step S701 of FIG. 20, the acquisition function 454 acquires the cuff pressure (upper and lower) whose measurement date and time is closest to the CT image capturing date and time from the clinical information. Here, the cuff pressure may be an average of 10 days before and after the CT image capturing date and time. In such a case, the outlier may be excluded with a value of 10 days.

Medical Image Acquisition Processing

As described in step S702 of FIG. 20, the image data acquisition function 452 acquires the medical images that include the three-dimensional morphology information of the heart and have been collected at least at two time points, in response to the acquisition operation of the medical image via the input interface 32. For example, the image data acquisition function 442 acquires CT images collected in the closed phase of the mitral valve and CT images collected in the open phase of the mitral valve.

Acquisition Processing of Valve Orifice Area

As described in step S703 of FIG. 20, the specifying function 453 extracts the mitral valve for the CT images acquired by the image data acquisition function 452. Additionally, similarly to the feature data acquisition function 353 described in the first embodiment, the specifying function 453 can extract the mitral valve by various methods. Here, the specifying function 453 extracts the mitral valve in the open phase and the closed phase, and acquires the valve orifice area ($mm^2$) in each phase.

Flow Volume Calculation Processing by Time Evolution Equation

As described in step S704 of FIG. 20, the calculation function 455 calculates the regurgitant volume in the mitral valve using the time evolution equation of the circuit model. Here, the calculation function 455 assumes that the valve orifice area at the early-systolic phase is "18%" of the valve orifice area in the phase in which the mitral valve is open. In addition, the calculation function 455 assumes that the flow volume in the early-systolic phase is "−5 ml". Furthermore, the calculation function 455 assumes that the pressure gradient between the left atrium and the left ventricle (LA-LV pressure gradient) is maximized at "0.13 seconds". Furthermore, the calculation function 455 assumes that the maximum left ventricular pressure in systole is the maximum value of the cuff pressure and the pressure in the left atrium in systole is "0", so that the temporal change of the LA-LV pressure gradient changes in a quadratic curve of 0 mmHg→an upper value of the cuff pressure. Based on the above assumption, the calculation function 455 calculates a formula of a circuit model expressed by the following formula (1) to calculate the regurgitant volume.

$$P_p - P_d = B_{valve} \cdot Q_{valve} \cdot |Q_{valve}| + L_{valve} \cdot \frac{dQ_{valve}}{dt}, \tag{1}$$

$$L_{valve} = \frac{\rho_{bl} \cdot l_{eff}}{A_{eff}},\ B_{valve} = \frac{\rho_{bl}}{2A_{eff}^2}$$

$$A_{eff}(t) = [A_{eff,max}(t) - A_{eff,min}(t)] \cdot \zeta(t) + A_{eff,min}(t),$$

$$\begin{cases} \dfrac{d\zeta}{dt} = (1-\zeta) \cdot K_{vo}(P_p - P_d) & (P_p - P_d > 0) \\ \dfrac{d\zeta}{dt} = \zeta \cdot K_{vc}(P_p - P_d) & (P_p - P_d < 0) \end{cases},$$

Here, "$Q_{valve}$" in Formula (1) is the mitral valve passing flow volume, "$P_P$" is the left ventricular pressure, "$P_d$" is the left atrial pressure, "$\beta_{b1}$" is the blood density (constant), "$l_{eff}$", "$K_{VO}$", and "$K_{VC}$" are constants (obtained from literature values), "ζ" is a variable (when ζ=1, the mitral valve opens the most, and when ζ=0, the mitral valve closes the most) taken between 0 and 1 and related to the opening degree of the valve opening of the mitral valve, "$A_{eff}$" is the valve orifice area of the mitral valve, "$L_{valve}$" is a function of "$A_{eff}$", "$l_{eff}$", and "$\rho_{b1}$", and "$B_{valve}$" is a function of "$\rho_{b1}$" and "$A_{eff}$".

As shown in Formula (1), the pressure difference between the left atrium and the left ventricle is determined by the square value of the flow volume and the time change of the flow volume. The calculation function 455 calculates the regurgitant volume by substituting a numerical value into the time evolution equation of Formula (1). As described above, in the present embodiment, the calculation is performed assuming the valve orifice area at the early-systolic phase, the flow volume in the early-systolic phase, the time when the LA-LV pressure gradient is maximized, and the time change in the LA-LV pressure gradient. That is, the calculation function 455 calculates the flow volume of the mitral valve in order from the flow volume in the early-systolic phase to the late-systolic phase due to time evolution based on Formula (1), and specifies the maximum regurgitant volume.

For example, the calculation function 455 calculates "$L_{valve}$" and "$B_{valve}$" using "18%" of the valve orifice area in the open phase calculated by the specifying function 453 as the valve orifice area in the early-systolic phase, and calculates the mitral valve passing flow volume at the next time point in the early-systolic phase by solving Formula (1) using the flow volume "$Q_{valve}$" in the early-systolic phase as "−5 ml" and "$P_P$−$P_d$" as the value obtained from the quadratic curve of the upper value of the cuff pressure. The calculation function 455 further calculates the mitral valve passing flow volume at the next time point using the calculated mitral valve passing flow volume at the next time point. At this time, the valve orifice area and the function "ζ" at each time point are obtained by each equation included in Formula (1).

As described above, the calculation function 455 calculates the mitral valve passing flow volume in order from the early-systolic phase, and specifies the flow volume at which the flow volume to the left atrium side becomes the maximum (the numerical value of–becomes the maximum) as the maximum regurgitant volume.

In the above example, the valve orifice area at the early-systolic phase is set to "18%" of the valve orifice area of the open phase, but may be changed according to the clinical state. For example, "A %" may be set in a case where there is a cardiac arrhythmia. Further, in the example described above, the flow volume in the early-systolic phase is set to "−5 ml", but may be changed according to the clinical state. For example, "B×(valve size) ml" may be set according to the size of the shape of the valve. Furthermore, for example, "C ml" may be used according to MR grade. Furthermore, for example, in a case where the regurgitant volume at the early-systolic phase can be acquired by an ultrasound image, the value may be adopted. Furthermore, for example, "(body weight)×D ml" may be set according to the physique.

In the example described above, the time at which the LA-LV pressure gradient is maximized is "0.13 seconds" from the early-systolic phase, but may be changed according to the clinical condition. In addition, the time change of the LA-LV pressure gradient is a quadratic curve of the upper value of the cuff pressure, but may be changed according to the clinical condition. For example, "E seconds" may be set in a case where there is a cardiac arrhythmia. In addition, for example, an F-th order curve may be used in a case where there is a cardiac arrhythmia.

Result Display Processing

As described in step S705 of FIG. 20, the control function 451 causes the display 33 to display the result. For example, the control function 451 displays the maximum regurgitant volume of the mitral valve. Here, the control function 451 may cause an indication that the result is an approximate value. In addition, the control function 451 may display a range of prediction that there is a possibility that the estimated value falls within such a range when the simulation is actually performed. In addition, the control function 451 may display an error in consideration of variations in the cuff pressure or may display an error in consideration of variations in the extraction result of the valve orifice area. The control function 451 can also display an initial valve orifice area, an early regurgitant volume, a temporal change in the regurgitant volume and the valve orifice area, and the like.

First Modification

In the above embodiment, an example in which "$l_{eff}$", "$K_{VO}$", and "$K_{VC}$" are constants has been described, but the embodiment is not limited thereto, and for example, may be changed according to a patient. As an example, in a case where there is calcification, the "$K_{VC}$" may be multiplied by 0.9.

As described above, according to the seventh embodiment, the image data acquisition function 452 acquires medical image data of at least two-phases. The specifying function 453 specifies first feature value in medical image data of at least two phases. The acquisition function 454 acquires the second feature value from the clinical information. The calculation function 455 calculates a third feature value based on the first feature value and the second feature value. The calculation function 455 calculates a pressure gradient between the left atrium and the left ventricle based on the second feature value, calculates the flow volume in the early-systolic phase and a valve orifice area at the early-systolic phase based on the first feature value and the second feature value, and calculates a third feature value based on the pressure gradient, the first feature value, the second feature value, the flow volume in the early-systolic phase, and the valve orifice area at the early-systolic phase. Therefore, the medical image processing apparatus **3*f*** according to the seventh embodiment enables a feature value to be calculated easily from small data.

In addition, according to the seventh embodiment, the specifying function 453 specifies the valve orifice area in the medical image data of the open phase of the mitral valve and the valve orifice area in the medical image data of the closed phase of the mitral valve. The acquisition function 454 acquires the cuff pressure from the clinical information. The calculation function 455 calculates the flow volume in the mitral valve based on the pressure gradient, the valve orifice area in the open phase, the valve orifice area in the closed phase, the flow volume in the early-systolic phase, and the valve orifice area in the early-systolic phase. Therefore, in the medical image processing apparatus **3*f*** according to the seventh embodiment, the values of the cuff pressure and the valve orifice area enable the flow volume in the mitral valve to be estimated easily.

Eighth Embodiment

In an eighth embodiment, a method for simply calculating the regurgitant orifice area of the mitral valve will be described. The mitral valve simulator simulates how the dynamics of the mitral valve changes when a treatment is performed. A doctor determines which treatment method improves the symptom of mitral regurgitation most based on the simulation result, and MR grade is one of the determination indices. MR grade is set in ESC guidelines and the like, and is classified into three stages from a plurality of measured values including a regurgitant orifice area, a regurgitant volume, and the like. Since the quantitative index related to the shape among the plurality of measured values is the valve orifice area, the doctor determines which treatment method is most suitable based on the rate of reducing the regurgitant orifice area among the simulation results.

However, there are not many methods for easily calculating the regurgitant orifice area of the mitral valve. Although there is also a method of obtaining the regurgitant orifice area from a geometric shape, the calculated valve orifice area has a weak correlation with the mitral regurgitant volume, and thus may have a value different from the regurgitant orifice area measured in actual clinical practice.

Therefore, in the eighth embodiment, it is possible to obtain a surface indicating the valve orifice and the valve orifice area value by the same simple calculation method regardless of the complexity of the shape.

Figure 21:
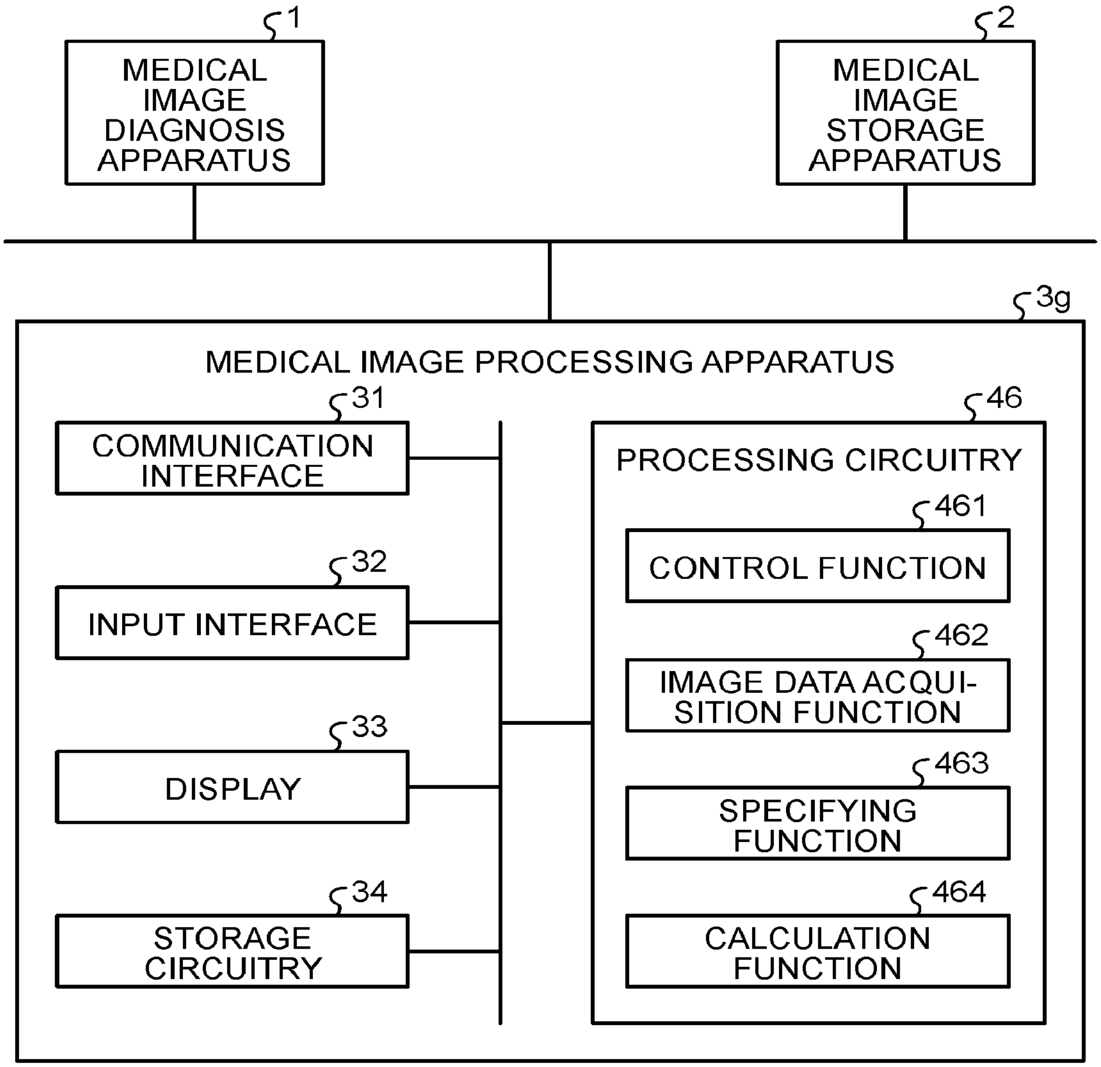
FIG. 21 is a diagram illustrating a configuration example of a medical image processing apparatus according to an eighth embodiment.

FIG. 21 is a diagram illustrating a configuration example of a medical image processing apparatus **3*g* according to the eighth embodiment. For example, as illustrated in FIG. 21, the medical image processing apparatus 3*g* according to the present embodiment is communicably connected to a medical image diagnosis apparatus 1 and a medical image storage apparatus 2 via a network. Note that various other apparatuses and systems may be connected to the network illustrated in FIG. 21**.

Here, the eighth embodiment is different from the first embodiment in processing contents by processing circuitry. Hereinafter, an explanation will be given mainly on this point. As illustrated in FIG. 21, the medical image processing apparatus **3*g* includes a communication interface 31, an input interface 32, a display 33, storage circuitry 34, and processing circuitry 46**.

As illustrated in FIG. 21, the processing circuitry 46 executes a control function 461, an image data acquisition function 462, a specifying function 463, and a calculation function 464, thereby controlling the entire medical image processing apparatus **3*g*. Here, the image data acquisition function 462 is an example of an acquisition unit. In addition, the specifying function 463 is an example of a specifying unit. In addition, the calculation function 464** is an example of a calculation unit.

The control function 461 controls to generate various GUIs and various display information in response to operations via the input interface 32 and display the generated information on the display 33. For example, the control function 461 causes the display 33 to display a result of processing by each function and the like. Furthermore, the control function 461 can also generate and display various display images on the basis of the medical image acquired by the image data acquisition function 462.

The image data acquisition function 462 acquires a medical image of a subject from the medical image diagnosis apparatus 1 or the medical image storage apparatus 2 via the communication interface 31. Specifically, the image data acquisition function 462 acquires medical images including a cardiac valve. Note that the image data acquisition function 462 can acquire various medical images and store the acquired medical images in the storage circuitry 34, similarly to the image data acquisition function 352 described in the first embodiment.

The specifying function 463 specifies the structure of interest included in the medical image data. Specifically, the specifying function 463 specifies the cardiac valve included in the medical image. Note that the processing by the specifying function 463 will be described in detail later.

The calculation function 464 calculates an index value related to the structure of interest. Specifically, the calculation function 464 sets a first region including a structure of interest therein, divides a surface of the first region on the basis of a shape of the structure of interest, sets a second region connecting a feature line of a region of interest and a boundary line dividing the surface of the first region, sets a different value in a predetermined physical quantity to each of surfaces divided in the first region, calculates a spatial field of the predetermined physical quantity in the first region on the basis of the predetermined physical quantity, and calculates an index value regarding the structure of interest on the basis of an isosurface of the physical quantity.

More specifically, the calculation function 464 sets the second region connecting the annular-side end portion of the cardiac valve and the boundary line dividing the surface of the first region, sets heat sources having different temperatures for each of the surfaces divided in the first region, calculates a temperature distribution in the first region, and calculates the valve orifice area of the cardiac valve on the basis of the isothermal surface in the temperature distribution. For example, the calculation function 464 calculates, as the valve orifice area of the cardiac valve, the area of the isothermal surface that is in contact with the cardiac valve and has the smallest area in the isothermal surface of the temperature distribution. Note that the processing by the calculation function 464 will be described in detail later.

The processing circuitry 46 described above is realized by, for example, a processor. In that case, each processing function described above is stored in the storage circuitry 34 in the form of a program executable by a computer. Then, the processing circuitry 46 reads and executes each program stored in the storage circuitry 34 to implement a function corresponding to each program. In other words, the processing circuitry 46 has each processing function illustrated in FIG. 21 in a state where each program is read out.

Figure 22:
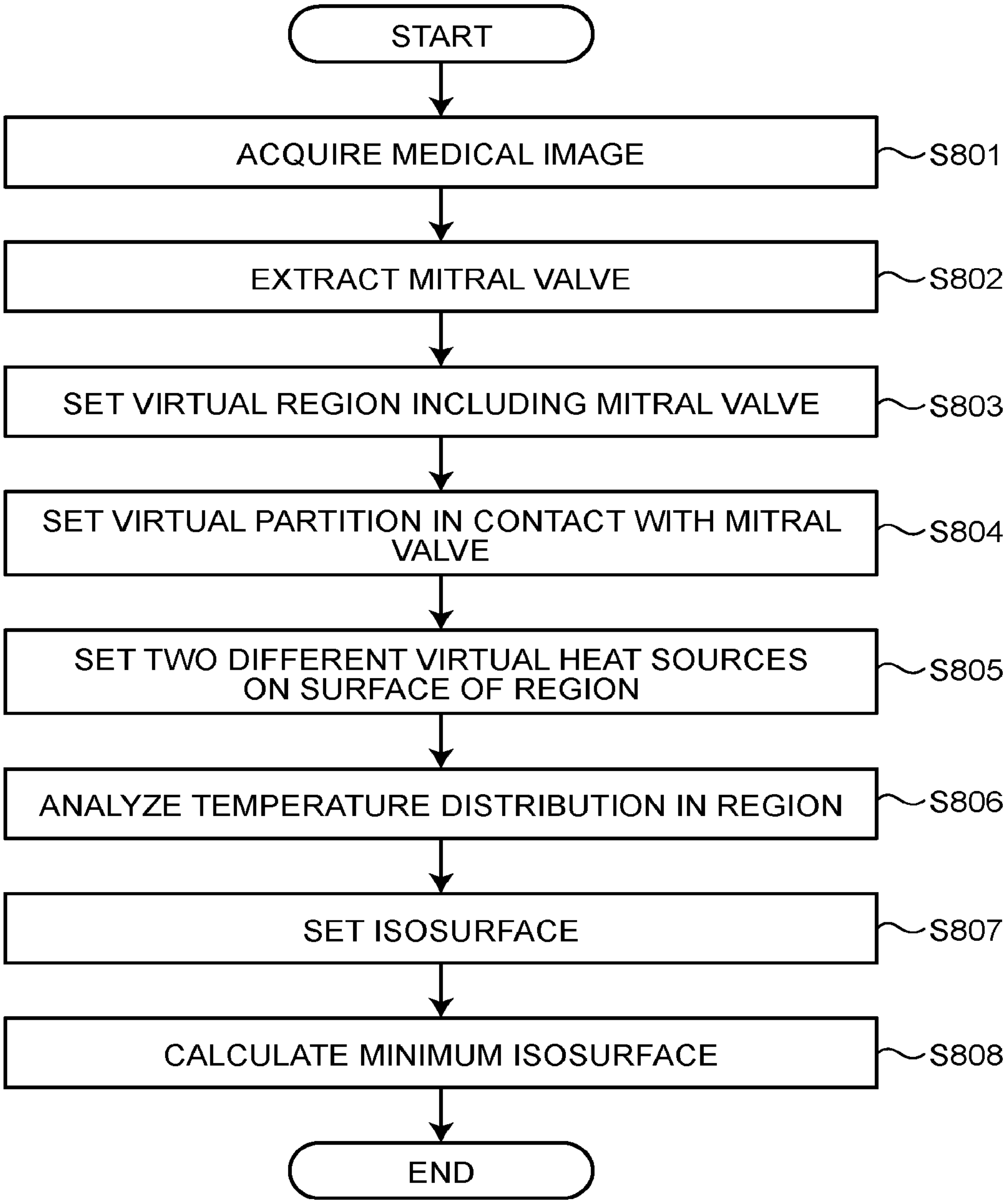
FIG. 22 is a flowchart illustrating a processing procedure of processing performed by each processing function of the processing circuitry of the medical image processing apparatus according to the eighth embodiment.

Next, a procedure of processing by the medical image processing apparatus 3*g* will be described with reference to FIG. 22, and then details of each processing will be described. FIG. 22 is a flowchart illustrating a processing procedure of processing performed by each processing function of the processing circuitry 46 of the medical image processing apparatus 3*g* according to the eighth embodiment.

For example, as illustrated in FIG. 22, in the present embodiment, the image data acquisition function 462 acquires a medical image of the subject from the medical image diagnosis apparatus 1 or the medical image storage apparatus 2 (step S801). This processing is realized, for example, by the processing circuitry 46 calling and executing a program corresponding to the image data acquisition function 462 from the storage circuitry 34.

Subsequently, the specifying function 463 extracts the mitral valve from the acquired medical image (step S802). This processing is realized, for example, by the processing circuitry 46 calling and executing a program corresponding to the specifying function 463 from the storage circuitry 34.

Subsequently, the calculation function 464 sets a virtual region (first region) including the mitral valve (step S803), and sets a virtual partition in contact with the mitral valve (step S804). Furthermore, the calculation function 464 sets two different virtual heat sources on the surface of the region (step S805), and analyzes the temperature distribution in the region (step S806). Then, the calculation function 464 sets an isosurface (step S807) and calculates a minimum isosurface (step S808). This processing is realized, for example, by the processing circuitry 46 calling and executing a program corresponding to the calculation function 464 from the storage circuitry 34.

Hereinafter, details of each processing executed by the medical image processing apparatus 3*g* will be described. Additionally, although a case where the mitral valve is extracted from the CT image will be described below, the medical image may be an MR image or an ultrasound image.

Medical Image Acquisition Processing

As described in step S801 of FIG. 22, the image data acquisition function 462 acquires the medical image including the three-dimensional morphology information of the mitral valve in response to the acquisition operation of the medical image via the input interface 32. For example, the image data acquisition function 462 acquires the CT image captured including the mitral valve.

Extraction Processing of Mitral Valve

As described in step S802 of FIG. 22, the specifying function 463 extracts the mitral valve for the CT images acquired by the image data acquisition function 462. Additionally, similarly to the feature data acquisition function 353 described in the first embodiment, the specifying function 463 can extract the mitral valve by various methods.

Region Setting Processing

Figure 23:
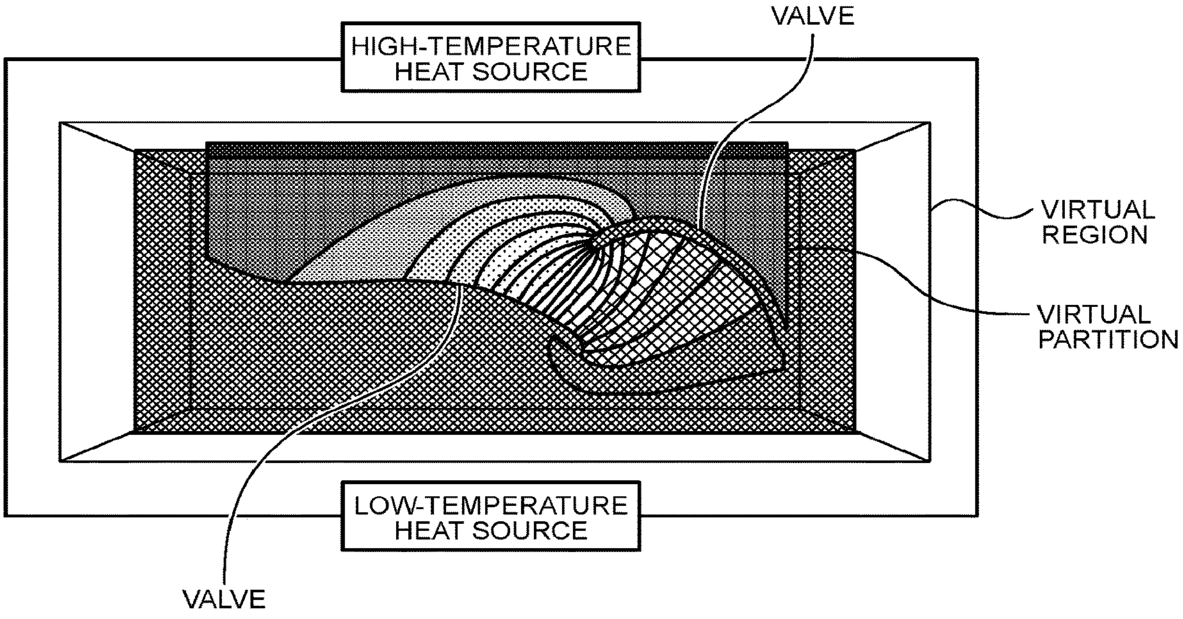
FIG. 23 is a schematic diagram illustrating processing by a calculation function according to the eighth embodiment.

As described in step S803 of FIG. 22, the calculation function 464 sets a region including the mitral valve. Here, the region may be a cuboid or a circle. Any complicated shape may be used as long as there is no cavity in the region. FIG. 23 is a schematic diagram illustrating processing by a calculation function 464 according to the eighth embodiment. For example, as illustrated in FIG. 23, the calculation function 464 sets a virtual region including the valve.

Then, the calculation function 464 divides the surface of the region into two. For example, as illustrated in FIG. 23, the calculation function 464 projects the valve onto the upper surface of the virtual region and divides the region into an inner area when projected (region inside the virtual partition on the upper surface of the virtual region: region A) and the other area (region B). Here, the virtual partition is a partition connecting the boundary of the surface divided into two and the valve annulus of the mitral valve. For example, the calculation function 464 sets a trajectory through which the valve annulus passes when the valve is projected on the upper surface of the virtual region as a virtual partition. Note that the virtual partition setting method described above is merely an example, and may be set in any manner. For example, the virtual partition may be formed with a curve.

Then, the calculation function 464 sets a heat source in one of the two divided regions and sets a different heat source in the other. For example, the calculation function 464 sets a high-temperature heat source (330 K) in region A, and sets a low-temperature heat source (300 K) in region B. Although the value of the heat source can be arbitrarily set, for example, the value may be set according to the ratio of the surface area.

Then, the calculation function 464 calculates a temperature distribution in the virtual region. Note that the valve and the virtual partition are made of a heat insulating material. Here, the calculation function 464 assumes that the temperature change at $\Delta t$ is 10-6 K or less as a steady state, and calculates an isosurface of the temperature distribution. For example, the calculation function 464 extracts a temperature at each position in the virtual region, and sets a region having a temperature with a temperature range of 1 K (1 K or more and less than 2 K, or the like) as the isosurface.

Note that the temperature range of the isosurface can be arbitrarily set, but may be changed according to the difference between the heat sources. For example, the temperature range may be increased when the difference between the heat sources is large. In addition, the temperature range of the isosurface may be determined according to the number of calculation trials of calculation that becomes steady. In addition, the temperature range of the isosurface may be determined according to the size of the mesh.

When the isosurface is set in the virtual space as described above, the calculation function 464 calculates the area that comes into contact with the valve and has the smallest area of the isosurface as the valve orifice area. By calculating the valve orifice area in this manner, it is possible to calculate the valve orifice area in which the size of the area is reflected in the regurgitant volume. That is, when the heat source is regarded as pressure, the isosurface (isothermal surface) can be considered as an isokinetic surface in a steady state. Therefore, on the isosurface, the flow rate at "(flow volume) =(flow rate)×(valve orifice area)" is constant, and the magnitude of the valve orifice area is accurately reflected on the magnitude of the regurgitant volume.

Result Display Processing

The control function 461 displays the result on the display 33. For example, the control function 461 can color and display the region of the isosurface having the smallest area. In addition, for example, the control function 461 can smooth the region or display the region as a surface element. The control function 461 can also display a virtual partition or a virtual region. The control function 461 can also display a difference from other valve orifice area calculation methods.

As described above, according to the eighth embodiment, the image data acquisition function 462 acquires medical image data. The specifying function 463 specifies the structure of interest included in the medical image data. The calculation function 464 calculates an index value related to the structure of interest. The calculation function 464 sets the first region including a structure of interest therein, divides a surface of the first region on the basis of a shape of the structure of interest, sets the second region connecting a feature line of a region of interest and a boundary line dividing the surface of the first region, sets a different value in a predetermined physical quantity to each of surfaces divided in the first region, calculates a spatial field of the predetermined physical quantity in the first region on the basis of the predetermined physical quantity, and calculates an index value regarding the structure of interest on the basis of an isosurface of the physical quantity. Therefore, the medical image processing apparatus 3*g* according to the eighth embodiment makes it possible to calculate the index value of the structure of interest by a simple calculation method.

In addition, according to the eighth embodiment, the region of interest is a cardiac valve, and the calculation function 464 sets the second region connecting the annular-side end portion of the cardiac valve and the boundary line dividing the surface of the first region, sets heat sources having different temperatures for each of the surfaces divided in the first region, calculates a temperature distribution in the first region, and calculates the valve orifice area of the cardiac valve on the basis of the isothermal surface in the temperature distribution. Therefore, the medical image processing apparatus 3*g* according to the eighth embodiment makes it possible to calculate the valve orifice area of the cardiac valve by a simple calculation method.

In addition, according to the eighth embodiment, the calculation function 464 calculates, as the valve orifice area of the cardiac valve, the area of the isothermal surface that is in contact with the cardiac valve and has the smallest area in the isothermal surface of the temperature distribution. Therefore, the medical image processing apparatus 3*g* according to the eighth embodiment makes it possible to calculate the valve orifice area of the cardiac valve accurately.

Ninth Embodiment

In a ninth embodiment, a method of simply comparing a valve shape after treatment with a valve shape according to a simulation result will be described. Since valvuloplasty is a complicated procedure, it is sometimes desired to consider whether the performed procedure was appropriate later. For example, in a case where the procedure performed is Mitraclip, there is a case where it is desired to consider how it would have been if it had been placed in another size or in another position.

In such examination, a virtual therapy simulator (simulator) may be used. The simulator predicts, for example, a treatment result by a treatment method input by a doctor. As a result, the doctor can compare the actually performed procedure with another procedure to examine which is more appropriate.

However, it is difficult to easily compare the mitral valve shape after the treatment actually performed with the mitral valve shape according to the simulation result. Therefore, in the ninth embodiment, the cardiac valve is projected in the blood flow direction and compared two-dimensionally, so that it is possible to easily compare the mitral valve shape after the treatment actually performed with the mitral valve shape according to the simulation result. This also makes it possible to simply compare the position of the clip with the contact width.

Figure 24:
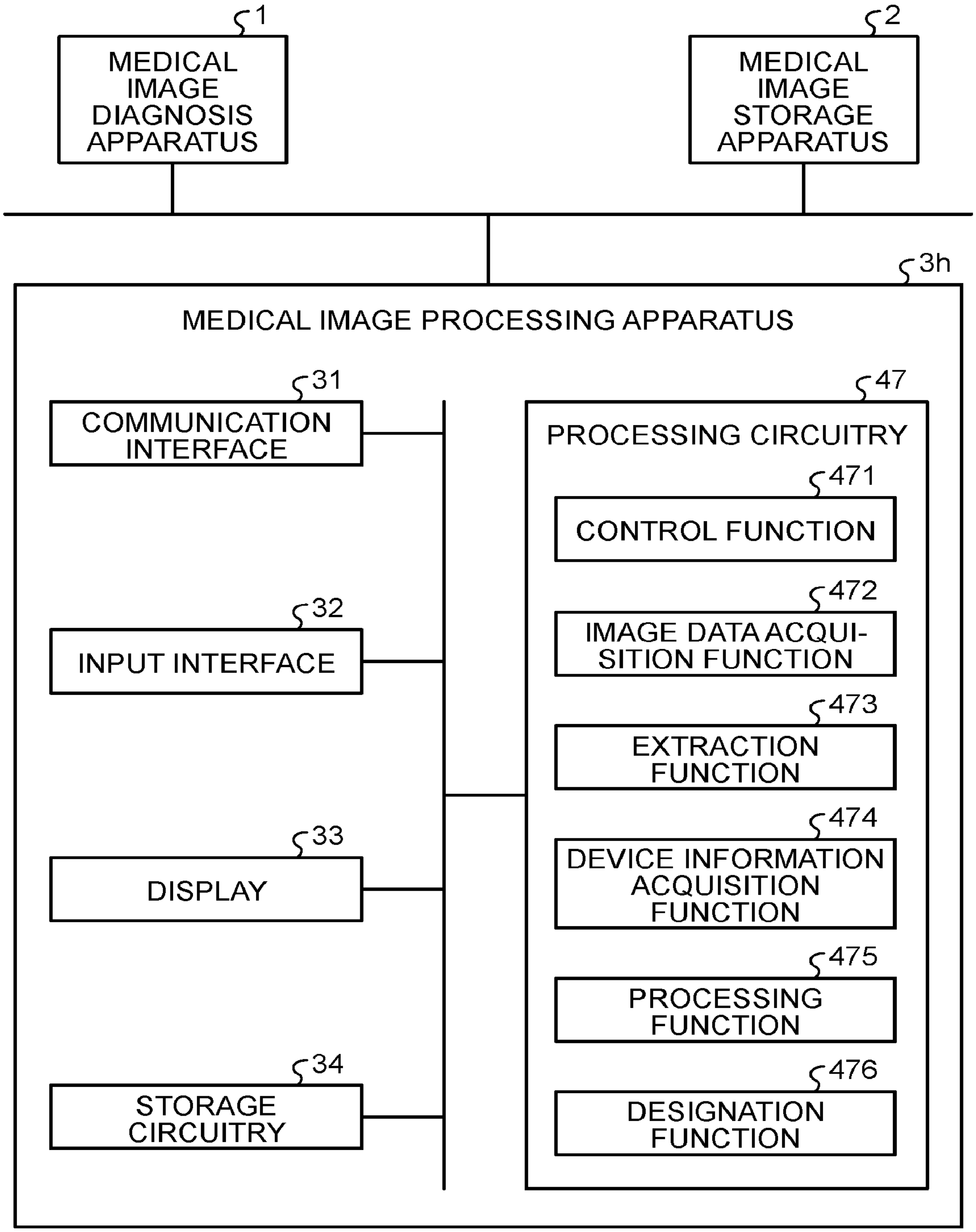
FIG. 24 is a diagram illustrating a configuration example of a medical image processing apparatus according to a ninth embodiment.

FIG. 24 is a diagram illustrating a configuration example of a medical image processing apparatus 3*h* according to the ninth embodiment. For example, as illustrated in FIG. 24, the medical image processing apparatus 3*h* according to the present embodiment is communicably connected to a medical image diagnosis apparatus 1 and a medical image storage apparatus 2 via a network. Note that various other apparatuses and systems may be connected to the network illustrated in FIG. 24.

Here, the ninth embodiment is different from the first embodiment in processing contents by processing circuitry. Hereinafter, an explanation will be given mainly on this point. As illustrated in FIG. 24, the medical image processing apparatus 3*h* includes a communication interface 31, an input interface 32, a display 33, storage circuitry 34, and processing circuitry 47.

As illustrated in FIG. 24, the processing circuitry 47 executes a control function 471, an image data acquisition function 472, an extraction function 473, a device information acquisition function 474, a processing function 475, and a designation function 476, thereby controlling the entire medical image processing apparatus 3*h*. Here, the image data acquisition function 472 is an example of an acquisition unit. In addition, the extraction function 473 is an example of an extraction unit. In addition, the processing function 475 is an example of a processing unit.

The control function 471 controls to generate various GUIs and various display information in response to operations via the input interface 32 and display the generated information on the display 33. For example, the control function 471 causes the display 33 to display a result of processing by each function and the like. Furthermore, the control function 471 can also generate and display various display images on the basis of the medical image acquired by the image data acquisition function 472.

In addition, the control function 471 can perform simulation to estimate the shape of the cardiac valve.

The image data acquisition function 472 acquires a medical image of a subject from the medical image diagnosis apparatus 1 or the medical image storage apparatus 2 via the communication interface 31. Specifically, the image data acquisition function 472 acquires a first medical image collected at a first time point and a second medical image collected at a second time point. More specifically, the image data acquisition function 472 acquires a preoperative medical image and a postoperative medical image. Note that the image data acquisition function 472 can acquire various medical images and store the acquired medical images in the storage circuitry 34, similarly to the image data acquisition function 352 described in the first embodiment.

The extraction function 473 extracts a first anatomical structure from the first medical image and a second anatomical structure from the second medical image. Specifically, the extraction function 473 specifies the cardiac valve included in the medical image. Note that the processing by the specifying function 463 will be described in detail later.

The device information acquisition function 474 acquires information of a medical device included in the medical image. For example, the device information acquisition function 474 specifies the position of a medical device such as a clip based on shape data of the cardiac valve.

The processing function 475 performs alignment of the second anatomical structure with a third anatomical structure estimated based on the first anatomical structure. Specifically, the processing function 475 projects the second anatomical structure and the third anatomical structure onto a predetermined cross-section, obtains feature points and feature vectors from the projected second anatomical structure and the projected third anatomical structure, respectively, and performs a parallel translation for substantially matching the positions of the feature points and a rotational translation for translating the feature vectors in the projected second anatomical structure and the projected third anatomical structure.

For example, the processing function 475 projects the postoperative cardiac valve and the postoperative estimated cardiac valve in the blood flow direction, acquires line segments connecting the center of gravity and the commissure from the postoperative cardiac valve and the postoperative estimated cardiac valve, respectively, and performs a parallel translation for substantially matching the positions of the centers of gravity and a rotational translation for making the line segments connecting the commissures parallel in the postoperative cardiac valve and the postoperative estimated cardiac valve. Note that the processing by the processing function 475 will be described in detail later.

The designation function 476 designates the position of the device based on the result of the alignment by the processing function 475. For example, the designation function 476 receives designation of the position of the device in the simulation after the alignment by the processing function 475. When the position of the device is designated by the designation function 476, the control function 471 performs simulation based on the designated position of the device.

The processing circuitry 47 described above is realized by, for example, a processor. In that case, each processing function described above is stored in the storage circuitry 34 in the form of a program executable by a computer. Then, the processing circuitry 47 reads and executes each program stored in the storage circuitry 34 to implement a function corresponding to each program. In other words, the processing circuitry 47 has each processing function illustrated in FIG. 24 in a state where each program is read out.

Figure 25:
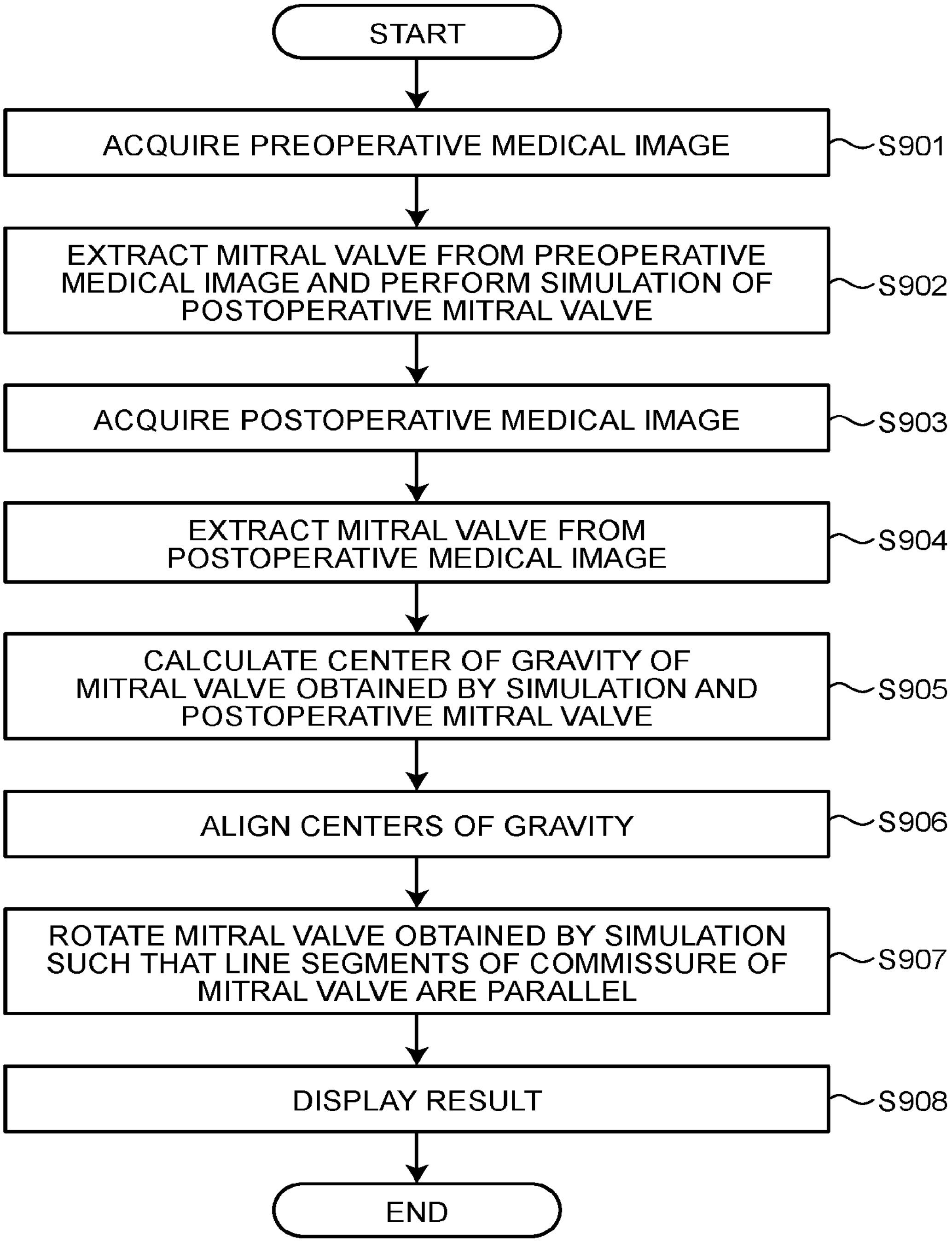
FIG. 25 is a flowchart illustrating a processing procedure of processing performed by each processing function of the processing circuitry of the medical image processing apparatus according to the ninth embodiment.

Next, a procedure of processing by the medical image processing apparatus 3*h* will be described with reference to FIG. 25, and then details of each processing will be described. FIG. 25 is a flowchart illustrating a processing procedure of processing performed by each processing function of the processing circuitry 47 of the medical image processing apparatus 3*h* according to the ninth embodiment.

For example, as illustrated in FIG. 25, in the present embodiment, the image data acquisition function 472 acquires a preoperative medical image from the medical image diagnosis apparatus 1 or the medical image storage apparatus 2 (step S901). This processing is realized, for example, by the processing circuitry 47 calling and executing a program corresponding to the image data acquisition function 472 from the storage circuitry 34.

Subsequently, the extraction function 473 extracts the mitral valve from the acquired preoperative medical image, and the control function 471 performs a simulation of the postoperative mitral valve (step S902). This processing is realized, for example, by the processing circuitry 47 calling and executing a program corresponding to the control function 471 and the extraction function 473 from the storage circuitry 34.

Subsequently, the image data acquisition function 472 acquires a postoperative medical image from the medical image diagnosis apparatus 1 or the medical image storage apparatus 2 (step S903). This processing is realized, for example, by the processing circuitry 47 calling and executing a program corresponding to the image data acquisition function 472 from the storage circuitry 34.

Subsequently, the extraction function 473 extracts the mitral valve from the acquired postoperative medical image (step S904). This processing is realized, for example, by the processing circuitry 47 calling and executing a program corresponding to the control function 471 and the extraction function 473 from the storage circuitry 34.

Subsequently, the processing function 475 calculates the center of gravity of the mitral valve obtained by the simulation and the postoperative mitral valve (step S905), and aligns the centers of gravity (step S906). Then, the processing function 475 rotates the mitral valve obtained by the simulation such that the line segments of the commissure of the mitral valve are parallel (step S907). This processing is realized, for example, by the processing circuitry 47 calling and executing a program corresponding to the processing function 475 from the storage circuitry 34.

Subsequently, the control function 471 displays the result (step S908) This processing is realized, for example, by the processing circuitry 47 calling and executing a program corresponding to the control function 471 from the storage circuitry 34.

Hereinafter, details of each processing executed by the medical image processing apparatus 3*h* will be described. Additionally, although a case where the mitral valve is extracted from the ultrasound image will be described below, the medical image may be a CT image or an MR image. The target cardiac valve is not limited to the mitral valve, but may be an aortic valve or a tricuspid valve.

Medical Image Acquisition Processing

As described in step S901 and step S903 of FIG. 25, the image data acquisition function 472 acquires the preoperative medical image and postoperative medical image including the three-dimensional morphology information of the mitral valve in response to the acquisition operation of the medical image via the input interface 32. For example, the image data acquisition function 472 acquires the preoperative ultrasound image and postoperative ultrasound image. Here, the image data acquisition function 472 acquires an ultrasound image in the mid-diastolic phase or in a phase in which the valve is closed.

Extraction Processing of Mitral Valve

As described in step S902 and step S904 of FIG. 25, the extraction function 473 extracts the mitral valve each for the preoperative ultrasound image and postoperative ultrasound image acquired by the image data acquisition function 472. Additionally, similarly to the feature data acquisition function 353 described in the first embodiment, the extraction function 473 can extract the mitral valve by various methods.

Simulation

As described in step S902 of FIG. 25, the control function 471 executes a simulation of treatment input by a doctor. Specifically, the control function 471 estimates the shape and the like of the mitral valve when the input treatment is performed. For example, the doctor inputs what size of clip to place at what position, and the control function 471 estimates the shape of the mitral valve accordingly.

Calculation Processing of Center of Gravity

As described in step S905 of FIG. 25, the processing function 475 calculates the center of gravity of the mitral valve obtained by simulation and the center of gravity of the postoperative mitral valve. Here, a region having low accuracy in calculating the center of gravity may be excluded. In addition, the center of gravity of the annulus may be used instead of the center of gravity of the mitral valve.

Center of Gravity Alignment Processing

As described in step S906 of FIG. 25, the processing function 475 executes processing of aligning the calculated centers of gravity. For example, the processing function 475 moves the center of gravity of the mitral valve shape of the simulation result to the center of gravity of the postoperative mitral valve shape.

Alignment Processing by Commissure

As described in step S907 of FIG. 25, the processing function 475 rotates the mitral valve obtained by the simulation such that the line segments of the commissure are parallel. Specifically, the processing function 475 first specifies the commissure of the mitral valve. For example, the processing function 475 estimates the commissure from the geometry of the segmented mitral valve. Note that an algorithm for detecting the position of the commissure may be constructed for the CT image, and the position may be detected using the algorithm.

Then, the processing function 475 acquires line segments connecting the positions of the commissures for the mitral valve of the simulation result and the actual postoperative mitral valve. Note that not only the line segment connecting the commissures but also a cut of the valve compartment (P1, P2, etc.), the same chordae tendineae, or the like may be used as a reference. In addition, the reference line segment may be defined with variations.

Figure 26:
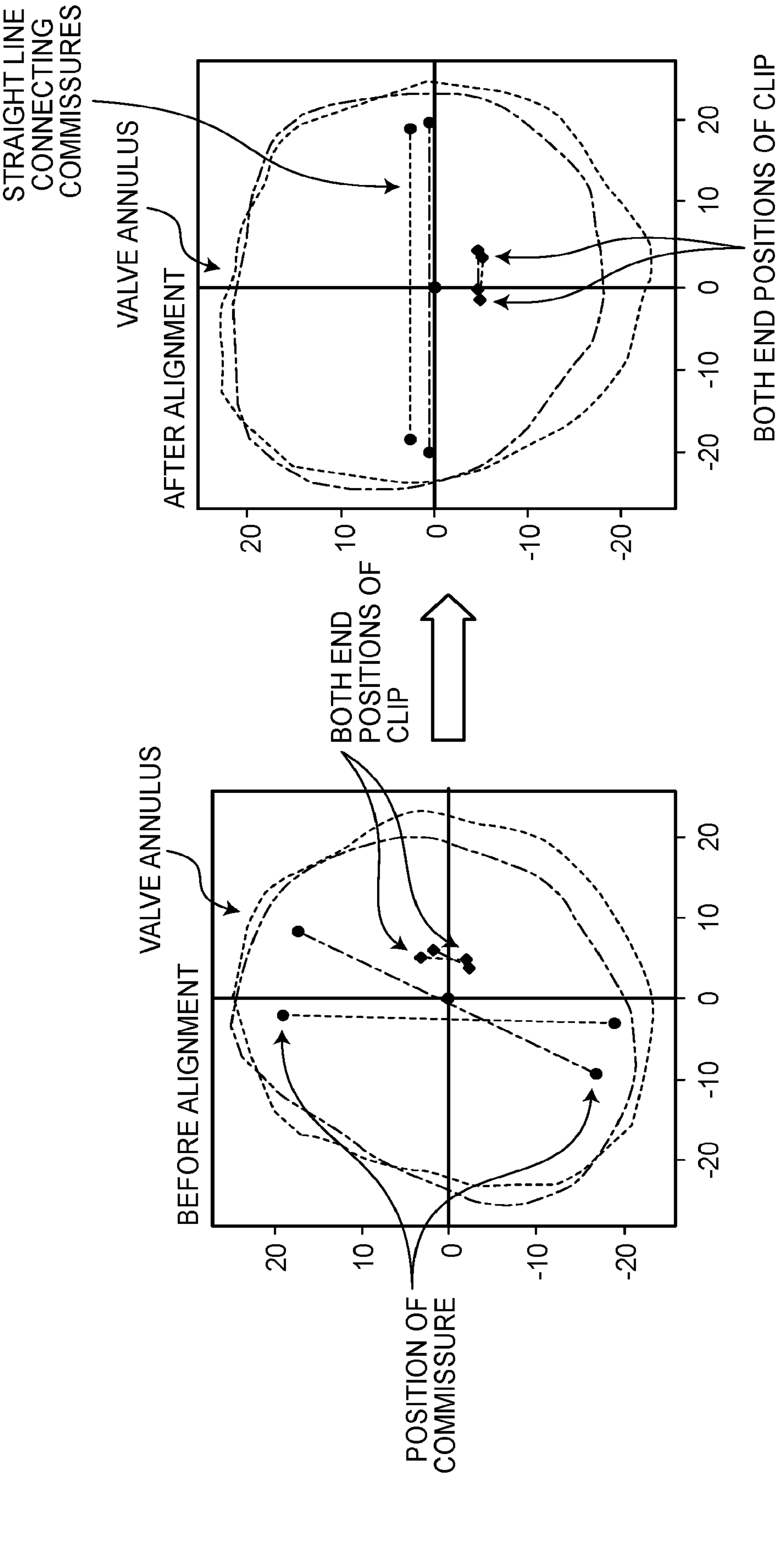
FIG. 26 is a diagram for explaining an example of alignment processing according to the ninth embodiment.

As described above, acquiring the line segment of the commissures, the processing function 475 rotates the mitral valve obtained by the simulation such that the line segments of the commissure are parallel. FIG. 26 is a diagram for explaining an example of alignment processing according to the ninth embodiment. Here, in FIG. 26, processing after the centers of gravity of the mitral valve are matched is illustrated. For example, as illustrated in FIG. 26, the processing function 475 performs alignment on a two-dimensional mitral valve obtained by projecting the mitral valve in the blood flow direction.

As illustrated in FIG. 26, the processing function 475 rotates the mitral valve of the simulation result such that line segments connecting the commissures are parallel after the centers of gravity of the mitral valve are substantially matched. As a result, it is possible to compare the mitral valve of the simulation result with the actual postoperative mitral valve. Here, the position of the clip in the mitral valve is acquired by the device information acquisition function 474. For example, the device information acquisition function 474 specifies the position of the clip based on the distance between the anterior leaflet and the posterior leaflet at the node set in the mitral valve in the postoperative ultrasound image.

Result Display Processing

The control function 471 displays the result on the display 33. For example, the control function 471 displays the mitral valve of the simulation result on which the alignment has been performed and the actual postoperative mitral valve. Here, the control function 471 can also display the clip position. In addition, the control function 471 can display the clip position actually placed and the clip position of the simulation result in different colors.

As described above, according to the ninth embodiment, the image data acquisition function 472 acquires the first medical image collected at the first time point and the second medical image collected at the second time point. The extraction function 473 extracts a first anatomical structure from the first medical image and a second anatomical structure from a second medical image. The processing function 475 performs alignment of the second anatomical structure with a third anatomical structure estimated based on the first anatomical structure. The processing function 475 projects the second anatomical structure and the third anatomical structure onto a predetermined cross-section, acquires feature points and feature vectors from the projected second anatomical structure and the projected third anatomical structure, respectively, and performs a parallel translation for substantially matching the positions of the feature points and a rotational translation for translating the feature vectors in the projected second anatomical structure and the projected third anatomical structure. Therefore, the medical image processing apparatus 3*h* according to the ninth embodiment makes it possible to easily compare the anatomical structure in the actual image with the anatomical structure obtained by simulation.

In addition, according to the ninth embodiment, the image data acquisition function 472 acquires the first medical image collected before operation and the second medical image collected after operation. The extraction function 473 extracts a preoperative cardiac valve from the first medical image and a postoperative cardiac valve from the second medical image. The processing function 475 projects the postoperative cardiac valve and the postoperative estimated cardiac valve in the blood flow direction, acquires line segments connecting the center of gravity and the commissure from the postoperative cardiac valve and the postoperative estimated cardiac valve, and performs a parallel translation for substantially matching the positions of the centers of gravity and a rotational translation for making the line segments connecting the commissures parallel in the postoperative cardiac valve and the postoperative estimated cardiac valve. Therefore, the medical image processing apparatus 3*h* according to the ninth embodiment makes it possible to easily compare the actual cardiac valve with the cardiac valve obtained by simulation.

Tenth Embodiment

In a tenth embodiment, a method of correcting the measurement value of the mitral regurgitant volume by ultrasonography will be described. Mitral valve regurgitation, which is one of valvular heart diseases, is a disease in which regurgitation occurs due to a gap formed without a part of the mitral valve being completely closed during systole. One of the indices for measuring the degree of mitral regurgitation is the regurgitant volume passing through the mitral valve, and one of the methods for measuring this regurgitant volume is the PISA (Proximal isovelocity surface are) method. This is an index measured by an ultrasonic Doppler method, and is a method of adjusting the aliasing velocity of the Doppler so that the aliasing region of the regurgitant velocity becomes a hemisphere, and then performing calculation based on the radius of the hemisphere and the aliasing velocity. This measurement method is a measurement method derived from a continuous equation on the assumption that the regurgitation spreads concentrically.

The PISA method is a method that is often used clinically, but since it has an assumption that "regurgitation spreads concentrically", which is deviates from the reality, the regurgitant volume may take an abnormal value. Therefore, in the tenth embodiment, the mitral regurgitant volume acquired by the PISA method is corrected based on the blood passing volume in the aortic valve.

Figure 27:
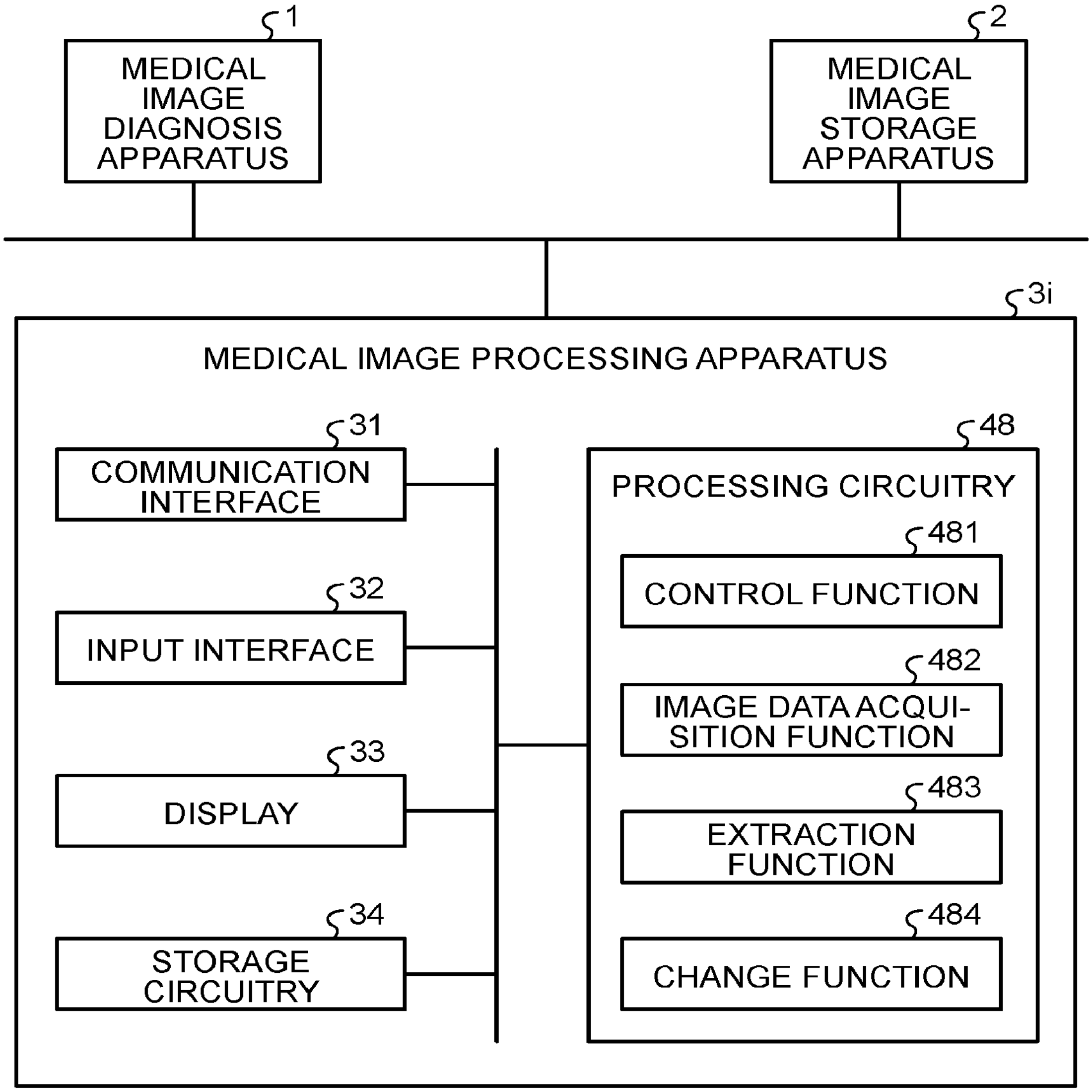
FIG. 27 is a diagram illustrating a configuration example of a medical image processing apparatus according to a tenth embodiment.

FIG. 27 is a diagram illustrating a configuration example of a medical image processing apparatus 3*i* according to the tenth embodiment. For example, as illustrated in FIG. 27, the medical image processing apparatus 3*i* according to the present embodiment is communicably connected to a medical image diagnosis apparatus 1 and a medical image storage apparatus 2 via a network. Note that various other apparatuses and systems may be connected to the network illustrated in FIG. 27.

Here, the tenth embodiment is different from the first embodiment in processing contents by processing circuitry. Hereinafter, an explanation will be given mainly on this point. As illustrated in FIG. 27, the medical image processing apparatus 3*i* includes a communication interface 31, an input interface 32, a display 33, storage circuitry 34, and processing circuitry 48.

As illustrated in FIG. 27, the processing circuitry 48 executes a control function 481, an image data acquisition function 482, an extraction function 483, and a change function 484, thereby controlling the entire medical image processing apparatus 3*i*. Here, the image data acquisition function 482 is an example of a medical image data acquisition unit. In addition, the extraction function 483 is an example of an extraction unit. In addition, the change function 484 is an example of a change unit.

The control function 481 controls to generate various GUIs and various display information in response to operations via the input interface 32 and display the generated information on the display 33. For example, the control function 481 causes the display 33 to display a result of processing by each function and the like. Furthermore, the control function 481 can also generate and display various display images on the basis of the medical image acquired by the image data acquisition function 482.

The image data acquisition function 482 acquires a medical image of a subject from the medical image diagnosis apparatus 1 or the medical image storage apparatus 2 via the communication interface 31. Specifically, the image data acquisition function 482 acquires first medical image data and second medical image data scanned at least at a first timing and at a second timing different from the first timing. Note that the image data acquisition function 482 can acquire various medical images and store the acquired medical images in the storage circuitry 34, similarly to the image data acquisition function 352 described in the first embodiment.

The extraction function 483 extracts a first feature value based on the first medical image data and a second feature value based on the second medical image data. Here, the first feature value is a regurgitant volume of blood flow in the mitral valve, and the second feature value is passing volume of blood flow in the aortic valve. Note that the processing by the extraction function 483 will be described in detail later.

When the first feature value is larger than the second feature value, the change function 484 changes the value of the first feature value to the value of the second feature value. Note that the processing by the change function 484 will be described in detail later.

The processing circuitry 48 described above is realized by, for example, a processor. In that case, each processing function described above is stored in the storage circuitry 34 in the form of a program executable by a computer. Then, the processing circuitry 48 reads and executes each program stored in the storage circuitry 34 to implement a function corresponding to each program. In other words, the processing circuitry 48 has each processing function illustrated in FIG. 27 in a state where each program is read out.

Figure 28:
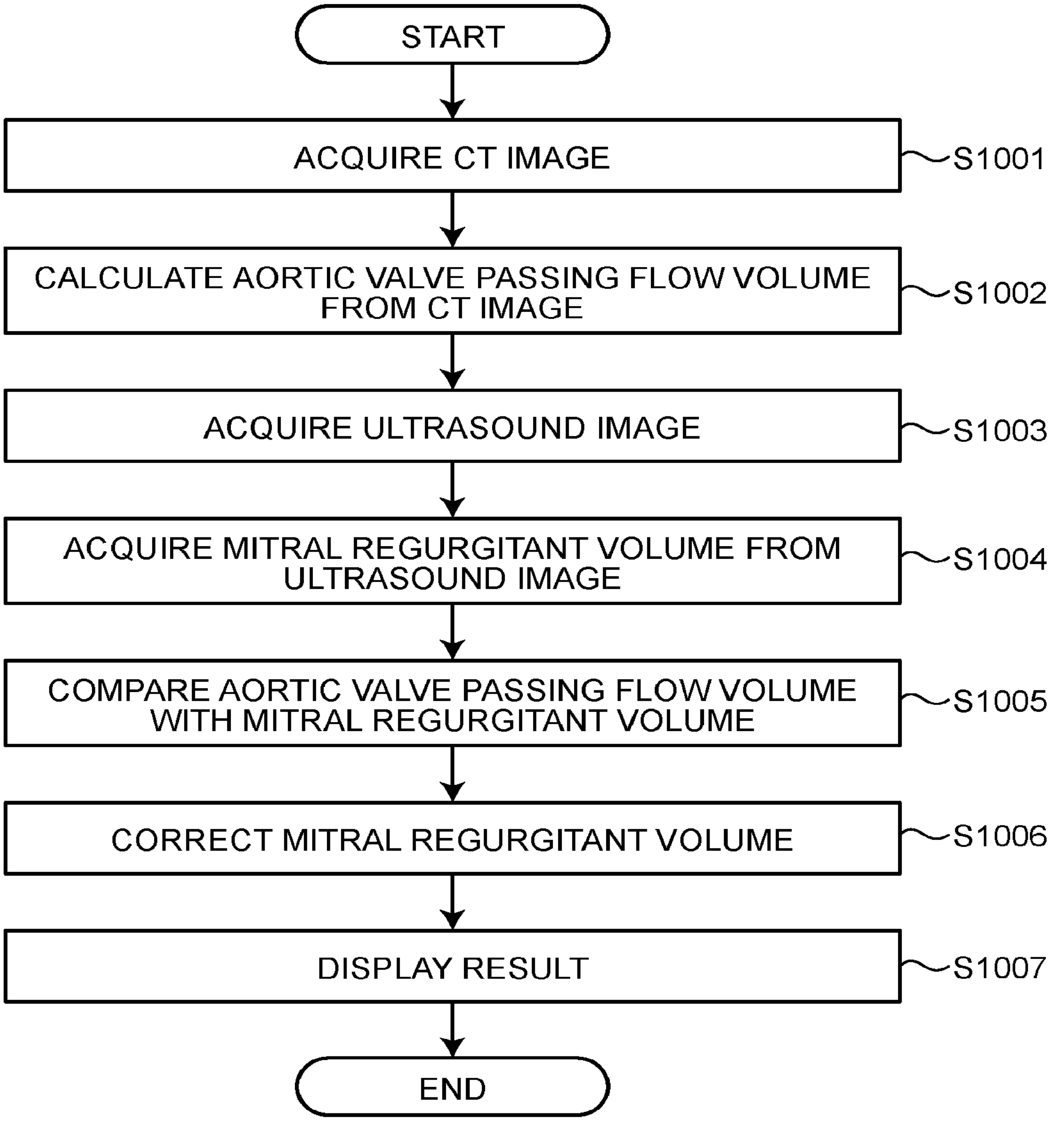
FIG. 28 is a flowchart illustrating a processing procedure of processing performed by each processing function of the processing circuitry of the medical image processing apparatus according to the tenth embodiment.

Next, a procedure of processing by the medical image processing apparatus 3*i* will be described with reference to FIG. 28, and then details of each processing will be described. FIG. 28 is a flowchart illustrating a processing procedure of processing performed by each processing function of the processing circuitry 48 of the medical image processing apparatus 3*i* according to the tenth embodiment.

For example, as illustrated in FIG. 28, in the present embodiment, the image data acquisition function 482 acquires a CT image from the medical image diagnosis apparatus 1 or the medical image storage apparatus 2 (step S1001). This processing is realized, for example, by the processing circuitry 48 calling and executing a program corresponding to the image data acquisition function 482 from the storage circuitry 34.

Subsequently, the extraction function 483 calculates the aortic valve passing flow volume from the acquired CT image (step S1002). This processing is realized, for example, by the processing circuitry 48 calling and executing a program corresponding to the extraction function 483 from the storage circuitry 34.

Subsequently, the image data acquisition function 482 acquires an ultrasound image from the medical image diagnosis apparatus 1 or the medical image storage apparatus 2 (step S1003). This processing is realized, for example, by the processing circuitry 48 calling and executing a program corresponding to the image data acquisition function 482 from the storage circuitry 34.

Subsequently, the extraction function 483 acquires the mitral regurgitant volume from the acquired ultrasound image (step S1004). This processing is realized, for example, by the processing circuitry 48 calling and executing a program corresponding to the extraction function 483 from the storage circuitry 34.

Subsequently, the change function 484 compares the aortic valve passing flow volume with the mitral regurgitant volume (step S1005) and corrects the mitral regurgitant volume (step S1006). This processing is realized, for example, by the processing circuitry 48 calling and executing a program corresponding to the change function 484 from the storage circuitry 34.

Subsequently, the control function 481 displays the result (step S1007) This processing is realized, for example, by the processing circuitry 48 calling and executing a program corresponding to the control function 481 from the storage circuitry 34.

Hereinafter, details of each processing executed by the medical image processing apparatus 3*i* will be described.

Medical Image Acquisition Processing

As described in step S1001 and step S1003 of FIG. 28, the image data acquisition function 482 acquires the CT image and the ultrasound image in response to the acquisition operation of the medical image via the input interface 32. Here, the image for calculating the aortic valve passing flow volume is not limited to the CT image, and may be an MR image or an ultrasound image.

Calculation Processing of Aortic Valve Passing Flow Volume

As described in step S1002 of FIG. 28, the extraction function 483 calculates the aortic valve passing flow volume on the basis of the CT images acquired by the image data acquisition function 482. Specifically, the extraction function 483 extracts the aortic valve from the CT image and calculates the valve orifice area of the extracted aortic valve. Then, the extraction function 483 calculates the aortic valve passing flow volume based on the calculated valve orifice area and the flow velocity of the blood during one heartbeat. The aortic valve passing flow volume may be passing volume per unit time or may be an amount passing in a certain time. Additionally, similarly to the feature data acquisition function 353 described in the first embodiment, the extraction function 483 can extract the aortic valve by various methods.

Acquiring Processing of Mitral Regurgitant Volume

As described in step S1004 of FIG. 28, the extraction function 483 acquires the mitral regurgitant volume from the ultrasound image. Specifically, the extraction function 483 acquires the mitral regurgitant volume from the PISA method of the ultrasound image. Note that the measurement by the PISA method uses, for example, measurement by a doctor.

Correction Processing of Mitral Regurgitant Volume

Figure 29:
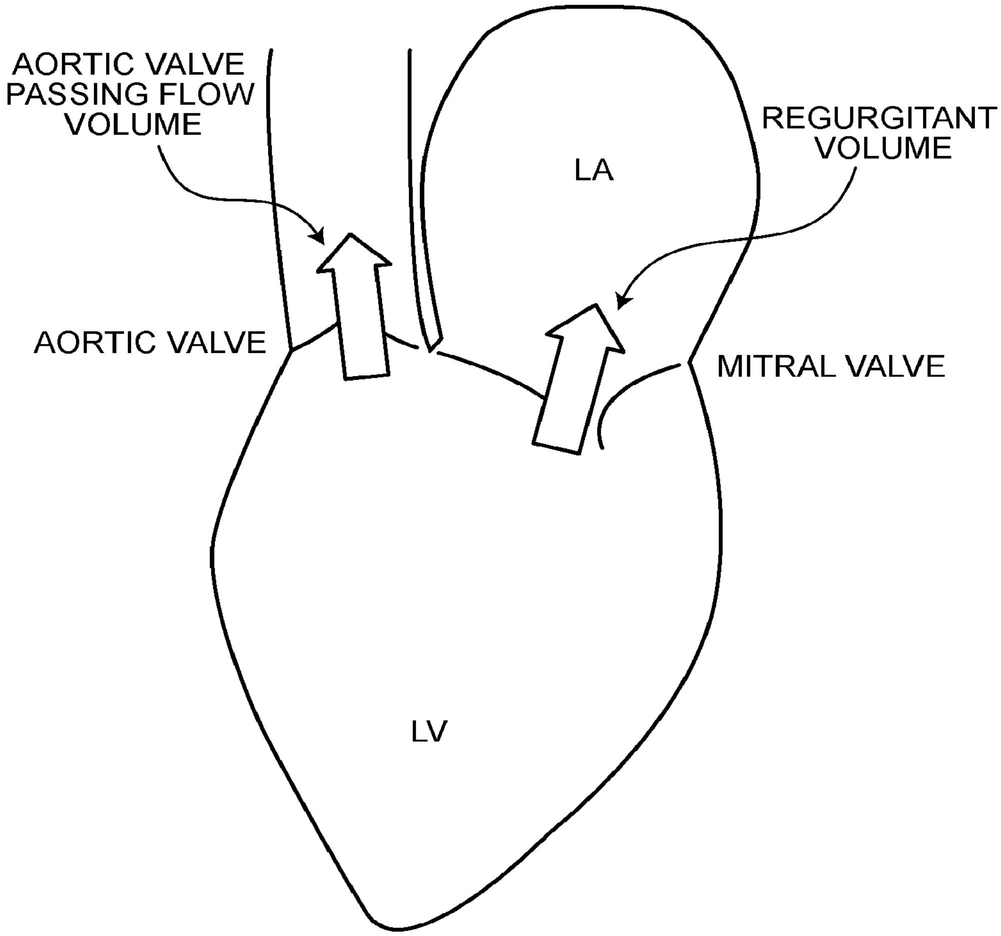
FIG. 29 is a diagram for explaining correction processing according to the tenth embodiment.

As described in step S1005 and step S1006 of FIG. 28, the change function 484 compares the aortic valve passing flow volume with the mitral regurgitant volume, and corrects the mitral regurgitant volume according to the comparison result. FIG. 29 is a diagram for explaining correction processing according to the tenth embodiment. For example, in a case where the mitral regurgitant volume illustrated in FIG. 29 is larger than the aortic valve passing flow volume, since the blood is circulating in the direction opposite to the normal direction, the change function 484 determines as abnormal and changes the value of the mitral regurgitant volume to the value of the aortic valve passing flow volume. That is, the change function 484 performs control so that the mitral regurgitant volume does not exceed the aortic valve passing flow volume. On the other hand, when the mitral regurgitant volume is smaller than the aortic valve passing flow volume, the change function 484 does not perform any processing.

Result Display Processing

As described in step S1007 of FIG. 28, the control function 481 causes the display 33 to display the result. For example, the control function 481 displays the mitral regurgitant volume. Here, the control function 481 displays a corrected value when the mitral regurgitant volume is corrected. The control function 481 can also display the mitral regurgitant volume before correction.

As described above, according to the tenth embodiment, the image data acquisition function 482 acquires first medical image data and second medical image data scanned at least at the first timing and at the second timing different from the first timing. The extraction function 483 extracts a first feature value based on the first medical image data and a second feature value based on the second medical image data. When the first feature value is larger than the second feature value, the change function 484 changes the value of the first feature value to the value of the second feature value. Therefore, the medical image processing apparatus 3*i* according to the tenth embodiment can perform control such that the first feature value does not exceed the second feature value, and can suppress the first feature value from becoming an unrealistic value.

In addition, according to the tenth embodiment, the first feature value is a regurgitant volume of blood flow in the mitral valve, and the second feature value is passing volume of blood flow in the aortic valve. Therefore, the medical image processing apparatus 3*i* according to the tenth embodiment can suppress the mitral regurgitant volume from becoming an unrealistic value.

Eleventh Embodiment

In an eleventh embodiment, similarly to the tenth embodiment, a method of correcting the measurement value of the mitral regurgitant volume by ultrasonography will be described. Here, in the tenth embodiment, the case of performing correction to change the mitral regurgitant volume to the aortic valve passing flow volume has been described. In the eleventh embodiment, a case of correcting the mitral regurgitant volume using the aortic valve passing flow volume and the volume change of the left ventricle will be described.

Figure 30:
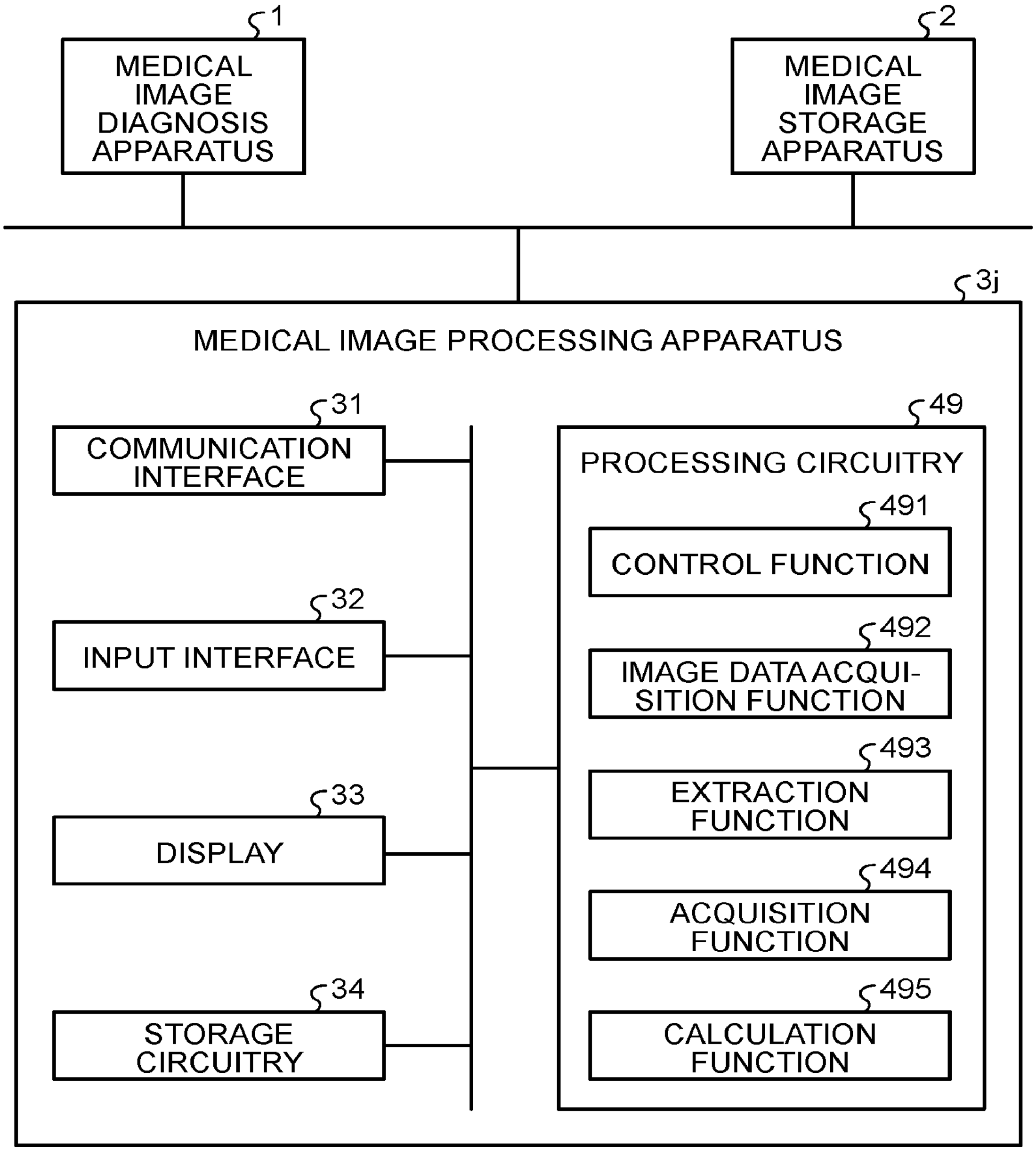
FIG. 30 is a diagram illustrating a configuration example of a medical image processing apparatus according to an eleventh embodiment.

FIG. 30 is a diagram illustrating a configuration example of a medical image processing apparatus 3*j* according to the eleventh embodiment. For example, as illustrated in FIG. 30, the medical image processing apparatus 3*j* according to the present embodiment is communicably connected to a medical image diagnosis apparatus 1 and a medical image storage apparatus 2 via a network. Note that various other apparatuses and systems may be connected to the network illustrated in FIG. 30.

Here, the eleventh embodiment is different from the first embodiment in processing contents by processing circuitry. Hereinafter, an explanation will be given mainly on this point. As illustrated in FIG. 30, the medical image processing apparatus 3*j* includes a communication interface 31, an input interface 32, a display 33, storage circuitry 34, and processing circuitry 49.

As illustrated in FIG. 30, the processing circuitry 49 executes a control function 491, an image data acquisition function 492, an extraction function 493, an acquisition function 494, and a calculation function 495, thereby controlling the entire medical image processing apparatus 3*j*. Here, the image data acquisition function 492 is an example of an image data acquisition unit. In addition, the extraction function 493 is an example of an extraction unit. The acquisition function 494 is an example of an acquisition unit. In addition, the calculation function 495 is an example of a calculation unit.

The control function 491 controls to generate various GUIs and various display information in response to operations via the input interface 32 and display the generated information on the display 33. For example, the control function 491 causes the display 33 to display a result of processing by each function and the like. Furthermore, the control function 491 can also generate and display various display images on the basis of the medical image acquired by the image data acquisition function 492.

The image data acquisition function 492 acquires a medical image of a subject from the medical image diagnosis apparatus 1 or the medical image storage apparatus 2 via the communication interface 31. Specifically, the image data acquisition function 492 acquires first medical image data scanned at the early-systolic phase and second medical image data scanned at the end-systolic phase. Note that the image data acquisition function 492 can acquire various medical images and store the acquired medical images in the storage circuitry 34, similarly to the image data acquisition function 352 described in the first embodiment.

The extraction function 493 extracts a first feature value based on the first medical image data and a second feature value based on the second medical image data. Here, the first feature value is a left ventricular lumen volume at an early-systolic phase, and the second feature value is a left ventricular lumen volume at an end-systolic phase. Note that the processing by the extraction function 483 will be described in detail later.

The acquisition function 494 acquires the passing volume of blood flow in the aortic valve. Note that the processing by the change function 484 will be described in detail later.

The calculation function 495 calculates the regurgitant volume of blood flow in the mitral valve based on the difference between the first feature value and the second feature value and the passing volume of blood flow in the aortic valve. Specifically, the calculation function 495 calculates the regurgitant volume of blood flow in the mitral valve by subtracting the passing volume of blood flow in the aortic valve from the difference between the left ventricular lumen volume in the early-systolic phase and the left ventricular lumen volume in the end-systolic phase.

Hereinafter, details of each processing executed by the medical image processing apparatus **3*j*** will be described.

Medical Image Acquisition Processing

The image data acquisition function 492 acquires the CT image and the ultrasound image in response to the acquisition operation of the medical image via the input interface 32. Here, the image for calculating the aortic valve passing flow volume is not limited to the CT image, and may be an MR image or an ultrasound image.

Process of Acquiring Lumen Volume of Left Ventricle

The extraction function 493 acquires a change in the lumen volume of the left ventricle based on the CT image acquired by the image data acquisition function 492. Specifically, the extraction function 493 extracts the left ventricle from the CT image and calculates the difference between the maximum value and the minimum value of the extracted lumen volume of the left ventricle, thereby acquiring the amount of change in the lumen volume of the left ventricle. Additionally, similarly to the feature data acquisition function 353 described in the first embodiment, the extraction function 483 can extract the left ventricle by various methods.

Acquiring Processing of Mitral Regurgitant Volume

The extraction function 493 acquires the mitral regurgitant volume from the ultrasound image. Specifically, the extraction function 493 acquires the mitral regurgitant volume from the PISA method of the ultrasound image. Note that the measurement by the PISA method uses, for example, measurement by a doctor.

Calculation Processing of Aortic Valve Passing Flow Volume

The acquisition function 494 calculates the aortic valve passing flow volume on the basis of the ultrasound images acquired by the image data acquisition function 492. Specifically, the acquisition function 494 extracts the aortic valve from the ultrasound image and calculates the valve orifice area of the extracted aortic valve. Then, the acquisition function 494 calculates the aortic valve passing flow volume based on the calculated valve orifice area and the flow velocity of the blood during one heartbeat. Note that the valve orifice area may be acquired from a CT image or an MR image. In addition, the aortic valve passing flow volume may be passing volume per unit time or may be an amount passing in a certain time. Additionally, similarly to the feature data acquisition function 353 described in the first embodiment, the acquisition function 494 can extract the aortic valve by various methods.

Correction Processing of Mitral Regurgitant Volume

Figure 31:
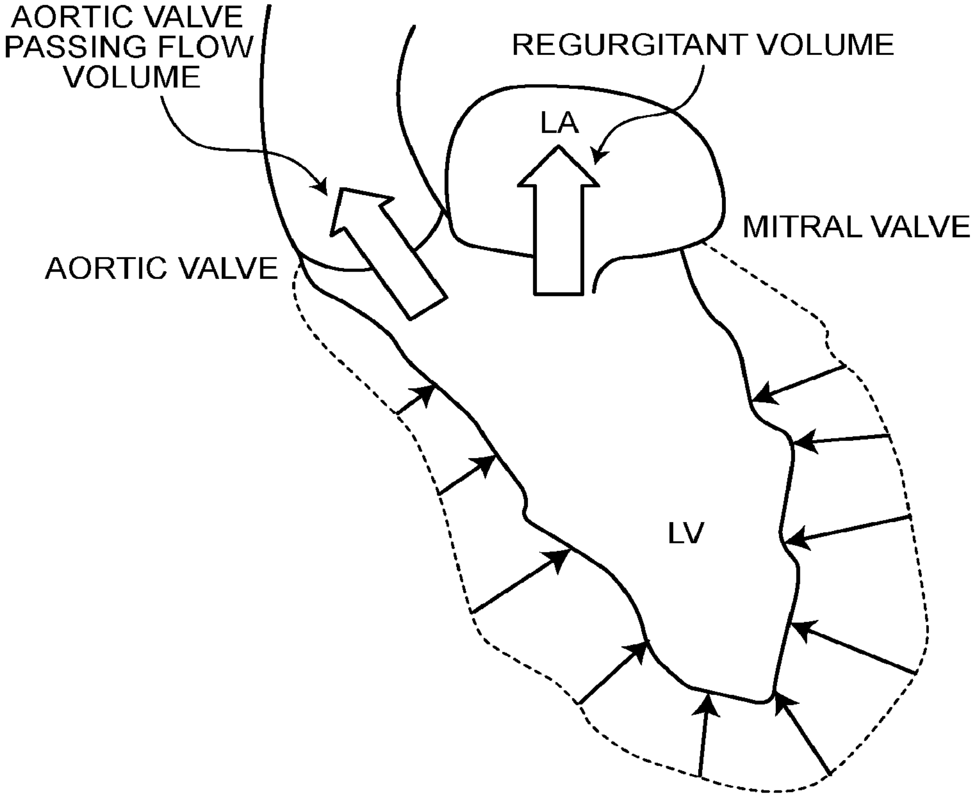
FIG. 31 is a diagram for explaining correction processing according to the eleventh embodiment.

The calculation function 495 compares the mitral regurgitant volume with the change in the lumen volume of the left ventricle, and when the mitral regurgitant volume is large, a value obtained by subtracting the aortic valve passing flow volume from the left ventricular lumen volume change is set as the mitral regurgitant volume. FIG. 31 is a diagram for explaining correction processing according to the eleventh embodiment. For example, when the mitral regurgitant volume illustrated in FIG. 31 is larger than the volume change of the left ventricle (LV), the calculation function 495 sets a value obtained by subtracting the aortic valve passing flow volume from the volume change of the left ventricle (LV) as the mitral regurgitant volume. Note that a value obtained by subtracting the aortic valve passing flow volume from the volume change of the left ventricle (LV) may be calculated as the mitral regurgitant volume without comparing the mitral regurgitant volume with the change in the lumen volume of the left ventricle.

Result Display Processing

The control function 491 displays the result on the display 33. For example, the control function 491 displays the mitral regurgitant volume. Here, the control function 491 displays a corrected value when the mitral regurgitant volume is corrected. The control function 491 can also display the mitral regurgitant volume before correction.

As described above, according to the eleventh embodiment, the image data acquisition function 492 acquires the first medical image data scanned at the early-systolic phase and the second medical image data scanned at the end-systolic phase. The extraction function 493 extracts a first feature value based on the first medical image data and a second feature value based on the second medical image data. The acquisition function 494 acquires the passing volume of blood flow in the aortic valve. The calculation function 495 calculates the regurgitant volume of blood flow in the mitral valve based on the difference between the first feature value and the second feature value and the passing volume of blood flow in the aortic valve. Therefore, the medical image processing apparatus **3*j*** according to the eleventh embodiment can obtain the mitral regurgitant volume with high accuracy.

In addition, according to the eleventh embodiment, the first feature value is the left ventricular lumen volume at the early-systolic phase, the second feature value is the left ventricular lumen volume at the end-systolic phase, and the calculation function 495 calculates the regurgitant volume of the blood flow in the mitral valve by subtracting the passing volume of the blood flow in the aortic valve from the difference between the left ventricular lumen volume at the early-systolic phase and the left ventricular lumen volume at the end-systolic phase. Therefore, the medical image processing apparatus **3*j*** according to the eleventh embodiment can obtain the mitral regurgitant volume with high accuracy, and enable the accuracy of data assimilation to be improved.

Other Embodiments

The processing by the medical image processing apparatus 3 to the medical image processing apparatus 3*j* described in each embodiment can be arbitrarily integrated. That is, the medical image processing apparatus can be configured such that the processing described in each embodiment is executed by one medical image processing apparatus, or the medical image processing apparatus can be configured such that arbitrarily selected processing among the processing described in each embodiment is executed by one medical image processing apparatus.

Note that the processing circuitry described in each of the above embodiments may be configured by combining a plurality of independent processors, and each processor may implement each processing function by executing a program. In addition, each processing function of the processing circuitry may be realized by being appropriately distributed or integrated into a single or a plurality of processing circuits. In addition, each processing function of the processing circuitry may be realized by mixing hardware such as a circuit and software. Furthermore, here, an example of a case where the program corresponding to each processing function is stored in the single storage circuitry 34 has been described, but the embodiment is not limited thereto. For example, a plurality of storage circuits may dispersedly store programs corresponding to each processing function, and the processing circuitry may read and execute each program from each storage circuit.

Note that, in the above-described embodiment, an example in which each unit in the present specification is realized by each function of the processing circuitry has been described, but the embodiment is not limited thereto. For example, each unit in the present specification may be realized by each function described in the embodiment, and also realize the same function by only hardware, only software, or a mixture of hardware and software.

Furthermore, the term "processor" used in the description of the above-described embodiment means, for example, a central processing unit (CPU), a graphics processing unit (GPU), or a circuit such as an application specific integrated circuit (ASIC) or a programmable logic device (for example, a simple programmable logic device (SPLD), a complex programmable logic device (CPLD), and a field programmable gate array (FPGA)). Here, instead of storing the program in the storage circuit, the program may be directly incorporated in the circuit of the processor. In this case, the processor realizes the function by reading and executing the program incorporated in the circuit. In addition, each processor of the present embodiment is not limited to a case where each processor is configured as a single circuit, and a plurality of independent circuits may be combined to be configured as one processor to realize the function.

Here, the medical image processing program executed by the processor is provided by being incorporated in advance in a read only memory (ROM), a storage circuit, or the like. Note that the medical image processing program may be provided by being recorded in a non-transitory computer-readable storage medium such as a compact disk (CD)-ROM, a flexible disk (FD), a CD-recordable (CD-R), or a digital versatile disk (DVD) as a file in a format installable or executable in these apparatuses. Furthermore, the medical image processing program may be provided or distributed by being stored on a computer connected to a network such as the Internet and downloaded via the network. For example, the medical image processing program is configured by a module including each processing function described above. As actual hardware, the CPU reads the medical image processing program from the storage medium such as the ROM and executes the medical image processing program, whereby each module is loaded on the main storage apparatus and generated on the main storage apparatus.

In addition, in the above-described embodiment and modifications, each component of each apparatus illustrated in the drawings is functionally conceptual, and does not necessarily need to be physically configured as illustrated in the drawings. That is, a specific form of distribution or integration of each apparatus is not limited to the illustrated form, and all or a part thereof can be functionally or physically distributed or integrated in an arbitrary unit according to various loads, usage conditions, and the like. Furthermore, all or an arbitrary part of each processing function performed in each apparatus can be realized by a CPU and a program analyzed and executed by the CPU, or can be realized as hardware by wired logic.

In addition, among the processing described in the above-described embodiments and modifications, all or a part of the processing described as being performed automatically can be manually performed, or all or a part of the processing described as being performed manually can be automatically performed by a known method. In addition, the processing procedure, the control procedure, the specific name, and the information including various data and parameters illustrated in the document and the drawings can be arbitrarily changed unless otherwise specified.

According to at least one of the embodiments described above, simulation can be appropriately performed.

Regarding the above embodiments, the following supplementary notes are disclosed as one aspect and selective features of the invention.

(Supplementary Note 1)

A medical image processing apparatus including:

a medical image data acquisition unit configured to acquire first medical image data and second medical image data scanned at least at a first timing and at a second timing different from the first timing;

a feature data acquisition unit configured to acquire first feature data related to a structure of interest on the basis of the first medical image data and second feature data related to the structure of interest on the basis of the second medical image data;

an estimation unit configured to estimate third feature data by estimating the structure of interest at the second timing by simulation on the basis of the first feature data;

a calculation unit configured to calculate, from the second feature data and the third feature data, a first feature value, and a second feature value that is a feature value more local than the first feature value;

a specifying unit configured to specify a plurality of parameter sets related to the simulation on the basis of optimization calculation having a loss function including the first feature value; and a determination unit configured to determine a parameter set of interest from the plurality of parameter sets on the basis of the second feature value.

(Supplementary Note 1-1)

The medical image processing apparatus according to supplementary note 1, in which the first feature value is a feature value of the entire structure of interest.

(Supplementary Note 1-2)

The medical image processing apparatus according to supplementary note 1 or supplementary note 1-1, in which the specifying unit specifies a plurality of parameter sets on the basis of the first feature value calculated by the loss function from a parameter set group obtained on the basis of the multi-start optimization calculation.

(Supplementary Note 1-3)

The medical image processing apparatus according to supplementary note 1-2, in which the specifying unit specifies a plurality of parameter sets in which the first feature value is relatively small.

(Supplementary Note 1-4)

The medical image processing apparatus according to any one of supplementary note 1 to supplementary note 1-3, in which the determination unit determines a parameter set in which the corresponding second feature value is relatively small among the plurality of parameter sets as the parameter set of interest.

(Supplementary Note 1-5)

The medical image processing apparatus according to any one of supplementary note 1 to supplementary note 1-4, in which the medical image data acquisition unit acquires first medical image data and second medical image data scanned at least during systole and diastole of a heart.

(Supplementary Note 1-6)

The medical image processing apparatus according to supplementary note 1-5, in which

- the feature data acquisition unit acquires shape data of a cardiac valve in systole of the heart on the basis of the first medical image data, and acquire shape data of a cardiac valve in diastole of the heart on the basis of the second medical image data,
- the estimation unit estimates, by simulation based on shape data of a cardiac valve in systole of the heart acquired on the basis of the first medical image data, shape data of the cardiac valve in diastole of the heart,
- the calculation unit calculates, on the basis of shape data of the cardiac valve based on the second medical image data and shape data of the cardiac valve estimated by the simulation, a feature value related to a difference in shape of the cardiac valve and a feature value related to a difference in valve orifice area in the cardiac valve,
- the specifying unit specifies the plurality of parameter sets on the basis of an optimization calculation having a loss function including a feature value related to a difference in shape of the cardiac valve, and
- the determination unit determines the parameter set of interest from the plurality of parameter sets on the basis of a feature value related to a difference in valve orifice area in the cardiac valve.

(Supplementary Note 1-7)

A method including:

- acquiring first medical image data and second medical image data scanned at least at a first timing and at a second timing different from the first timing;
- acquiring first feature data related to a structure of interest on the basis of the first medical image data and second feature data related to the structure of interest on the basis of the second medical image data;
- estimating third feature data by estimating the structure of interest at the second timing by simulation on the basis of the first feature data;
- calculating, from the second feature data and the third feature data, a first feature value, and a second feature value that is a feature value more local than the first feature value;
- specifying a plurality of parameter sets related to the simulation on the basis of optimization calculation having a loss function including the first feature value; and
- determining a parameter set of interest from the plurality of parameter sets on the basis of the second feature value.

(Supplementary Note 1-8)

A program for causing a computer to execute each processing of:

- acquiring first medical image data and second medical image data scanned at least at a first timing and at a second timing different from the first timing;
- acquiring first feature data related to a structure of interest on the basis of the first medical image data and second feature data related to the structure of interest on the basis of the second medical image data;
- estimating third feature data by estimating the structure of interest at the second timing by simulation on the basis of the first feature data;
- calculating, from the second feature data and the third feature data, a first feature value, and a second feature value that is a feature value more local than the first feature value;
- specifying a plurality of parameter sets related to the simulation on the basis of optimization calculation having a loss function including the first feature value; and
- determining a parameter set of interest from the plurality of parameter sets on the basis of the second feature value.

(Supplementary Note 2)

A medical image processing apparatus including:

- a medical image data acquisition unit configured to acquire first medical image data and second medical image data scanned at least at a first timing and at a second timing different from the first timing;
- a specifying unit configured to specify a structure of interest on the basis of the first medical image data and the second medical image data;
- a determination unit configured to determine presence or absence of abnormality of the structure of interest on the basis of shape of the structure of interest;
- a calculation unit configured to calculate first feature value on the basis of shape of the structure of interest; and
- a selection unit configured to select a phase on the basis of a determination result of presence or absence of abnormality of the structure of interest and the first feature value.

(Supplementary Note 2-1)

The medical image processing apparatus according to supplementary note 2, in which the structure of interest is a cardiac valve.

(Supplementary Note 2-2)

The medical image processing apparatus according to supplementary note 2-1, in which in a case where it is determined that there is an abnormality in the structure of interest, the selection unit selects a phase that is systole of a heart and in which a valve orifice of the cardiac valve is maximized as a phase in which the cardiac valve is closed.

(Supplementary Note 2-3)

The medical image processing apparatus according to supplementary note 2-1, in which in a case where it is determined that there is an abnormality in the structure of interest, the selection unit selects a phase in which regurgitation of blood occurs as systole of a heart, and selects a phase that is systole of the heart and in which a valve orifice of the cardiac valve is maximized as a phase in which the cardiac valve is closed.

(Supplementary Note 2-4)

The medical image processing apparatus according to supplementary note 2-1, in which in a case where it is determined that there is no abnormality in the structure of interest, the selection unit selects a phase that is systole of a heart and in which a valve orifice of the cardiac valve is minimized as a phase in which the cardiac valve is closed.

(Supplementary Note 2-5)

The medical image processing apparatus according to supplementary note 2-1, in which in a case where it is determined that there is no abnormality in the structure of interest, the selection unit selects a phase in which regurgitation of blood occurs as systole of a heart, and selects a phase that is systole of a heart and in which a valve orifice of the cardiac valve is minimized as a phase in which the cardiac valve is closed.

(Supplementary Note 2-6)

The medical image processing apparatus according to any one of supplementary note 2-1 to supplementary note 2-5, in which the selection unit selects a phase that is diastole of a heart and in which the cardiac valve is uniformly open as a phase in which the cardiac valve is open.

(Supplementary Note 3)

A medical image processing apparatus including:

a medical image data acquisition unit configured to acquire first medical image data and second medical image data scanned at least at a first timing and at a second timing different from the first timing;

a shape acquisition unit configured to acquire first shape data related to a structure of interest from the first medical image data and second shape data related to the structure of interest from the second medical image data; and a shape correction unit configured to correct the first shape data on the basis of the second shape data, in which the shape correction unit corrects the first shape data on the basis of a mechanical field in a first phase and a second phase and a contact state of a shape of the structure of interest in the second phase.

(Supplementary Note 3-1)

The medical image processing apparatus according to supplementary note 3, in which the first phase is an open phase of a cardiac valve, the second phase is a closed phase of the cardiac valve, and the shape correction unit calculates a third length obtained by correcting a second length that is a length of a valve leaflet in the first phase on the basis of a first length that is a length of the valve leaflet in the second phase.

(Supplementary Note 3-2)

The medical image processing apparatus according to supplementary note 3-1, in which the shape correction unit corrects the second length of a contact portion with which a valve is in contact in the cardiac valve in the open phase to a length obtained by converting the first length at a ratio based on the mechanical field.

(Supplementary Note 3-3)

The medical image processing apparatus according to supplementary note 3-1, further including a control unit configured to acquire third shape data related to the structure of interest in the closed phase by simulation using the first shape data, in which the shape correction unit corrects the second length of a non-contact portion with which a valve is not in contact in the cardiac valve in the open phase using a ratio between a size of the cardiac valve in the second shape data and a size of the cardiac valve in the third shape data.

(Supplementary Note 4)

A medical image processing apparatus including:

an acquisition unit configured to acquire medical image data;

a specifying unit configured to specify shape data related to a structure of interest included in the medical image data;

a providing unit configured to provide data regarding a structure simulating a predetermined anatomical feature to the shape data;

a calculation unit configured to calculate deformation of the shape data on the basis of a mechanical condition caused by the structure; and a reconfiguring unit configured to reconfigure conditions so as to disperse mechanical condition caused by the structure in the vicinity of a junction between the structure and the shape data, in which the calculation unit calculates deformation of the shape data on the basis of the mechanical condition dispersed by the reconfiguring unit.

(Supplementary Note 4-1)

The medical image processing apparatus according to supplementary note 4, in which the specifying unit specifies shape data of a cardiac valve included in the medical image data, the providing unit provides data related to chordae tendineae to the shape data of the cardiac valve, the reconfiguring unit sets a dispersion point so as to disperse a mechanical condition caused by the chordae tendineae in the vicinity of a junction between the chordae tendineae and shape data of the cardiac valve, and the calculation unit calculates deformation of shape data of the cardiac valve on the basis of the dispersion point set by the reconfiguring unit.

(Supplementary Note 5)

A medical image processing apparatus including:

an image data acquisition unit configured to acquire multi-phase medical image data;

an acquisition unit configured to acquire a first feature value for each phase from the multi-phase medical image data;

an estimation unit configured to estimate time-series data of a second feature value related to the first feature value by simulating the multi-phase medical image data; and a calculation unit configured to calculate an offset error based on multi-phase data on the basis of the first feature value and the second feature value for each phase, in which a loss function of the estimation unit includes the offset error and an independent error related to the first feature value.

(Supplementary Note 5-1)

The medical image processing apparatus according to supplementary note 5, in which the acquisition unit acquires a lumen volume of a heart for each phase from the multi-phase medical image data, the estimation unit estimates time-series data indicating a change in the lumen volume of the heart by the simulation, and the calculation unit calculates the offset error on the basis of the lumen volume acquired from each of the multiphase medical image data and the lumen volume estimated by the simulation.

(Supplementary Note 5-2)

The medical image processing apparatus according to supplementary note 5 or supplementary note 5-1, further including a clinical information acquisition unit configured to acquire a third feature value from clinical information, in which the loss function of the estimation unit includes the offset error, an independent error related to the first feature value, and an independent error related to the third feature value.

(Supplementary Note 5-3)

The medical image processing apparatus according to supplementary note 5-2, in which the clinical information acquisition unit acquires a cuff pressure as the third feature value.

(Supplementary Note 6)

A medical image processing apparatus including:

an acquisition unit configured to acquire medical image data;

an extraction unit configured to extract a structure of interest on the basis of the medical image data;

a parameter acquisition unit configured to acquire a plurality of parameters to be input to a prediction model of the structure of interest;

an estimation unit configured to estimate a first feature value related to the structure of interest by inputting the plurality of parameters to the prediction model; and an error calculation unit configured to calculate an error of the first feature value, in which the error calculation unit calculates at least two errors among an error based on a plurality of predetermined measurement values, an initial value error of optimization, and an extraction error of the structure of interest by the extraction unit, and calculates an overall error on the basis of the at least two errors.

(Supplementary Note 6-1)

The medical image processing apparatus according to supplementary note 6, in which the estimation unit sets a numerical range for at least two of the plurality of predetermined measurement values, an initial value of the optimization, and an extraction result of the structure of interest, and estimates the first feature values using the prediction model optimized under each condition in which a numerical value is changed in the set numerical range, and the error calculation unit calculates the at least two errors on the basis of the first feature value under each condition.

(Supplementary Note 6-2)

The medical image processing apparatus according to supplementary note 6 or supplementary note 6-1, in which the plurality of predetermined measurement values are parameters whose numerical values are fixed in optimization of the prediction model.

(Supplementary Note 6-3)

The medical image processing apparatus according to supplementary note 6 or supplementary note 6-1, in which an initial value of the optimization is an initial value of parameters whose numerical values are optimized in optimization of the prediction model.

(Supplementary Note 6-4)

The medical image processing apparatus according to any one of supplementary notes 6 to 6-3, further including a control unit configured to cause display information indicating the overall error to be displayed in the first feature value.

(Supplementary Note 6-5)

The medical image processing apparatus according to any one of supplementary notes 6 to 6-4, further including a control unit configured to cause display information indicating disease classification determined on the basis of the first feature value including the overall error to be displayed.

(Supplementary Note 7)

A medical image processing apparatus including:

an image data acquisition unit configured to acquire medical image data of at least two phases;

a specifying unit configured to specify each first feature value in the medical image data of at least two phases;

an acquisition unit configured to acquire a second feature value from clinical information; and a calculation unit configured to calculate a third feature value on the basis of the first feature value and the second feature value, in which the calculation unit is configured to:

calculate a pressure gradient between a left atrium and a left ventricle on the basis of the second feature value;

calculate flow volume in an early-systolic phase and a valve orifice area at an early-systolic phase on the basis of the first feature value and the second feature value; and calculate the third feature value on the basis of the pressure gradient, the first feature value, the second feature value, the flow volume in the early-systolic phase, and the valve orifice area at the early-systolic phase.

(Supplementary Note 7-1)

The medical image processing apparatus according to supplementary note 7, in which the specifying unit specifies a valve orifice area in medical image data of an open phase of the mitral valve and a valve orifice area in medical image data of a closed phase of the mitral valve, the acquisition unit acquires a cuff pressure from the clinical information, and the calculation unit calculates flow volume in the mitral valve on the basis of the pressure gradient, a valve orifice area in the open phase, a valve orifice area in the closed phase, flow volume in the early-systolic phase, and a valve orifice area in the early-systolic phase.

(Supplementary Note 8)

A medical image processing apparatus including:

an acquisition unit configured to acquire medical image data;

a specifying unit configured to specify a structure of interest included in the medical image data; and a calculation unit configured to calculate an index value related to the structure of interest, in which the calculation unit is configured to:

set a first region including the structure of interest therein;

divide a surface of the first region on the basis of a shape of the structure of interest;

set a second region connecting a feature line of the region of interest and a boundary line dividing the surface of the first region;

set a different value in a predetermined physical quantity to each of surfaces divided in the first region;

calculate a spatial field of the predetermined physical quantity in the first region on the basis of the predetermined physical quantity; and calculate an index value related to the structure of interest on the basis of an isosurface of the physical quantity.

(Supplementary Note 8-1)

The medical image processing apparatus according to supplementary Note 8, in which the region of interest is a cardiac valve, and the calculation unit is configured to:

set a second region connecting an annular-side end portion of the cardiac valve and a boundary line dividing the surface of the first region;

set heat sources having different temperatures for each of the surfaces divided in the first region;

calculate a temperature distribution in the first region; and calculate a valve orifice area of the cardiac valve on the basis of an isothermal surface in the temperature distribution.

(Supplementary Note 8-2)

The medical image processing apparatus according to supplementary Note 8-1, in which the calculation unit calculates, as a valve orifice area of the cardiac valve, an area of the isothermal surface that is in contact with the cardiac valve and has the smallest area in an isothermal surface of the temperature distribution.

(Supplementary Note 9)

A medical image processing apparatus including:

an acquisition unit configured to acquire a first medical image collected at a first time point and a second medical image collected at a second time point;

an extraction unit configured to extract a first anatomical structure from the first medical image and extract a second anatomical structure from the second medical image; and a processing unit configured to perform alignment of the second anatomical structure with a third anatomical structure estimated on the basis of the first anatomical structure, in which the processing unit is configured to:

project the second anatomical structure and the third anatomical structure in a predetermined cross-section;

acquire a feature point and a feature vector each from the second anatomical structure projected and the third anatomical structure projected; and perform a parallel translation for substantially matching positions of the feature points and a rotational translation for making the feature vectors parallel in the second anatomical structure projected and the third anatomical structure projected.

(Supplementary Note 9-1)

The medical image processing apparatus according to supplementary note 9, in which the acquisition unit is configured to acquire a first medical image collected before surgery and a second medical image collected after surgery, the extraction unit is configured to extract a preoperative cardiac valve from the first medical image and extract a postoperative cardiac valve from the second medical image, and the processing unit is configured to:

project the postoperative cardiac valve and the postoperative estimated cardiac valve in a blood flow direction;

acquire a line segment connecting a center of gravity and a commissure from the postoperative cardiac valve and the postoperative estimated cardiac valve; and perform a parallel translation for substantially matching the positions of centers of gravity and a rotational translation for making the line segments connecting commissures parallel in the postoperative cardiac valve and the postoperative estimated cardiac valve.

(Supplementary Note 10)

A medical image processing apparatus including:

a medical image data acquisition unit configured to acquire first medical image data and second medical image data scanned at least at a first timing and at a second timing different from the first timing;

an extraction unit configured to extract a first feature value on the basis of the first medical image data and a second feature value on the basis of the second medical image data; and a change unit configured to change, in a case where the first feature value is larger than the second feature value, the value of the first feature value to the value of the second feature value.

(Supplementary Note 10-1)

The medical image processing apparatus according to supplementary note 10, in which the first feature value is a regurgitant volume of blood flow in a mitral valve, and the second feature value is passing volume of blood flow in an aortic valve.

(Supplementary Note 11)

A medical image processing apparatus including:

an image data acquisition unit configured to acquire first medical image data scanned in an early-systolic phase and second medical image data scanned in an end-systolic phase;

an extraction unit configured to extract a first feature value on the basis of the first medical image data and a second feature value on the basis of the second medical image data;

an acquisition unit configured to acquire passing volume of blood flow in an aortic valve; and a calculation unit that calculates regurgitant volume of blood flow in a mitral valve on the basis of a difference between the first feature value and the second feature value and passing volume of blood flow in the aortic valve.

(Supplementary Note 11-1)

The medical image processing apparatus according to supplementary note 11, in which the first feature value is left ventricular lumen volume at the early-systolic phase, the second feature value is left ventricular lumen volume at the end-systolic phase, and the calculation unit calculates regurgitant volume of blood flow in the mitral valve by subtracting passing volume of blood flow in the aortic valve from a difference between the left ventricular lumen volume in the early-systolic phase and the left ventricular lumen volume in the end-systolic phase.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical image processing apparatus, comprising:
processing circuitry configured to:
acquire first medical image data and second medical image data scanned respectively at least at a first timing and at a second timing different from the first timing;
acquire first feature data related to a structure of interest of a heart at the first timing based on the first medical image data and second feature data related to the structure of interest of the heart at the second timing based on the second medical image data;
estimate third feature data of the heart at the second timing by estimating the structure of interest by simulation based on the first feature data of the heart at the first timing;
calculate, from the second feature data of the heart at the second timing and the third feature data of the heart at the second timing, a first feature value and a second feature value that is a feature value more local than the first feature value;
specify a plurality of parameter sets related to the simulation based on an optimization calculation having a loss function including the first feature value, the first feature value relating to a shape of a cardiac valve; and
determine a parameter set of interest, from the plurality of parameter sets, based on the second feature value, the second feature value relating to a difference in valve orifice area in the cardiac valve.

2. The medical image processing apparatus according to claim 1, wherein the first feature value is a feature value of an entirety of the structure of interest.

3. The medical image processing apparatus according to claim 1, wherein the processing circuitry is further configured to specify a plurality of parameter sets based on the first feature value calculated by the loss function from a parameter set group obtained based on a multi-start optimization calculation.

4. The medical image processing apparatus according to claim 3, wherein the processing circuitry is further configured to specify a plurality of parameter sets in which the first feature value is relatively small.

5. The medical image processing apparatus according to claim 1, wherein the processing circuitry is further configured to determine a parameter set in which the corresponding second feature value is relatively small among the plurality of parameter sets as the parameter set of interest.

6. The medical image processing apparatus according to claim 1, wherein the processing circuitry is further configured to acquire first medical image data and second medical image data scanned at least during systole and diastole of a heart.

7. The medical image processing apparatus according to claim 6, wherein the processing circuitry is further configured to:
acquire shape data of the cardiac valve in systole of the heart based on the first medical image data, and acquire shape data of a cardiac valve in diastole of the heart based on the second medical image data;
estimate, by simulation based on the shape data of the cardiac valve in systole of the heart acquired based on the first medical image data, shape data of the cardiac valve in diastole of the heart;
calculate, based on the shape data of the cardiac valve based on the second medical image data and the shape data of the cardiac valve estimated by the simulation, the first feature value related to a difference in the shape of the cardiac valve and the second feature value related to the difference in the valve orifice area in the cardiac valve.

8. A method, comprising:
acquiring first medical image data and second medical image data scanned respectively at least at a first timing and at a second timing different from the first timing;
acquiring first feature data related to a structure of interest of a heart at the first timing based on the first medical image data and second feature data related to the structure of interest of the heart at the second timing based on the second medical image data;
estimating third feature data of the heart at the second timing by estimating the structure of interest by simulation based on the first feature data of the heart at the first timing;
calculating, from the second feature data of the heart at the second timing and the third feature data of the heart at the second timing, a first feature value and a second feature value that is a feature value more local than the first feature value;
specifying a plurality of parameter sets related to the simulation based on an optimization calculation having a loss function including the first feature value, the first feature value relating to a shape of a cardiac valve; and
determining a parameter set of interest, from the plurality of parameter sets, based on the second feature value, the second feature value relating to a difference in valve orifice area in the cardiac valve.

9. A medical image processing apparatus, comprising:
processing circuitry configured to:
acquire first medical image data and second medical image data scanned at least at a first timing and at a second timing different from the first timing;
acquire shape data of a cardiac valve in diastole of a heart based on the first medical image data, and acquire shape data of a cardiac valve in systole of the heart based on the second medical image data;
estimate, by simulation based on shape data of a cardiac valve in diastole of the heart acquired based on the first medical image data, shape data of the cardiac valve in systole of the heart;
calculate, based on shape data of the cardiac valve based on the second medical image data and shape data of the cardiac valve estimated by the simulation, a feature value related to a difference in shape of the cardiac valve and a feature value related to a difference in valve orifice area in the cardiac valve;
specify a plurality of parameter sets based on an optimization calculation having a loss function including a feature value related to a difference in shape of the cardiac valve; and
determine the parameter set of interest from the plurality of parameter sets based on a feature value related to a difference in valve orifice area in the cardiac valve.

10. A medical image processing apparatus, comprising:
processing circuitry configured to:
acquire first medical image data and second medical image data scanned at least at a first timing and at a second timing different from the first timing;
acquire shape data of a cardiac valve in systole of a heart based on the first medical image data, and acquire shape data of a cardiac valve in diastole of the heart based on the second medical image data;

estimate, by simulation based on shape data of a cardiac valve in systole of the heart acquired based on the first medical image data, shape data of the cardiac valve in diastole of the heart;

calculate, based on shape data of the cardiac valve based on the second medical image data and shape data of the cardiac valve estimated by the simulation, a feature value related to a difference in shape of the cardiac valve and a feature value related to a difference in valve orifice area in the cardiac valve;

specify a plurality of parameter sets based on an optimization calculation having a loss function including a feature value related to a difference in shape of the cardiac valve; and determine the parameter set of interest from the plurality of parameter sets based on a feature value related to a difference in valve orifice area in the cardiac valve.

* * * * *